(12) United States Patent
Bristol et al.

(10) Patent No.: US 12,323,713 B2
(45) Date of Patent: Jun. 3, 2025

(54) HEADSETS HAVING IMPROVED CAMERA ARRANGEMENTS AND DEPTH SENSORS, AND METHODS OF USE THEREOF

(71) Applicant: META PLATFORMS TECHNOLOGIES, LLC, Menlo Park, CA (US)

(72) Inventors: Peter Wesley Bristol, Seattle, WA (US); Joseph Patrick Sullivan, Seattle, WA (US); Scott Andrew Dallmeyer, Seattle, WA (US); David Michael Pickett, Seattle, WA (US); Joel Bernard Jacobs, Seattle, WA (US); Peter Allan Chase Newbury, Nice (FR); Quintin Morris, Tacoma, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/476,237

(22) Filed: Sep. 27, 2023

(65) Prior Publication Data
US 2024/0214696 A1 Jun. 27, 2024

Related U.S. Application Data

(60) Provisional application No. 63/477,169, filed on Dec. 23, 2022.

(51) Int. Cl.
*H04N 23/90* (2023.01)
*G06T 7/521* (2017.01)
(Continued)

(52) U.S. Cl.
CPC ............ *H04N 23/90* (2023.01); *G06T 7/521* (2017.01); *G06T 7/70* (2017.01); *H04N 23/13* (2023.01);
(Continued)

(58) Field of Classification Search
CPC ........ H04N 23/90; H04N 23/84; H04N 23/13; G06T 7/70; G06T 7/521; G06T 2207/10028; G06T 2207/10024; H04R 1/1041; H04R 5/033; H04R 1/028; H04R 5/0335; H04R 2499/15
See application file for complete search history.

(56) References Cited

U.S. PATENT DOCUMENTS 10,083,523 B2 *  9/2018  Versace .................... G01S 7/41
10,706,584 B1 *  7/2020  Ye .......................... G06F 18/214
(Continued)

*Primary Examiner* — Vinh T Lam
(74) *Attorney, Agent, or Firm* — McDermott Will & Emery LLP

(57) ABSTRACT

The various implementations described herein include methods and devices for artificial-reality systems. In one aspect, a head-wearable device includes a depth-tracking component configured to obtain depth information associated with one or more objects in a physical environment of the head-wearable device. The head-wearable device also includes a set of peripheral camera components, and a set of forward-facing camera components, where each forward-facing camera component of the set of forward-facing camera components includes a monochrome camera and a color camera.

20 Claims, 36 Drawing Sheets

(51) Int. Cl.
*G06T 7/70* (2017.01)
*H04N 23/13* (2023.01)
*H04N 23/84* (2023.01)
*H04R 1/02* (2006.01)

(52) U.S. Cl.
CPC ............ *H04N 23/84* (2023.01); *H04R 1/028* (2013.01); *G06T 2207/10024* (2013.01); *G06T 2207/10028* (2013.01); *H04R 2499/15* (2013.01)

(56) References Cited

U.S. PATENT DOCUMENTS

| | | | |
|---|---|---|---|
| 10,950,034 B1* | 3/2021 | Garcia | G06T 19/006 |
| 10,984,242 B1* | 4/2021 | Atlas | G06F 3/0346 |
| 11,032,534 B1* | 6/2021 | Voss-Wolff | G06T 17/20 |
| 11,036,987 B1* | 6/2021 | Bramwell | G06T 19/20 |
| 11,055,920 B1* | 7/2021 | Bramwell | G06F 3/011 |
| 11,145,126 B1* | 10/2021 | Bramwell | G06F 3/147 |
| 11,156,843 B2* | 10/2021 | Freese | G06T 7/85 |
| 11,217,024 B2* | 1/2022 | Sztuk | G06T 5/70 |
| 11,243,402 B2* | 2/2022 | Stahl | G06F 3/011 |
| 11,297,286 B1* | 4/2022 | Bikumandla | G06T 7/593 |
| 11,501,488 B2* | 11/2022 | Garcia | G06T 5/77 |
| 11,676,348 B2* | 6/2023 | Simpson | G06T 7/70 345/633 |
| 11,688,089 B2* | 6/2023 | Islam | G06T 7/55 348/42 |
| 11,688,101 B2* | 6/2023 | Birklbauer | H04N 17/002 348/187 |
| 11,740,690 B2* | 8/2023 | Chandrasekhar | G06T 7/73 345/156 |
| 11,818,474 B1* | 11/2023 | Locher | H04N 25/135 |
| 11,889,196 B2* | 1/2024 | Nikhara | H04N 13/332 |
| 11,914,152 B2* | 2/2024 | Stahl | H04N 19/139 |
| 12,067,679 B2* | 8/2024 | Jee | G06T 7/70 |
| 12,125,150 B2* | 10/2024 | Micusik | G06F 3/0346 |
| 12,169,947 B2* | 12/2024 | Auer | G06T 7/11 |
| 2015/0316767 A1* | 11/2015 | Ebstyne | G06T 7/80 345/8 |
| 2020/0128225 A1* | 4/2020 | Ge | G06F 18/251 |
| 2021/0304509 A1* | 9/2021 | Berkebile | G06V 40/20 |
| 2021/0327156 A1* | 10/2021 | Bramwell | G06F 3/147 |
| 2022/0051441 A1* | 2/2022 | Zahnert | G06F 3/011 |
| 2022/0130124 A1* | 4/2022 | Sztuk | G02B 27/0172 |
| 2022/0156943 A1* | 5/2022 | Zhang | G06N 3/044 |
| 2023/0179868 A1* | 6/2023 | Nikhara | H04N 23/665 345/633 |
| 2023/0196621 A1* | 6/2023 | Robertson | G06T 3/4038 382/164 |
| 2023/0341930 A1* | 10/2023 | Chandrasekhar | G06T 7/246 |
| 2023/0401796 A1* | 12/2023 | Evangelidis | G06T 7/74 |
| 2024/0064417 A1* | 2/2024 | Desai | H04N 23/90 |
| 2024/0289988 A1* | 8/2024 | Birklbauer | H04N 13/271 |
| 2024/0377640 A1* | 11/2024 | Asaban | H04N 13/239 |

\* cited by examiner

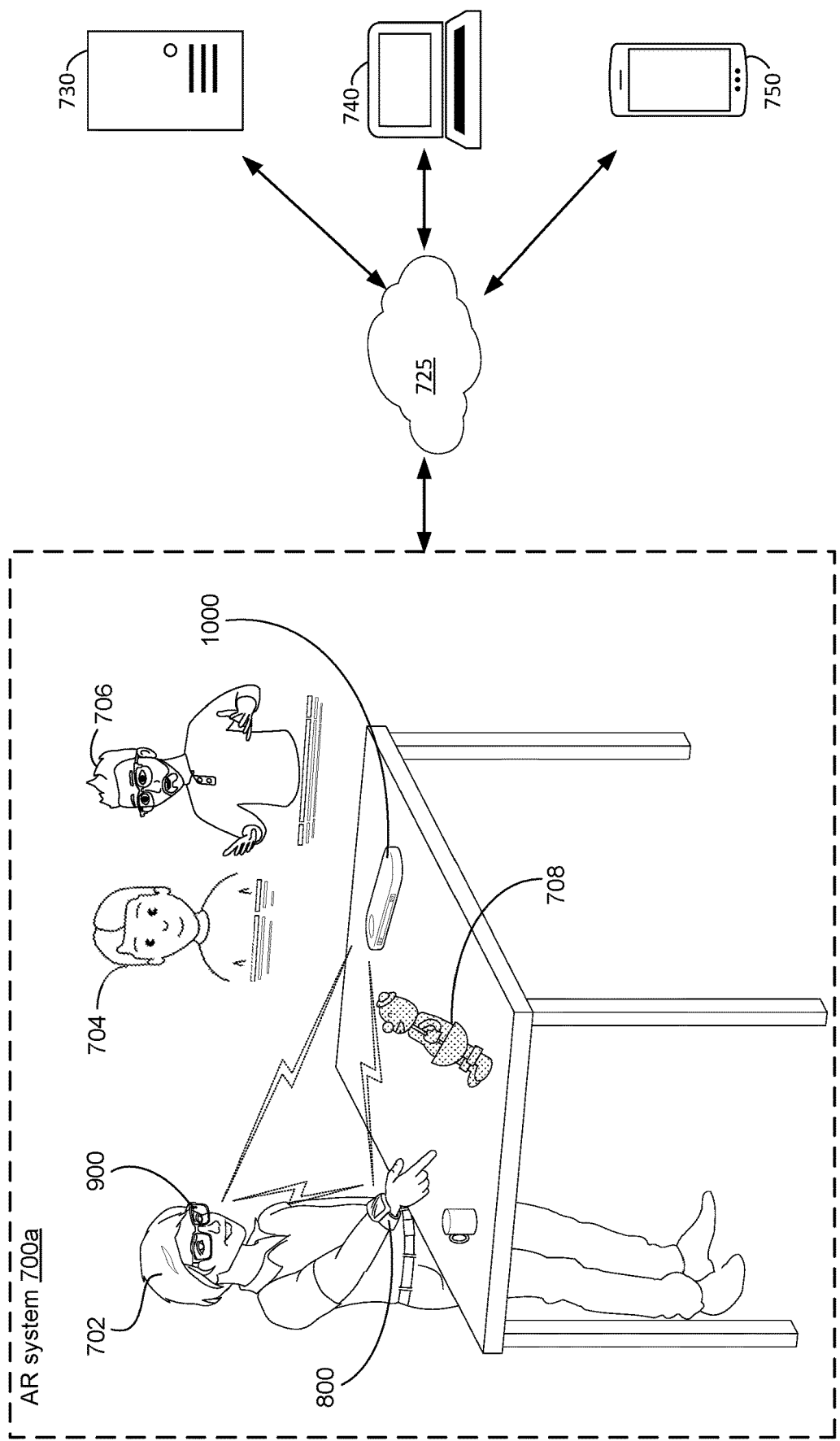

HEADSETS HAVING IMPROVED CAMERA ARRANGEMENTS AND DEPTH SENSORS, AND METHODS OF USE THEREOF

PRIORITY AND RELATED APPLICATIONS

This application claims priority to U.S. Provisional Patent Application No. 63/477,169, filed Dec. 23, 2022, titled "Virtual-Reality Headsets Having Improved Camera Arrangements, Depth Sensors, and Cloud-Based Computing Solutions," which is hereby incorporated by reference in its entirety.

TECHNICAL FIELD

The present disclosure also relates to head-wearable devices, including but not limited to, head-wearable devices including sets of sensor components protected by cover windows arranged on front-facing outer surfaces of the head-wearable devices.

BACKGROUND

Artificial reality systems (e.g., virtual reality and augmented reality) generally need to track a user's movement and their surroundings. Depth mapping refers to gathering information relating to the distance of objects in a scene from a viewpoint. Depth mapping enables users and applications to accomplish, or improve upon, various tasks such as object recognition, gesture control, and focus control.

However, there is an ongoing challenge to efficiently generate accurate and precise depth maps. Conventional methods for depth mapping are imprecise and/or inefficient (e.g., require excessive power consumption, processing, and/or expense). Further, there is a need to protect sensors for depth mapping to minimize imprecision and prevent loss.

SUMMARY

In accordance with some embodiments, an artificial-reality system includes a head-wearable device with a head-mounted display (HMD) and at least one forward-facing camera coupled to the HMD. In some embodiments, the forward-facing camera extends from a front surface of the HMD. In some embodiments, the head-wearable device further includes an illumination source coupled to (e.g., mounted on or embedded in) an outward-facing surface. The illumination source being configured to provide light that is detectable by the camera.

In some embodiments, the illumination source is arranged on the head-wearable device such that at least a portion of the illumination provided by the illumination source is detectable to the forward-facing camera when the head-wearable is worn by a user. In some embodiments, the illumination source includes a plurality of light-emitting diodes (LEDs), and the forward-facing camera is configured to track light emitted by the LEDs. In some embodiments, the head-wearable device further includes a first power source to supply power to the HMD and the forward-facing camera.

In accordance with some embodiments, a first example head-wearable device is provided. The head-wearable device includes a depth-tracking component configured to obtain depth information associated with one or more objects in a physical environment of the head-wearable device. The head-wearable device includes a set of peripheral camera components and a set of forward-facing camera components, where each forward-facing camera component of the set of forward-facing camera components includes a monochrome camera and a color camera.

In accordance with some embodiments, a second example head-wearable device is provided. The head-wearable device includes a front-facing outer surface and a first set of components arranged along a first dimension of the front-facing outer surface. Each component of the first set of components includes a respective first set of sensors, and a respective first cover window, where the respective first cover window is a first type of cover window including a first stack of material layers. The head-wearable device also includes a second set of components arranged along the first dimension of the front-facing outer surface, where each component of the second set of components includes a respective second set of sensors, and a respective second cover window, where the respective second cover window is a second type of cover window including a second stack of material layers, distinct from the first stack of material layers.

Thus, methods, devices, and computer-readable storage media are disclosed for artificial-reality systems. Such methods and devices may complement or replace conventional artificial-reality methods and apparatuses.

The features and advantages described in the specification are not necessarily all inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not to necessarily be considered limiting, for the description can admit to other effective features as the person of skill in this art will appreciate upon reading this disclosure.

FIGS. 7A 7B, 7C-1, 7C-2, 7D-1, and 7D-2 illustrate example artificial-reality systems in accordance with some embodiments.

FIGS. 9A, 9B-1, 9B-2, and 9C illustrate example head-wearable devices in accordance with some embodiments.

In accordance with common practice, the various features illustrated in the drawings are not necessarily drawn to scale, and like reference numerals can be used to denote like features throughout the specification and figures.

DETAILED DESCRIPTION

Systems in the present disclosure may improve upon conventional systems by including cameras and sensors in arrangements that improve on user movement tracking, environmental awareness and tracking, and artificial-reality interaction.

Figure 1A:
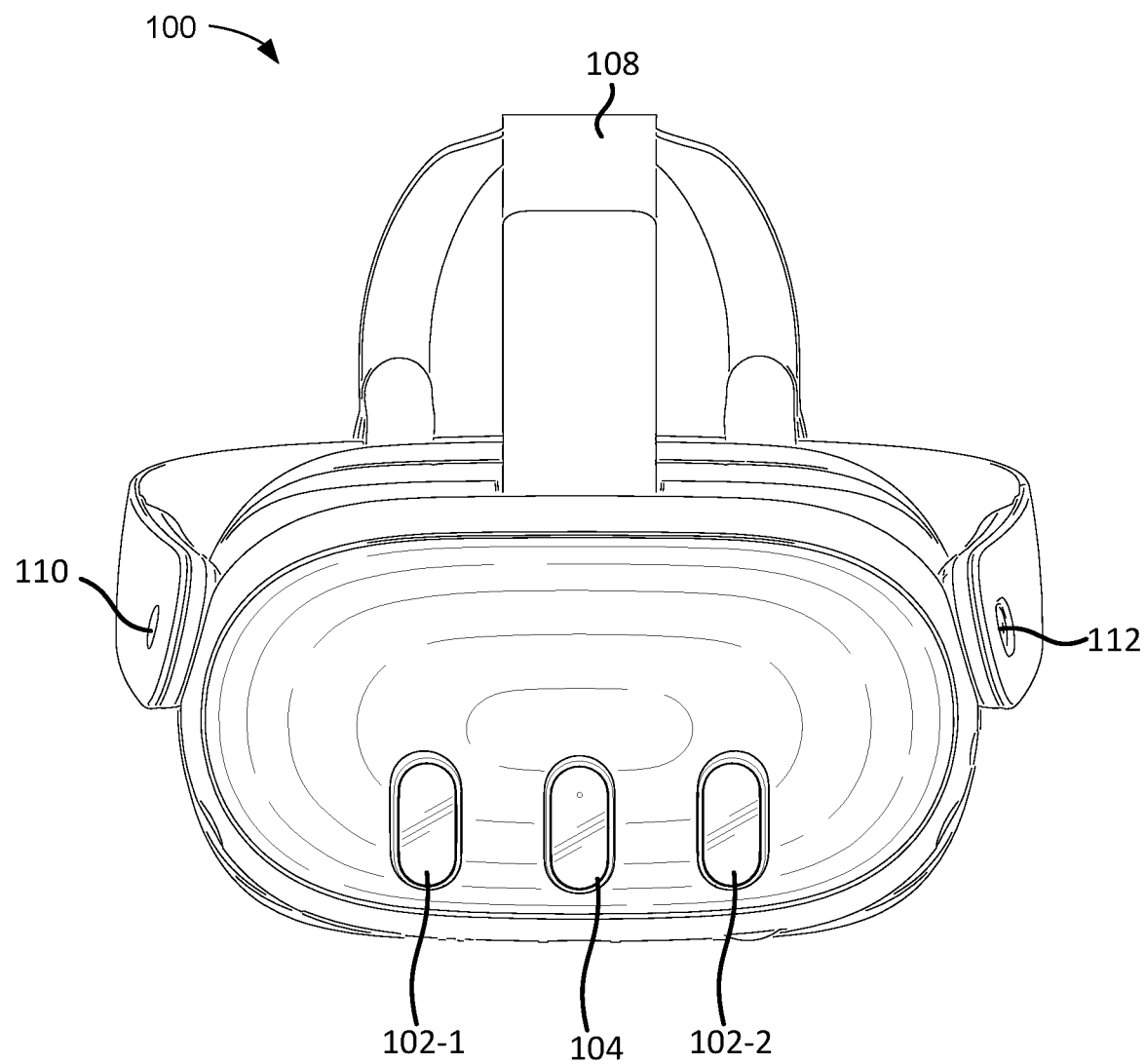
FIGS. 1A-1H illustrate an example head-wearable device in accordance with some embodiments.
Figure 1B:
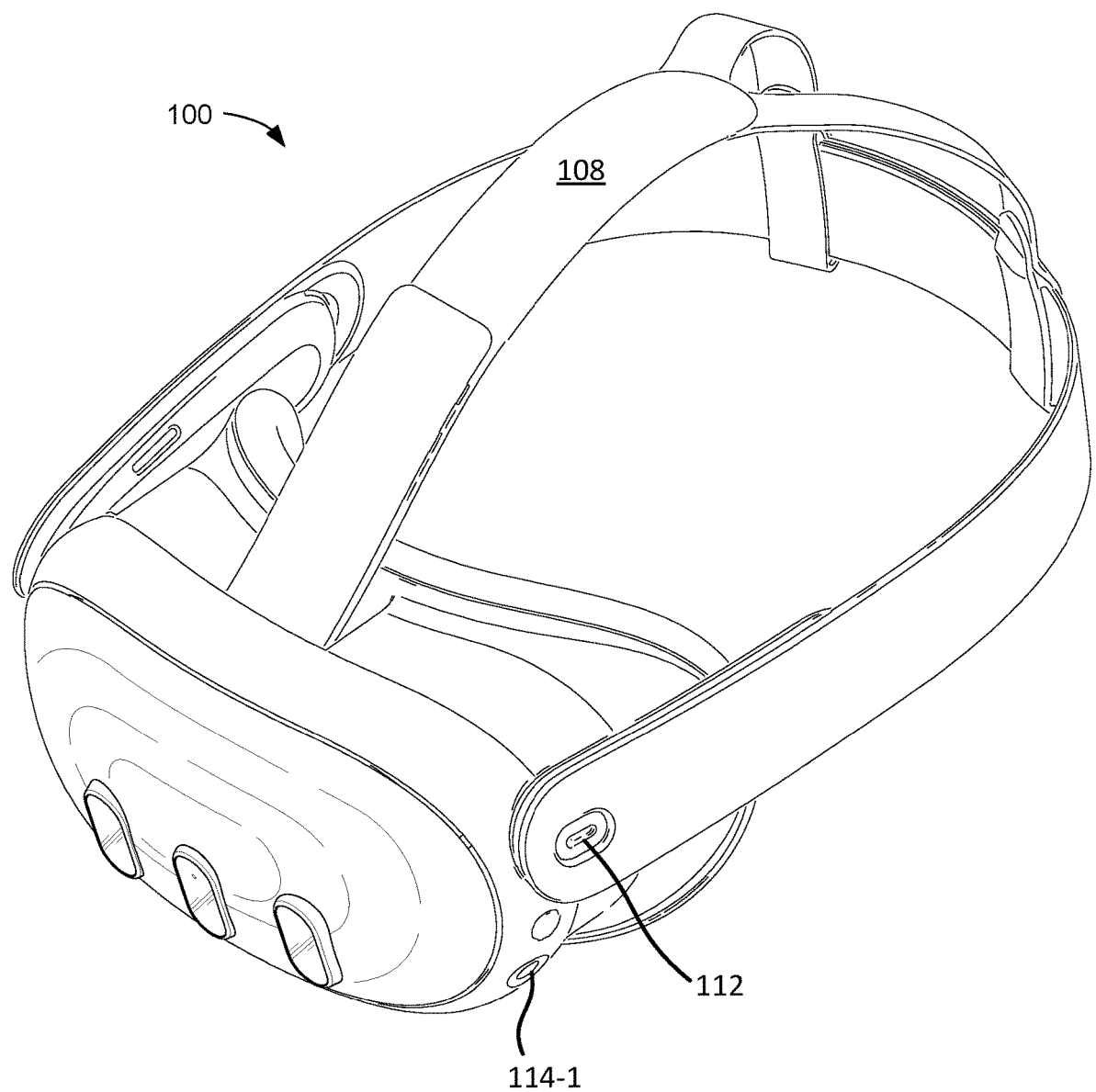
Figure 1C:
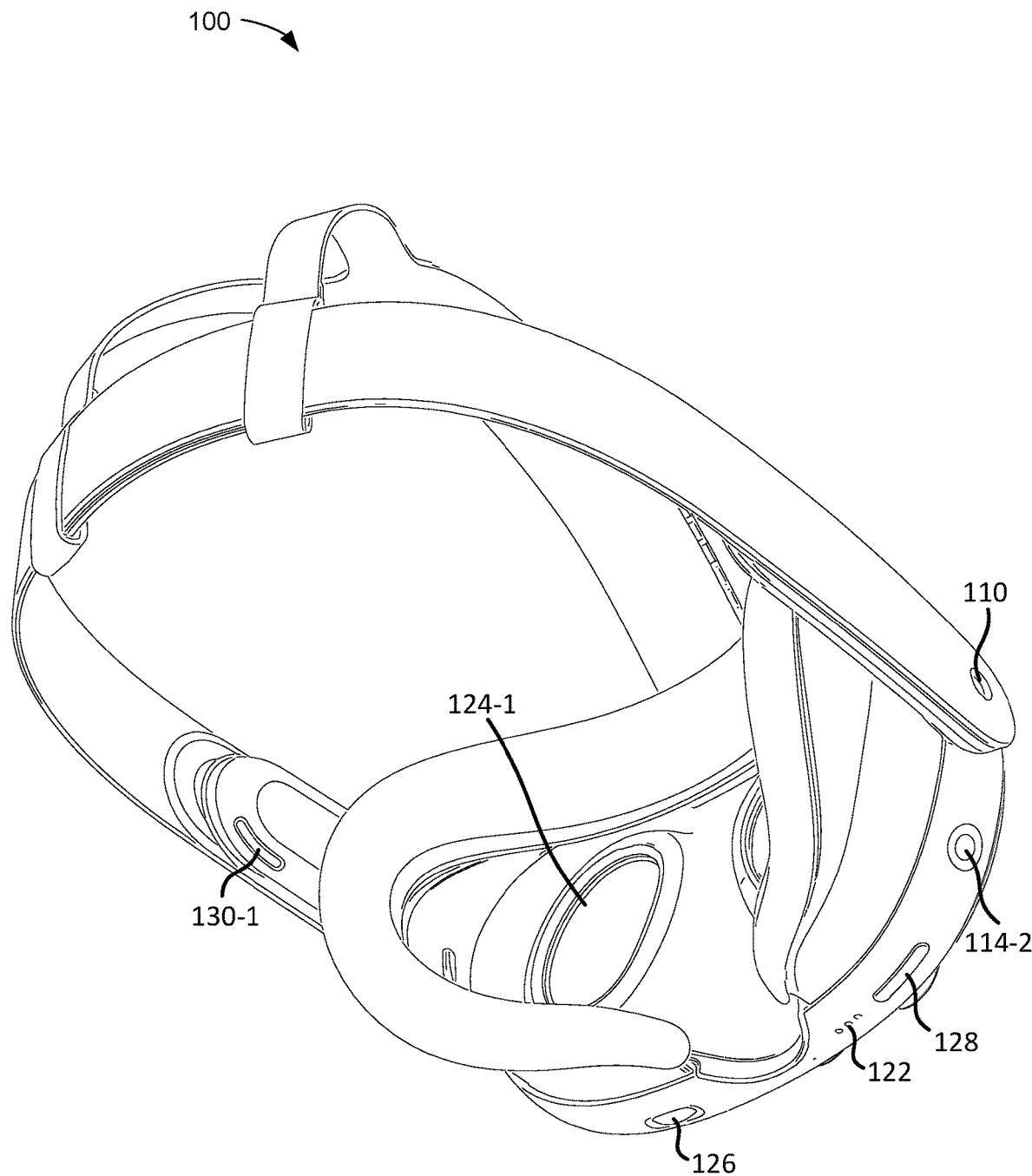

FIGS. 1A-1H illustrate a head-wearable device 100 in accordance with some embodiments. The head-wearable device 100 includes a strap 108 for fitting to a user's head (which may include a bifurcated strap portion for covering each side of a back of a user's head, as shown by the top view of the head-wearable device 100 in FIG. 1G), forward-facing camera components 102-1 and 102-2, and a depth tracking component 104. In some embodiments, the strap 108 is a soft (e.g., compliant to conform to the shape of a user's head) strap. In some embodiments, the strap 108 is adjustable (e.g., via a hook and loop structure). In some embodiments, the strap 108 is detachable (e.g., can be replaced with a strap of the same style or a different style). In some embodiments, each forward-facing camera component 102 includes one or more cameras. In some embodiments, the one or more cameras include one or more color cameras (e.g., RGB cameras) and/or one or more monochrome (e.g., black and white) cameras. In some embodiments, the monochrome cameras have a higher refresh rate than the color cameras. The head-wearable device 100 further includes peripheral camera components 114-1 and 114-2 as shown in FIGS. 1B and 1C. In some embodiments, the forward-facing camera components 102 include a color camera for color passthrough (e.g., a 16-megapixel camera). In some embodiments, the forward-facing camera components 102 include one or more monochrome cameras and one or more RGB cameras (e.g., configured to colorize images from the monochrome cameras). In some embodiments, the forward-facing camera components 102 and/or the peripheral camera components provide for six degrees of freedom. In some embodiments, the peripheral camera components 114 are configured to provide object tracking information (e.g., tracking a user's hands). In some embodiments one or more of the forward-facing camera components 102 includes a monochrome camera and an RGB camera stacked (e.g., vertically aligned along a lateral plane of the head-wearable device). In some embodiments, the monochrome and RGB cameras are arranged such that their field of views are substantially the same.

In some embodiments, the depth tracking component 104 determines depth information associated with one or more objects in a local area. The depth tracking component 104 may include a structured light generator, an imaging device, and a controller. In some embodiments, the imaging device is separate from the depth tracking component 104 (e.g., the imaging device is a component of the forward-facing camera components 102). In some embodiments, the structured light generator is configured to illuminate a local area with one or more polarized structured light patterns in accordance with emission instructions. In some embodiments, the structured light generator includes an illumination source, an acousto-optic device, a polarizing element, and/or a projection assembly. In some embodiments, the illumination source is configured to emit an optical beam. In some embodiments, the acousto-optic device generates a structured light pattern from the optical beam. In some embodiments, the acousto-optic device is configured to function as a dynamic diffraction grating that diffracts the optical beam to form the structured light pattern based on the emission instructions. In some embodiments, the projection assembly includes a polarizing element that generates the one or more polarized structured light patterns using the structured light pattern. In some embodiments, the projection assembly is configured to project the one or more polarized structured light patterns into the local area. In some embodiments, the imaging device is configured to capture portions of the one or more polarized structured light patterns scattered or reflected from one or more objects in the local area. In some embodiments, the controller is communicatively coupled to both the structured light generator and the imaging device. In some embodiments, the controller generates the emission instructions and provides the emission instructions to the structured light generator. In some embodiments, the controller is also configured to determine depth information for the one or more objects based on polarization information of the captured portions of the one or more scattered or reflected polarized structured light patterns. In some embodiments, the depth tracking component 104 includes an infrared illumination source and an infrared sensor.

The head-wearable device 100 further includes an audio port 110 (e.g., as shown in FIG. 1C) and a port 112 (e.g., as shown in FIG. 1B) (e.g., a USB-C port). In some embodiments, the audio port 110 is a 3.5 mm headphone jack. In some embodiments, the port 112 is a power-supply port and/or a communications port.

Figure 1D:
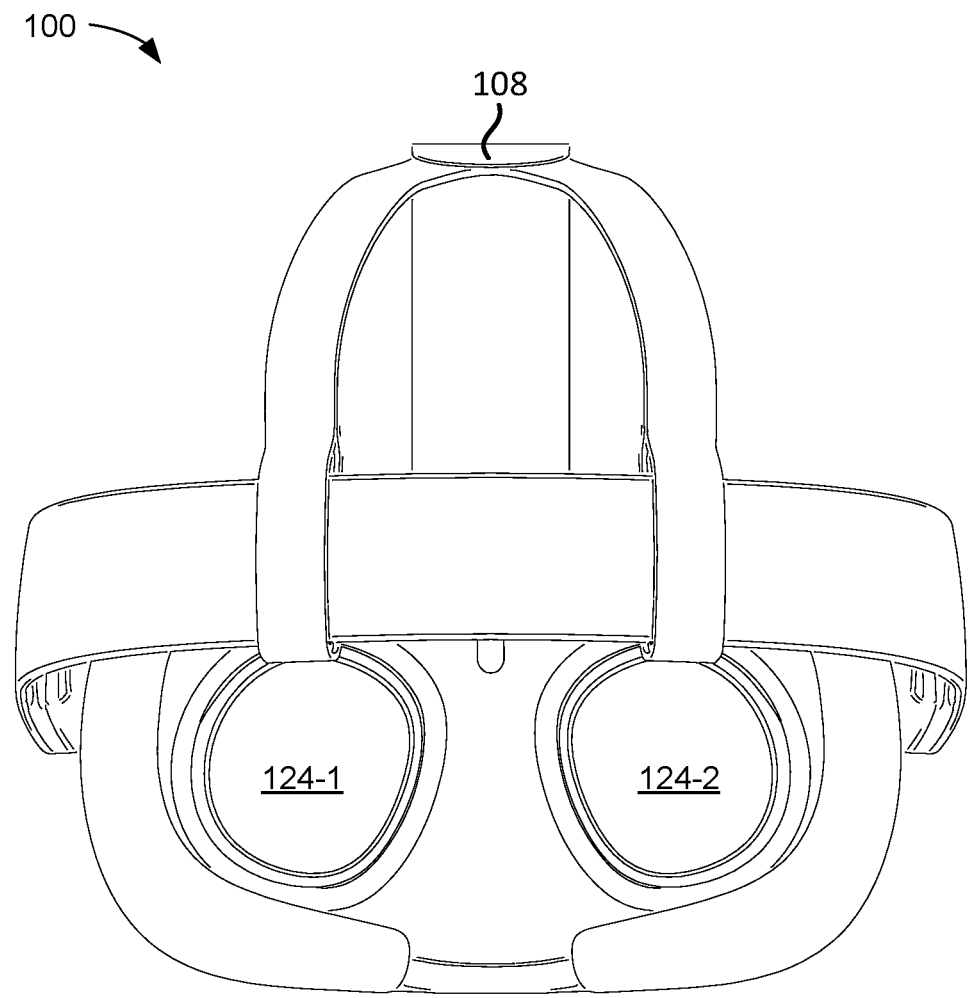
Figure 1E:
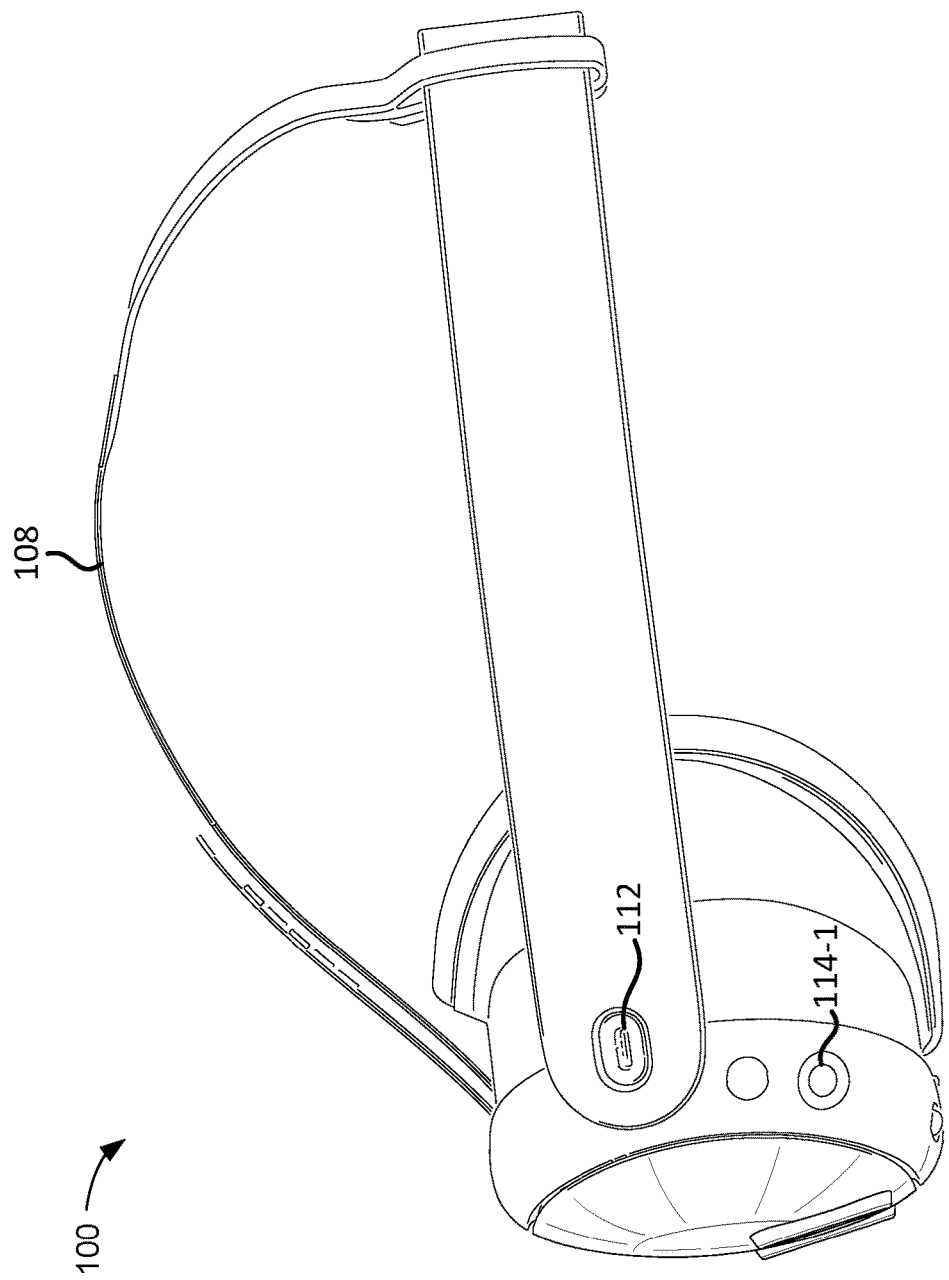
Figure 1F:
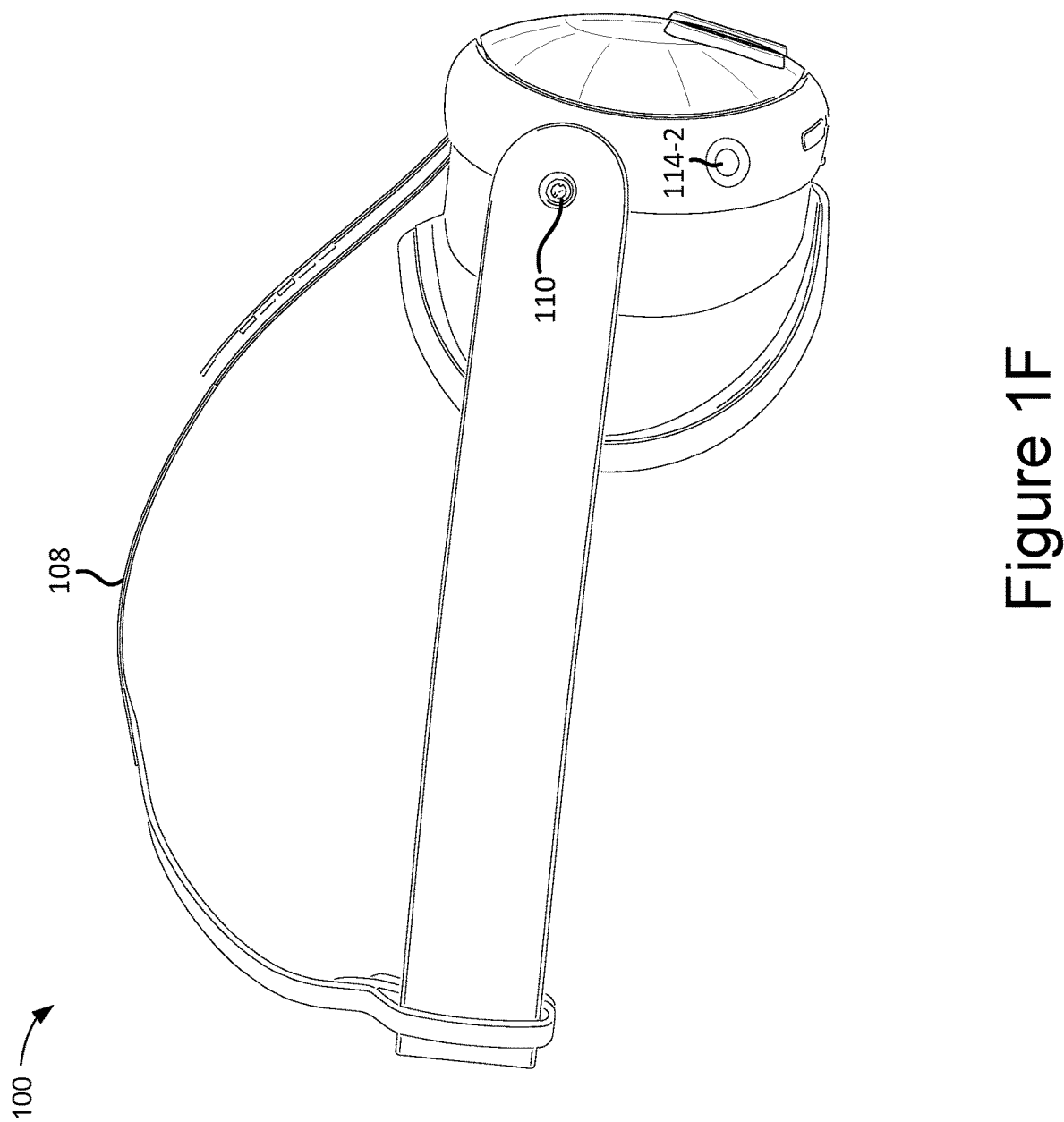
Figure 1G:
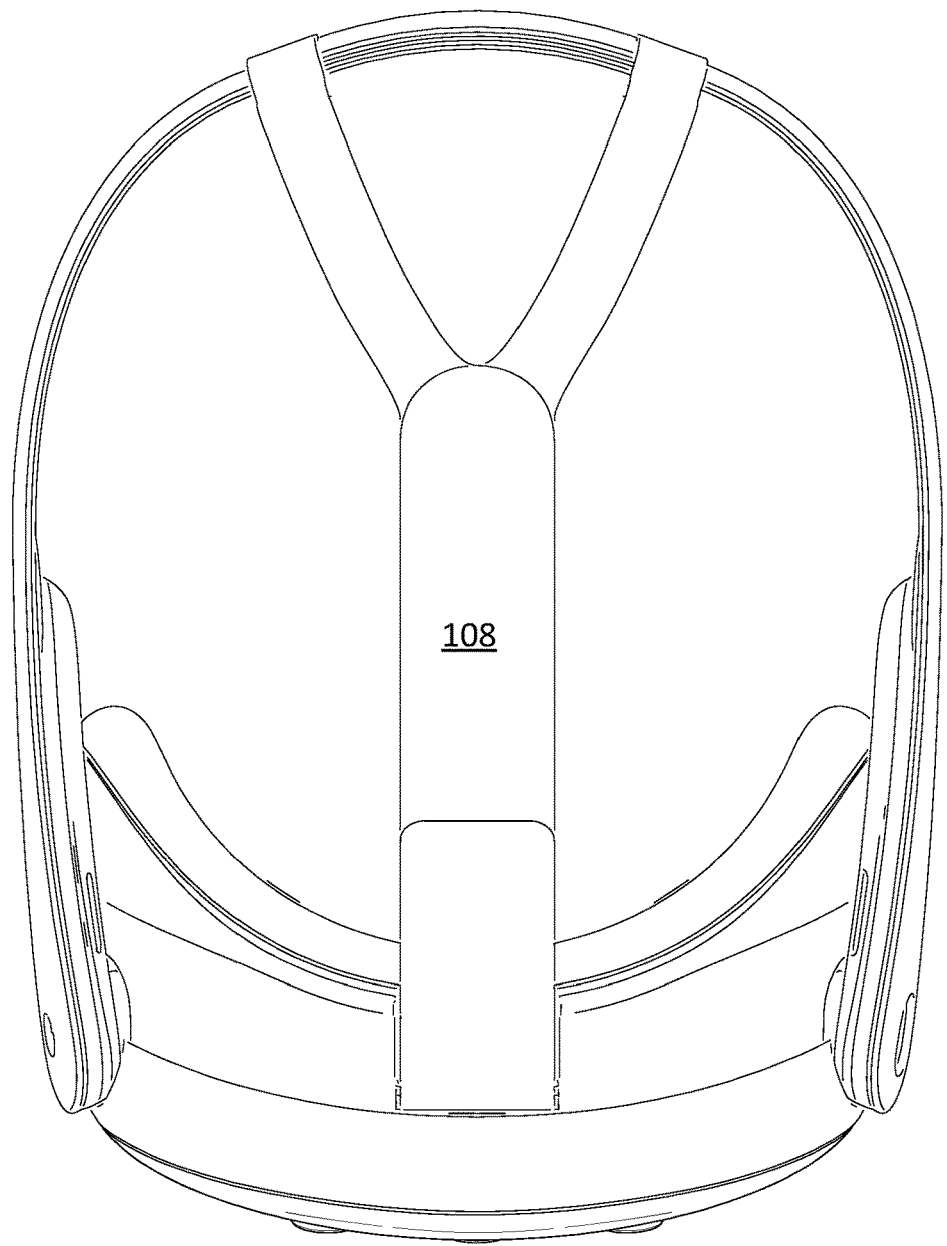
Figure 1H:
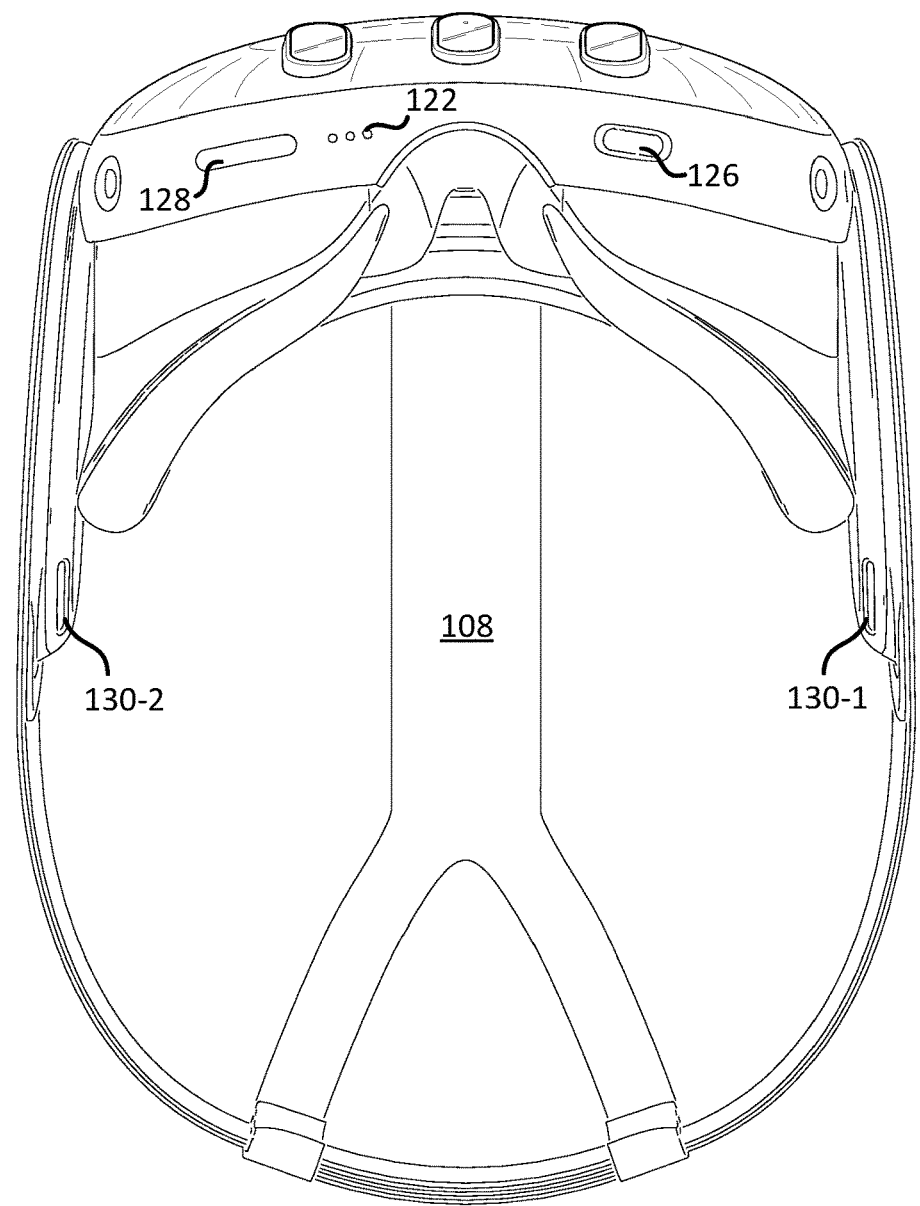

The head-wearable device 100 further includes lenses 124-1 and 124-2 (e.g., as shown in FIG. 1D) and speakers 130-1 and 130-2 (e.g., as shown in FIG. 1H). In some embodiments, the lenses 124 are flat and/or thin (e.g., pancake lenses). In some embodiments, the head-wearable device 100 includes one or more displays in conjunction with the lenses 124. In some embodiments, the displays are liquid crystal displays (LCDs). In some embodiments, the displays are rotated (e.g., 21 degrees), e.g., to improve a field of view. In some embodiments, the forward-facing camera components 102 and/or the depth tracking component 104 are aligned with one or both of the lenses 124-1 and 124-2.

In some embodiments, a controller of the head-wearable device 100 is configured to align images and/or other data from the forward-facing camera components 102 and/or the depth tracking component 104 with the lenses 124.

As shown in FIG. 1C, the head-wearable device 100 further includes a power connector 122 (e.g., a pogo pin connector). In some embodiments, the power connector 122 is configured to couple the head-wearable device 100 to a charging dock. The head-wearable device 100 further includes a volume button 128 (e.g., as shown in FIG. 1C) for adjusting a volume of output audio for the head-wearable device 100. For example, the volume button 128 allows a user to adjust volume of audio output via the speakers 130 and/or a speaker coupled to the audio port 110. In some embodiments, the volume button 128 is configured to increase volume in accordance with a user input on one end of the button and is configured to decrease volume in accordance with a user input on an opposite end of the button.

As shown in FIG. 1H, the head-wearable device 100 further includes an adjustment mechanism 126 (e.g., a wheel) for adjusting an interpupillary distance (IPD) of the head-wearable device 100 (e.g., an IPD corresponding to the lenses 124). In some embodiments, the head-wearable device 100 includes a first display screen and a second display screen to display images to respective eyes of a user. The head-wearable device 100 further includes a first rack coupled to the first display screen and a second rack coupled to the second display screen. In some embodiments, the adjustment mechanism 126 is configured to transfer a rotation of a wheel to a linear motion of the first rack and/or the second rack to adjust the IPD.

Figure 2A:
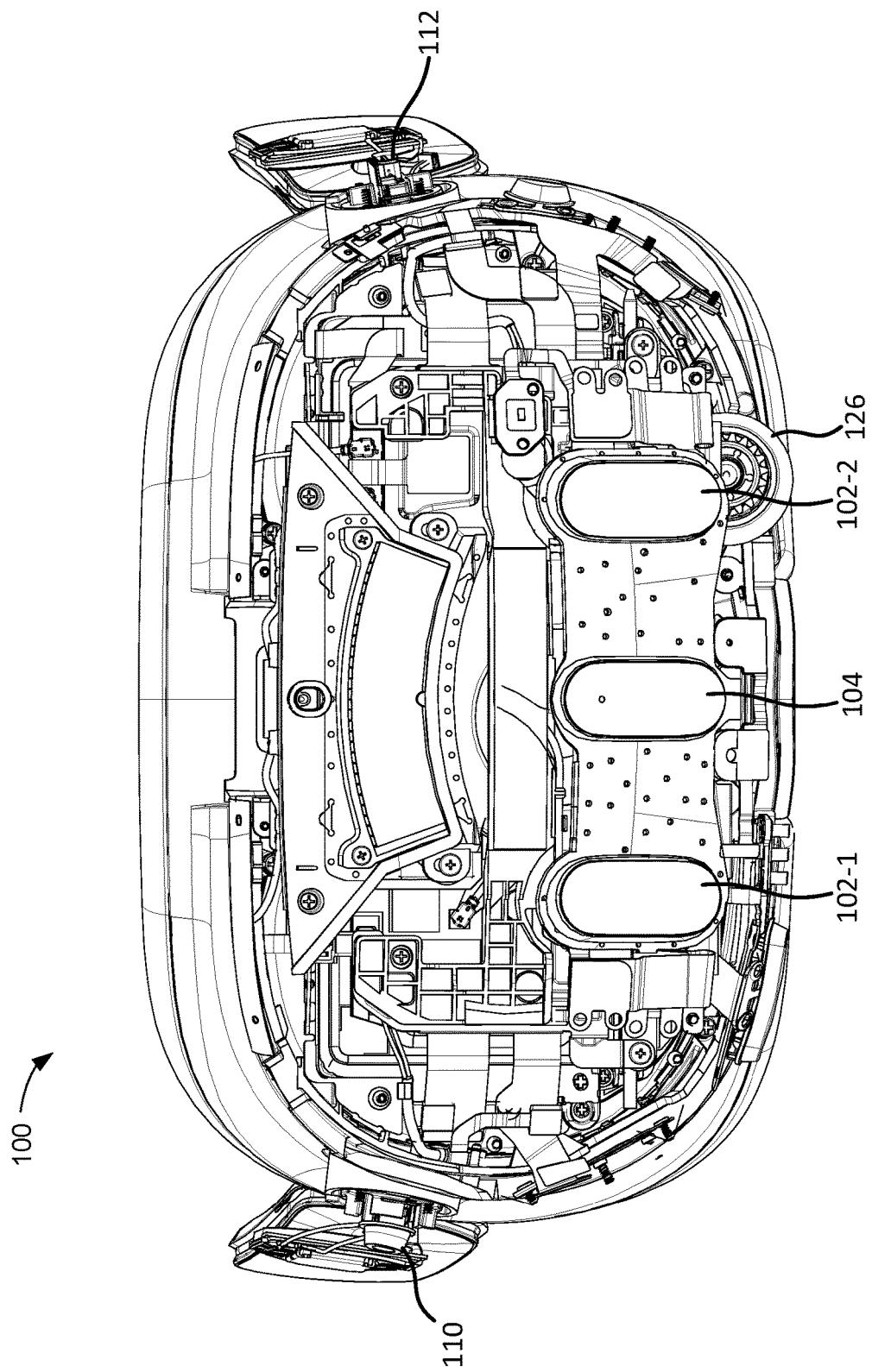
FIGS. 2A-2B illustrate front-facing interior views of the example head-wearable device of FIGS. 1A-1H in accordance with some embodiments.
Figure 2B:
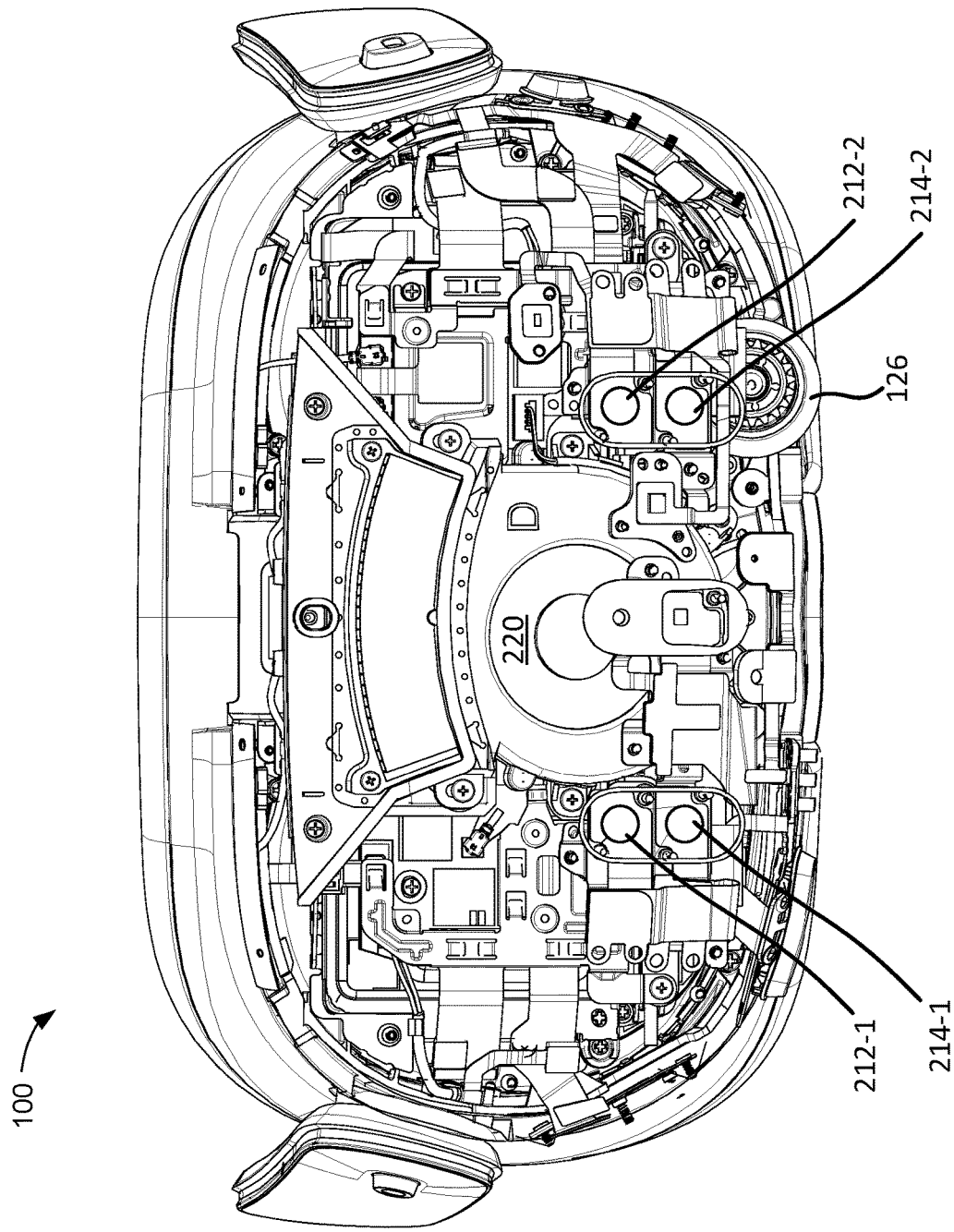

FIGS. 2A-2B illustrate front-facing interior views of the head-wearable device 100 in accordance with some embodiments. FIG. 2A shows a front-facing view of the head-wearable device 100 with a housing removed. As shown in FIG. 2A, the head-wearable device 100 includes the forward-facing camera components 102, depth tracking component 104, the adjustment mechanism 126, the audio port 110, and the port 112. The head-wearable device 100 also includes multiple interconnects and flexible circuit boards to interconnect the components and control circuitry of the head-wearable device 100.

FIG. 2B shows another front-facing interior view of the head-wearable device 100. As shown in FIG. 2B, each forward-facing camera component 102 includes a first type of camera 212 and a second type of camera 214. In some embodiments, the first type of camera 212 is a color camera (e.g., an RGB camera) and the second type of camera 214 is a monochrome camera. In some embodiments, the cameras 212 and/or 214 are configured for object tracking (e.g., tracking a user's hands). In some embodiments, the cameras 212 and/or 214 are configured to provide stereoscopic depth information. As shown in FIG. 2B, the head-wearable device 100 includes a cooling component 220 (e.g., a fan).

Figure 3A:
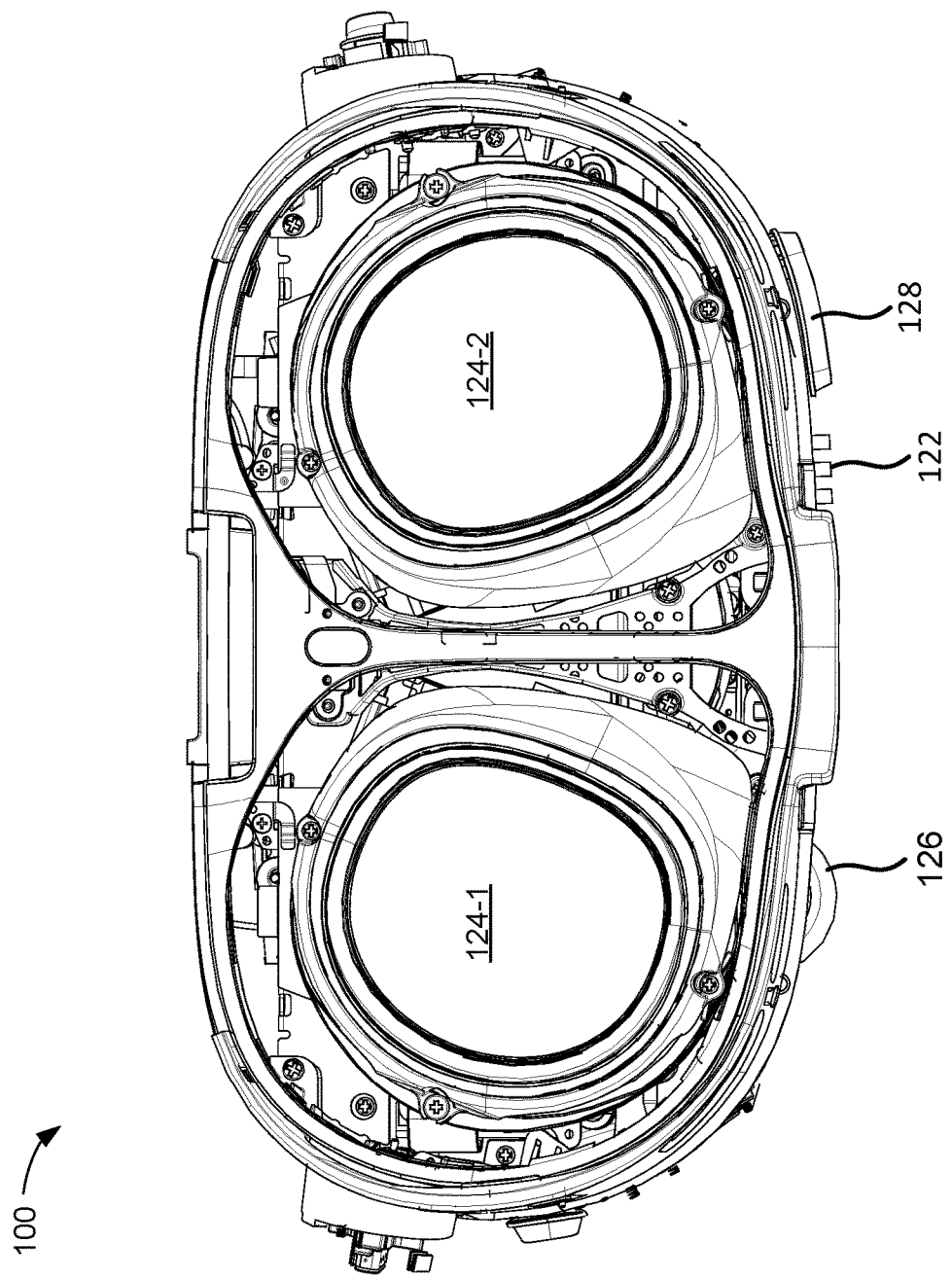
FIGS. 3A-3B illustrate rear-facing interior views of the example head-wearable device of FIGS. 1A-1H in accordance with some embodiments.
Figure 3B:
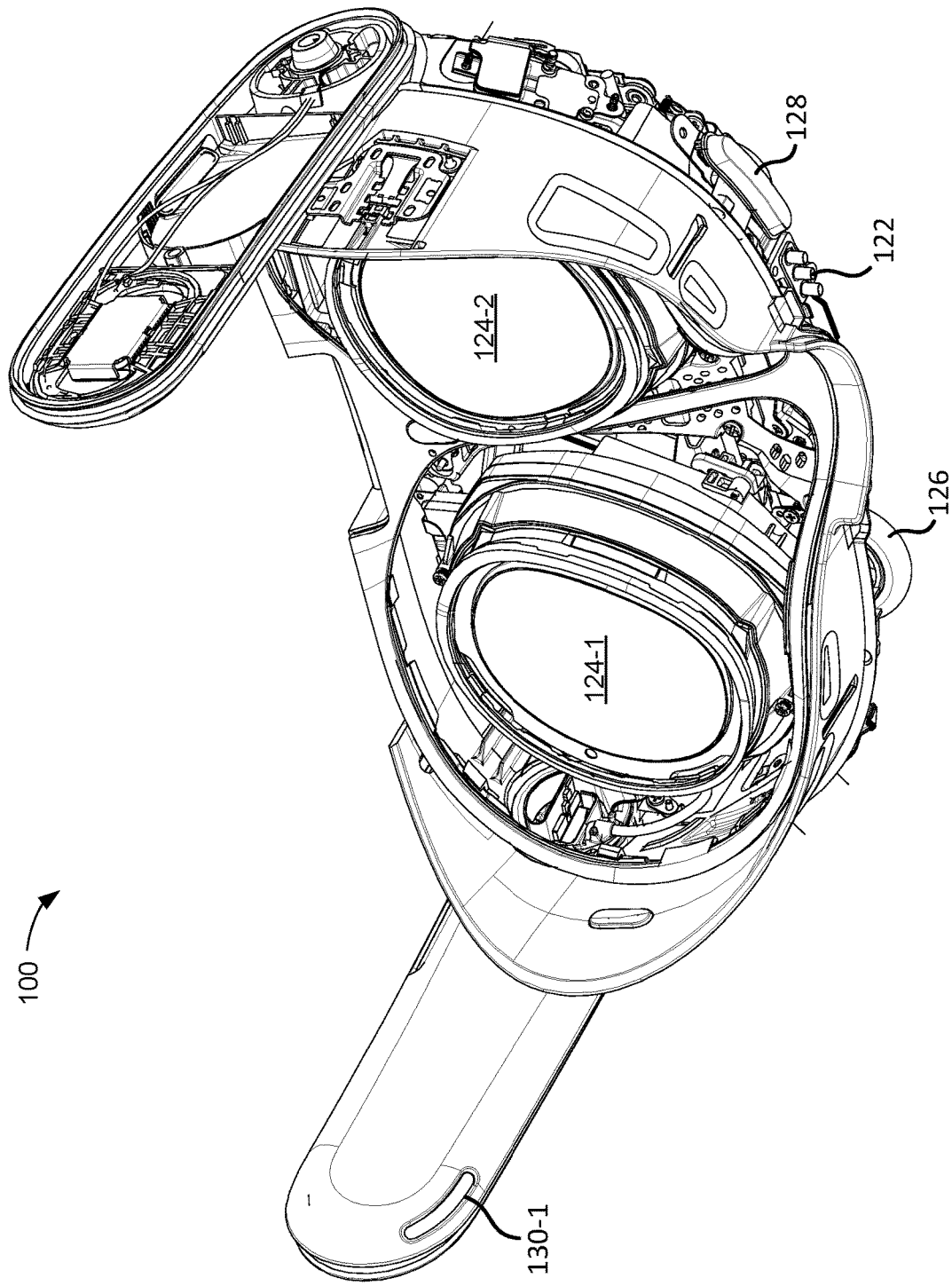

FIGS. 3A-3B illustrate rear-facing (e.g., user-facing) interior views of the head-wearable device 100 in accordance with some embodiments. FIG. 3A shows a rear-facing view of the head-wearable device 100 with a housing removed. As shown in FIG. 3A, the head-wearable device 100 includes the lenses 124, the adjustment mechanism 126, the volume button 128, and the power connector 122. FIG. 3B shows another front-facing interior view of the head-wearable device 100. As shown in FIG. 3B, the head-wearable device 100 includes the speaker 130-1, the lenses 124, the adjustment mechanism 126, the power connector 122, and the volume button 128.

Figure 4:
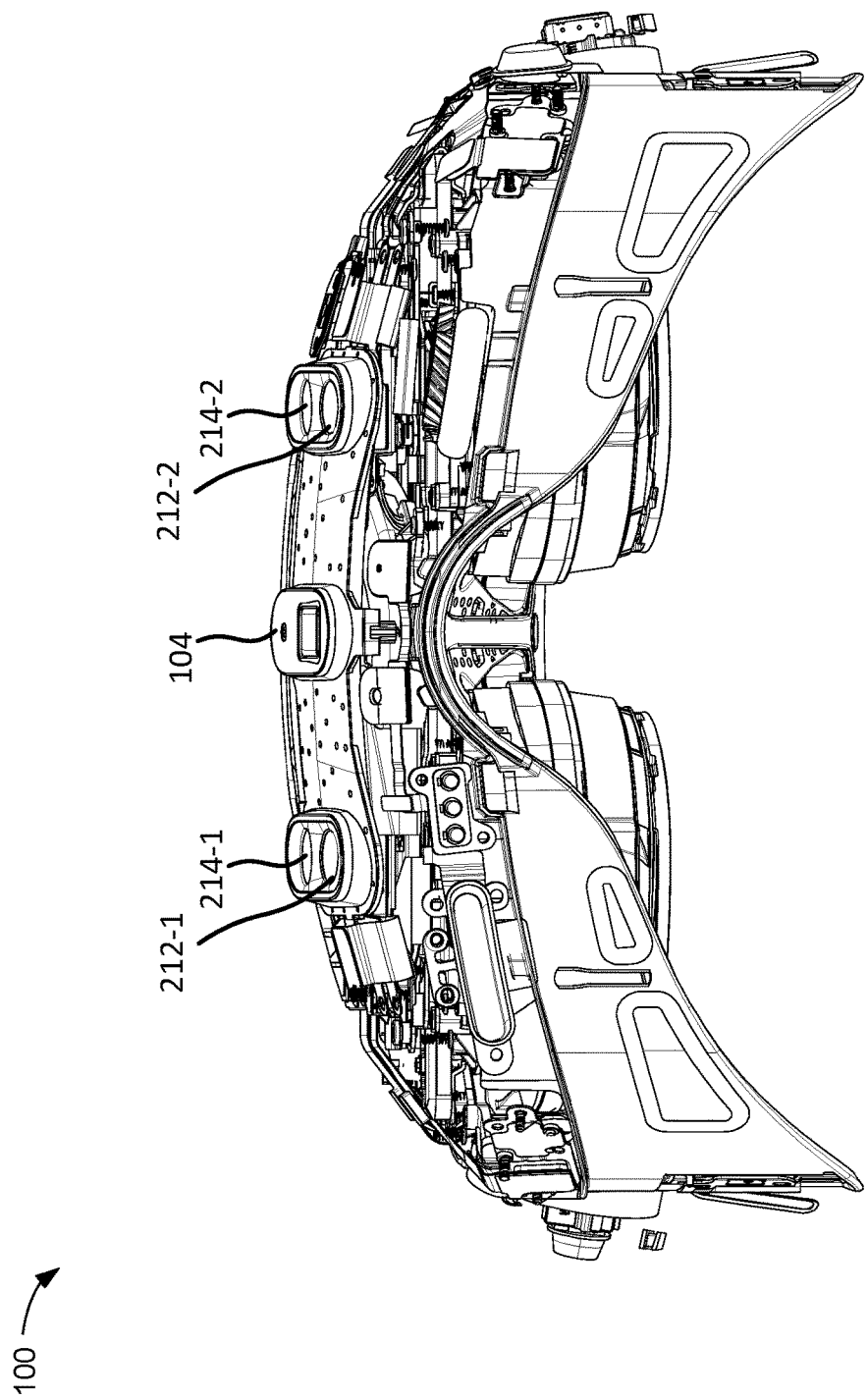
FIG. 4 illustrates a top-down interior view of the example head-wearable device of FIGS. 1A-1H in accordance with some embodiments.

FIG. 4 illustrates a top-down interior view of the head-wearable device 100 in accordance with some embodiments. As shown in FIG. 4, the head-wearable device 100 includes the depth tracking component 104, the first type of cameras 212 and the second type of cameras 214. In some embodiments, the head-wearable device 100 includes a system on chip (SoC) configured for use with artificial reality (AR). In some embodiments, the SoC is configured to manage the forward-facing camera components 102 and/or the depth tracking component 104. In some embodiments, the SoC is configured for use with augmented (mixed) reality. In some embodiments, the SoC is configured to wirelessly couple (e.g., via 3G, LTE, and/or 5G protocols) the head-wearable device 100 to one or more remote devices (e.g., computers, wearable devices, and/or controllers). In some embodiments, the SoC is configured to be responsive to voice commands and/or audio context (e.g., a doorbell ringing and/or a baby crying). In some embodiments, the head-wearable device 100 includes a battery. In some embodiments, the head-wearable device 100 includes memory (e.g., a 512-gigabyte solid-state drive (SSD)). In some embodiments, the head-wearable device 100 includes random access memory (RAM) (e.g., 12-gigabyte RAM).

In some embodiments, the head-wearable device 100 is configured for cloud AR. For example, a computing device (e.g., a dongle) coupled to the head-wearable device 100 receives a stream of AR data from a remote device and transmits the AR data to the head-wearable device 100 for presentation to (and interaction with) a user. In some embodiments, the computing device is mechanically-coupled to the head-wearable device 100 (e.g., via the port 112). In some embodiments, the head-wearable device 100 is configured to receive a stream of AR data from a remote device (e.g., via a 5G and/or Wi-Fi connection).

Figure 5A:
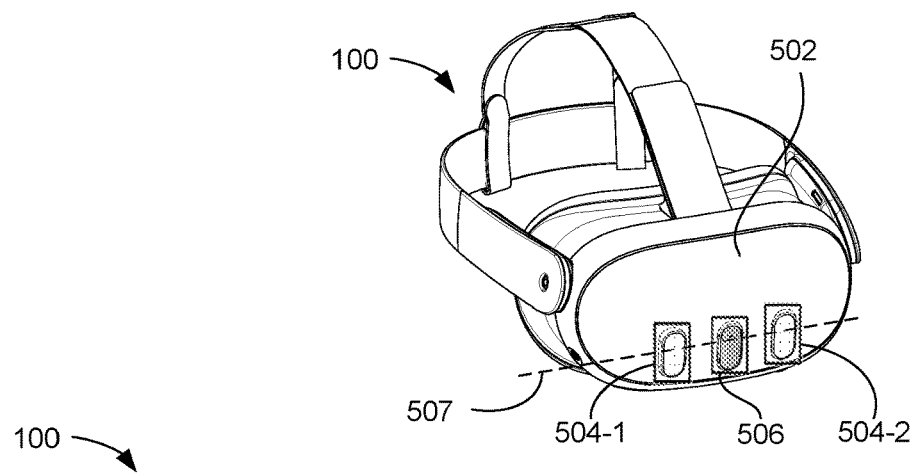
FIGS. 5A-5C illustrate sets of components distributed arranged along a front-facing outer surface of the example head-wearable device of FIGS. 1A-1H in accordance with some embodiments.
Figure 5B:
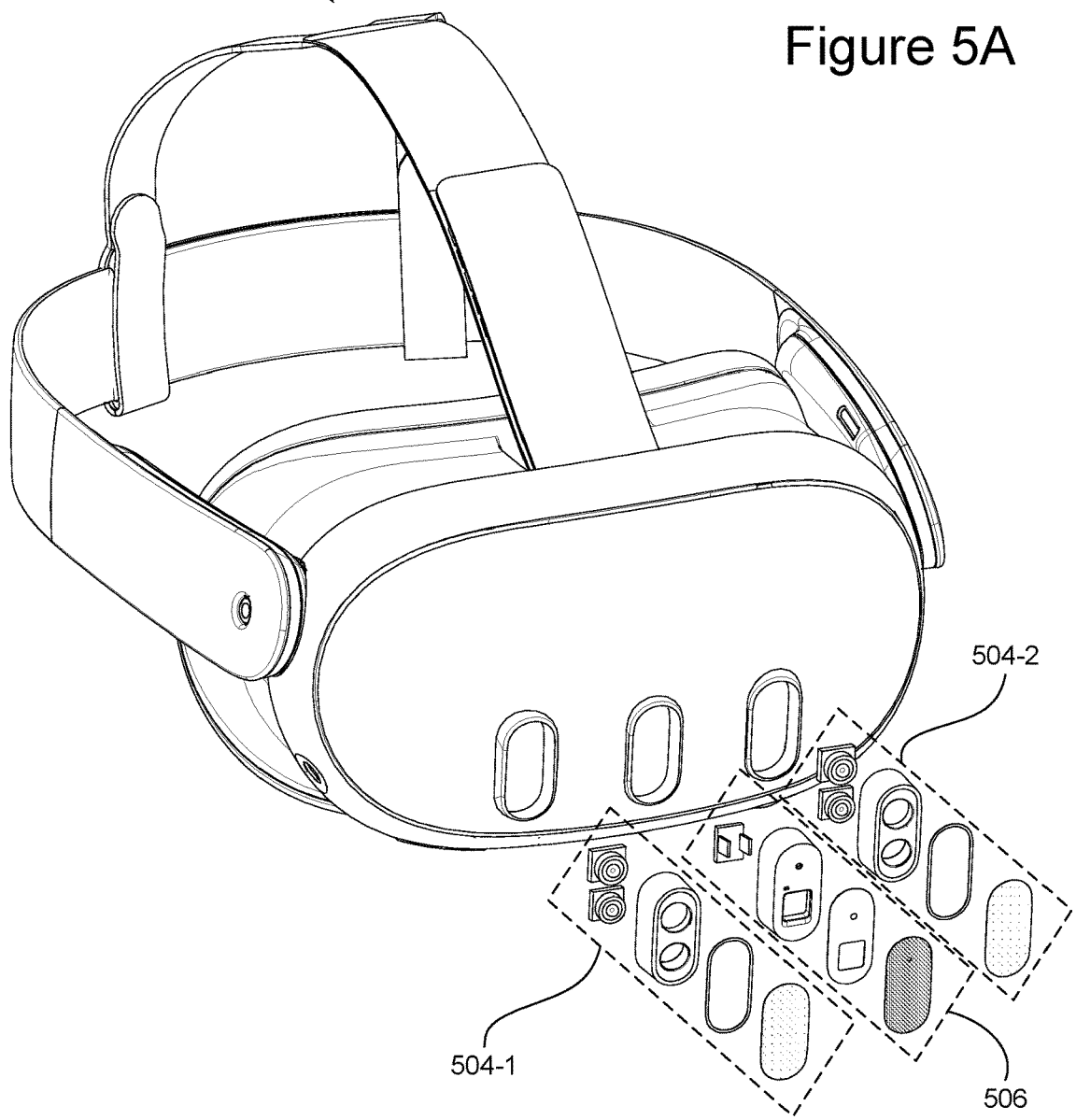
Figure 5C:
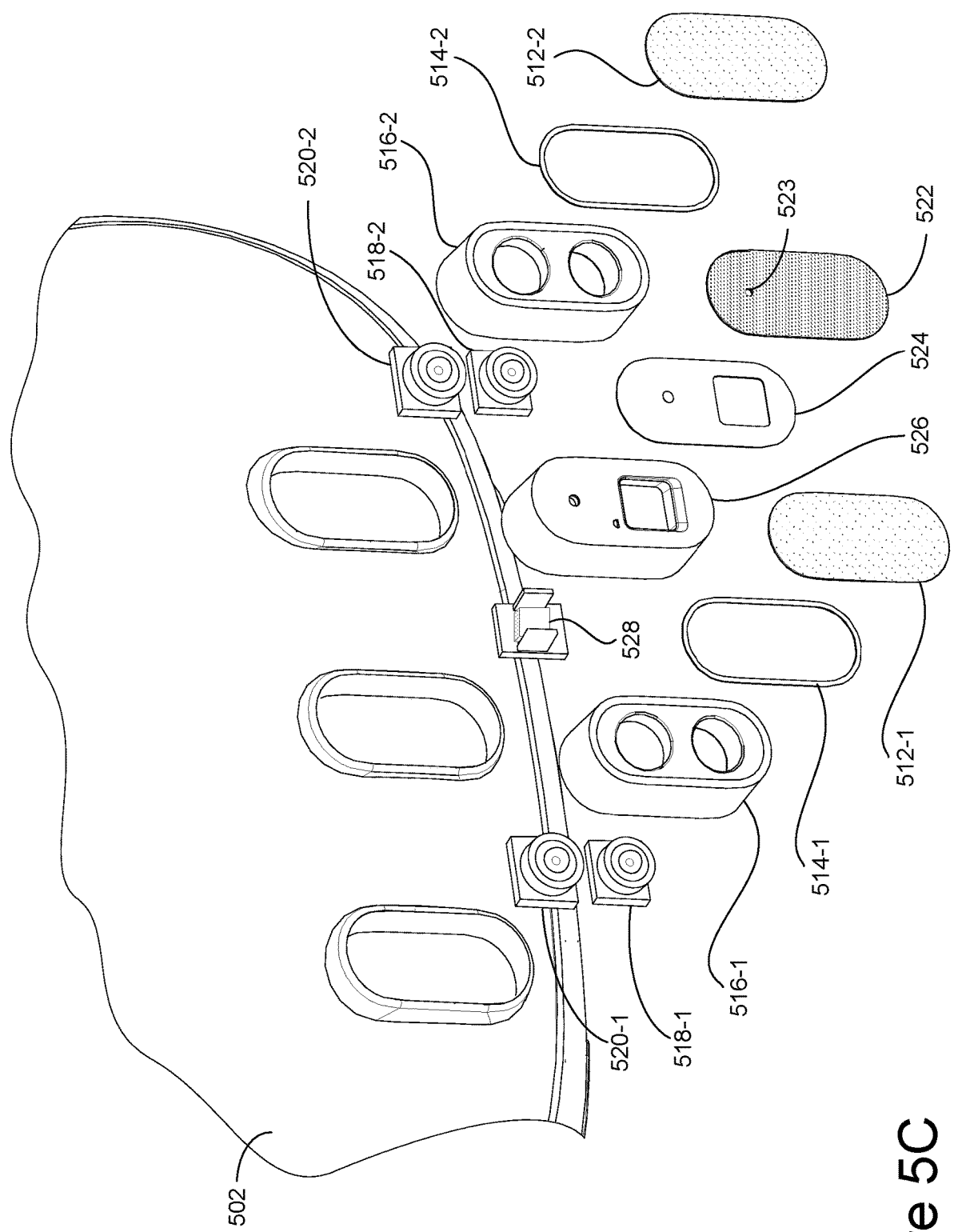

FIGS. 5A-5C illustrate sets of components distributed arranged along a front-facing outer surface 502 of the head-wearable device 100 in accordance with some embodiments. The particular head-wearable device 100 described with respect to 5A-5C may include the same constituent components as the head-wearable device 100 described with respect to 1A-1H, but certain aspects of the head-wearable device 100 may be described with different terminology with respect to FIGS. 5A-5C, for explanatory purposes.

FIG. 5A shows the head-wearable device 100 including a front-facing outer surface 502. In some embodiments, the front-facing outer surface 502 is composed of a plastic material. In some embodiments, the front-facing outer surface 502 is a single, integrated surface. In some embodiments, the front-facing outer surface 502 is curved (e.g., curved to follow a curvature of a human head). In some embodiments, the front-facing outer surface 502 includes apertures for other respective front-facing components (e.g., a set of components 504 and/or a set of components 506). The head-wearable device 100 in FIG. 5A includes the set of components 504 (including components 504-1 and 504-2) arranged along a dimension 507 (e.g., a lateral dimension) of the front-facing outer surface 502, in accordance with some embodiments. In some embodiments, the corresponding components 504-1 and 504-2 of the set of components 504 are instances of the forward-facing camera components 102-1 and 102-2 described with respect to FIGS. 1A-1H. The head-wearable device 100 includes a set of components 506 arranged along the front-facing outer surface 502 (e.g., along the dimension 507). In some embodiments, the sets of components 504 and/or 506 may be placed along the front-facing surface 502 such that they have a particular overlap of respective fields of view of the sensors. In some embodiments, the corresponding component 506 of the set of components is an instance of the depth tracking component 104 described with respect to FIGS. 1A-1H.

As described in greater detail below, each set of components can include one or more components (e.g., including sensors, control circuitry, interconnects, mounts, and/or cover windows). As shown in FIG. 5A, some or all of the sets of components on the front-facing outer surface 502 may include a corresponding cover window for protecting respective sensors and/or other devices of the corresponding sets of components. The cover windows described herein may include respective stacks of material layers (e.g., a cover window stack 601 (e.g., configured for a camera component), and a cover window stack 603 (e.g., configured for a projector component)).

FIGS. 5B and 5C are exploded views of portions of the head-wearable device 100 illustrating constituent components of the sets of components 504 and 506. As shown in FIG. 5C, each component (e.g., 504-1 and 504-2) of the set of components 504 includes a respective cover window 512 (e.g., 512-1 and 512-2) of a first type (e.g., including the cover window stack 601 as described with respect to FIG. 6A). The respective components of the set of components 504 also include respective sets of sensors, including imaging sensors 518-1 and 518-2, and 520-1 and 520-2. In accordance with some embodiments, the imaging sensor 518 is a monochrome sensor (e.g., a monochrome camera), and the imaging sensor 520 is a color imaging sensor (e.g., an RGB camera) configured to provide color passthrough of a user's physical surroundings (e.g., while the user is engaging with an artificial-reality environment). In accordance with some embodiments, each of the respective imaging sensors 518 and 520 are stacked along a vertical plane that is substantially perpendicular (e.g., within 5, 10, or 15 degrees of being perpendicular) to the dimension 507. In some embodiments, the cover windows 512 are glass cover windows (e.g., with one or more additional layers as described in greater detail below).

In some embodiments, the set of components 506 includes a depth tracking component 528 (e.g., a projector) configured to perform depth-tracking operations at the head-wearable device 100. In some embodiments, the depth tracking component 528 is an instance of the depth tracking component 104 described with respect to FIGS. 1A-1H. In some embodiments, the depth tracking component 528 projects structured light onto an object (e.g., a controller 1400) and the structured light reflects back to the one or more of the imaging sensors 518 and 520. In some embodiments, a respective component of the set of components 506 includes a cover window 522 of a second type. In some embodiments, the cover window 522 includes an anti-reflective coating (e.g., the anti-reflection material 658 as shown in FIG. 6B) that is configured to prevent reflection of the projected structured light back towards the depth tracking component 528. In some embodiments, the cover window 522 defines an aperture 523 that is configured to receive audio input from the physical surroundings of the head-wearable device 100 (e.g., a voice command from a wearer of the head-wearable device 100 for causing operations to adjust artificial-reality content being presented to the wearer by the head-wearable device 100).

The sets of components 504 and 506 also include respective component mounts, including the component mounts 516-1 and 516-2 for the set of components 504 and the component mount 526 for the set of components 506. In some embodiments, the component mounts 516-1 and 516-2 are configured to mount the imaging sensors 518 and 520 to the front-facing outer surface 502. In some embodiments, the component mounts 516 are composed of a pliable material (e.g., rubber or other type of elastomer). In some embodiments, the component mounts 516 are composed of a glass-filled plastic material. The component mounts 516 have a first side having a front-facing surface, where the front-facing surface is configured to couple to adhesive layer 514-1 and 514-2. In accordance with some embodiments, the adhesive layers 514-1 and 514-2 are configured to couple the respective cover windows 512-1 and 512-2 to the respective sensor mounts 516-1 and 516-2 (e.g., without interfering with a field of view of the image sensors 518 and 520). The component mount 526 includes an aperture shaped to receive a portion of the depth tracking component 528, and a first side having a front-facing surface that is configured to couple to adhesive layer 524. In some embodiments, the adhesive layer 524 is configured to couple the cover window 522 to the component mount 526. In some embodiments, the cover window 522 is a glass cover window (e.g., with one or more additional layers as described in greater detail below).

Figure 6A:
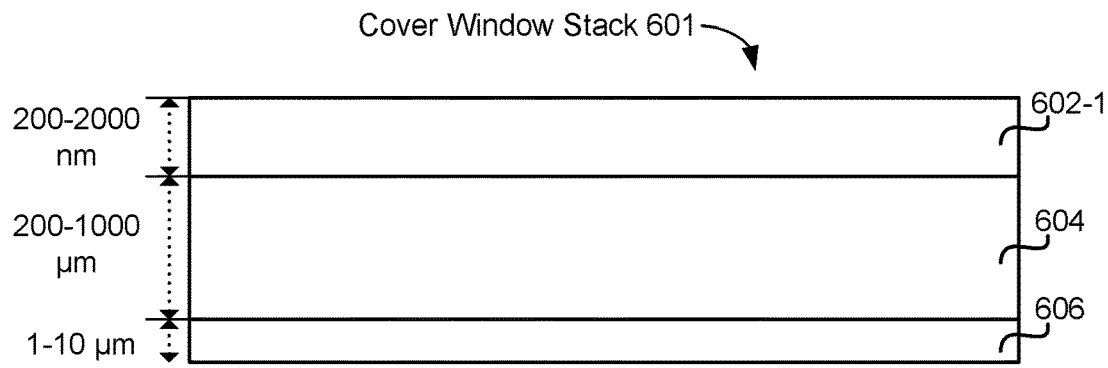
FIGS. 6A and 6B illustrate stacks of material layers for respective cover windows for use on a front-facing surface of the example head-wearable device of FIGS. 1A-1H in accordance with some embodiments.
Figure 6B:
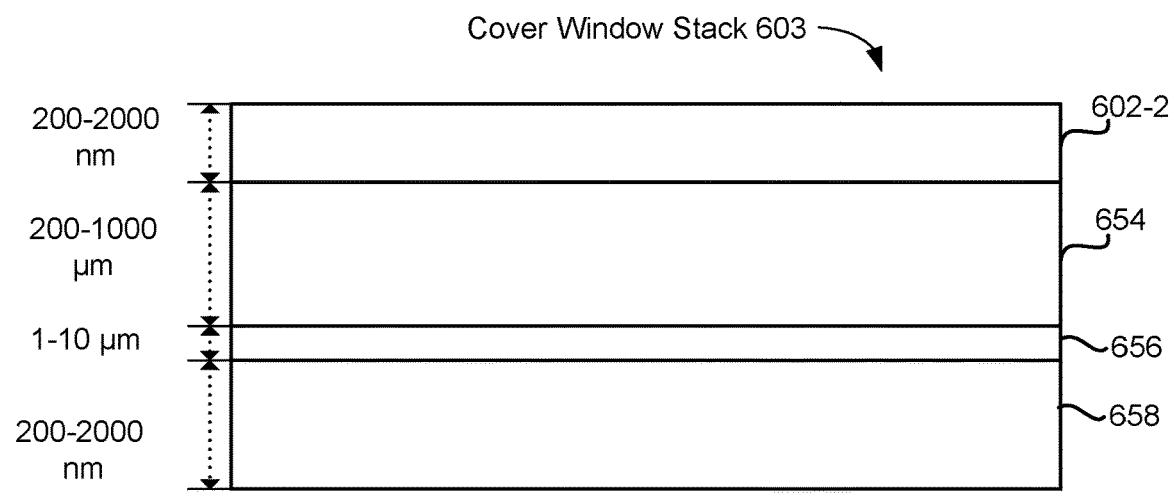

FIGS. 6A and 6B illustrate stacks of material layers for respective cover windows (e.g., cover window stacks 601 and 603 corresponding to the cover windows 512 and 522, respectively), in accordance with some embodiments. In some embodiments, the stacks of material layers are used for a front-facing surface of the head-wearable device 100 (e.g., covering components on the front-facing outer surface 502 shown in FIGS. 5A to 5C). In some embodiments, the stacks of material layers form cover windows for covering sensors for use by a head-wearable device 100 (e.g., while it is facilitating a user's interactions with an artificial-reality environment (e.g., corresponding to AR system 700*c*)). In some embodiments, one or more of the cover windows described below are configured to be used to cover sensors for tracking one or more handheld controllers 1400 that the user is using to cause operations to be performed to adjust the artificial-reality environment being presented by the head-wearable device 100.

FIG. 6A illustrates a stack of material layers for the example cover window stack 601 (e.g., corresponding to a first type of cover window, such as the cover windows 512). FIG. 6B illustrates a stack of material layers for a cover window stack 603 (e.g., corresponding to a second type of cover window). In accordance with some embodiments, each of the cover window stacks 601 and 603 are configured to operate with different types of sensors. For example, the cover window stack 601 is configured for use with one or more image sensor (e.g., camera, thermal, etc.) components and the cover window stack 603 is configured for use with one or more depth tracking components (e.g., the projector 528).

The cover window stacks 601 and 603 each include an anti-reflective material 602 (e.g., configured to prevent reflection of light of a particular range of wavelengths). In some embodiments, the anti-reflective material 602-1 and the anti-reflective material 602-2 are instances of the same anti-reflective material (e.g., are composed of the same materials and have the same thicknesses). In some embodiments, the anti-reflective material 602-1 is distinct from the anti-reflective material 602-2 (e.g., includes a different material and/or has a different thickness). In some embodiments, the anti-reflective materials 602-1 and 602-2 are adapted to prevent reflections of light with wavelengths that correspond to operating wavelengths of components coupled to (e.g., covered by) the cover window stacks 601 and 603. In some embodiments, each anti-reflective material 602 has a thickness in the range of 400 to 600 nm (e.g., 450-500 nm).

The cover window stack 601 includes a glass layer 604 (e.g., a damage-resistant glass, such as an alkali aluminosilicate glass material). In some embodiments, the glass material 604 has a thickness in the range of 200 to 1000 microns (μm) (e.g., greater than 250 μm, 300 μm, 400 μm, etc.). The cover window stack 601 also includes one or more ink layers 606. In some embodiments, the one or more ink layers 606 includes a first ink layer on the glass layer 604. In some embodiments, the first ink layer is a black ink. In some embodiments, the first ink layer has a thickness in the range of 3 to 6 μm. In some embodiments, the first ink layer is adapted to manipulate (e.g., reflect and/or refract) visible light and/or infrared (IR) light. In some embodiments, the one or more ink layers include a second ink layer on the first ink layer. In some embodiments, the second ink layer is a black ink. In some embodiments, the second ink layer has a thickness in the range of 4 to 7 μm. In some embodiments, the second ink layer is adapted to manipulate visible light and/or infrared (IR) light.

The cover window stack 603 includes a glass layer 654 (e.g., a damage-resistant glass, such as an alkali aluminosilicate glass material). In some embodiments, the glass material 654 has a thickness in the range of 200 to 500 μm (e.g., 250-400 μm). The cover window stack 603 also includes one or more ink layers 656. In some embodiments, the one or more ink layers 656 include an IR ink. In some embodiments, the one or more ink layers 656 have a thickness in the range of 1 to 10 μm (e.g., 3-6 μm). As an example, the one or more ink layers 656 may be configured to allow transmission of infrared light (e.g., block light that is in the ultraviolet or visible range). The cover window stack 603 also includes an anti-reflection material 658. In some embodiments, the anti-reflective material 658 is composed of one or more different materials than the anti-reflective material 602. In some embodiments, the one or more layers of the anti-reflective material 658 are configured to reflect structured light projected towards objects (e.g., the controller 1400) from the depth tracking component 528, such that the structured light is not reflected back to the depth tracking component 528 by the cover window stack 603.

In some embodiments, the glass layers 604 and 654 are produced using distinct manufacturing processes (e.g., defining an opening in the glass layer 654 and not in the glass layer 604, as illustrated by the aperture 523 defined by the cover window 522 in FIG. 5C). For example, a process of manufacturing the glass layer 654 may include defining an opening in a first position of the glass layer (e.g., corresponding to a position of a microphone in the head-wearable device 100 for receiving audio input from the physical surroundings of the head-wearable device 100 (e.g., a voice command by the wearer of the head-wearable device 100)).

In some embodiments, the anti-reflective material 602 and/or the anti-reflective material 658 is composed of individual alternating layers of material. For example, the respective anti-reflective materials 602-1 and 602-2 may be composed of alternating layers of Silicon dioxide (SiO2) and Silicon nitride (Si3N4), and the anti-reflective material 658 may be comprised of alternating layers of SiO2 and Titanium oxide (TiO2). In some embodiment, each layer of SiO2 has a thickness between 10 nm and 120 nm. In some embodiments, each layer of Si3N4 has a thickness between 5 nm and 100 nm. In some embodiments, each layer of TiO2 has a thickness between 5 nm and 90 nm. In some embodiments, the anti-reflective material 602 consists of non-metallic materials, and the anti-reflective material 658 is composed of at least one layer of metallic material (e.g., TiO2). In some embodiments, each of the anti-reflective materials 602 and 658 include a layer of SiO2 disposed on a particular side of the respective anti-reflective materials 602 and 658 having a thickness of at least 90 nm.

In accordance with some embodiments, particular manufacturing processes are provided for forming the cover window stacks 601 and 603. For example, in one example embodiment for forming the cover window stack 601, a layer of alkali aluminosilicate glass material (e.g., gorilla glass) is scribed into desired resulting shapes of the respective cover windows (e.g., fifteen cover window glass layers 604 and/or 654 may be formed from the layer of alkali aluminosilicate glass material). In some embodiments, a laser cutting operation is performed to separate the individual glass layers from the layer of glass material. In some embodiments, forming the cover window stack 603 further includes a laser cutting operation to define an audio output hole in the respective cover window glass layer.

In some embodiments, chemical strengthening is applied to the cover windows and a cleaning and quality-checking step is subsequently performed. In accordance with some embodiments, layers 606 and 608 of particular inks (e.g., black inks) are applied to respective first sides of the cover window glass layers 604 of the cover window stacks 601. In an alternative process for forming the cover window stacks 603, layers 656 of IR ink are applied to respective first sides of the cover window glass layers 654 of the cover window stacks 603.

In some embodiments, another cleaning step is performed before application (e.g., via ion sputtering) of the anti-reflective coating 602 to a second side of the respective glass layers 604 and 654. In some embodiments, an additional layer of the second type of anti-reflective coating 658 is applied to the first side (e.g., via an evaporation process) of the glass layer 654 (e.g., on top of the layer of IR ink). In accordance with some embodiments, a final cleaning step is performed before packing the formed cover window stacks 601 and 603 into respective packaging elements that include the respective adhesive layers 514 and 524 that are used to apply the cover windows 512 and 522 to the respective sets of components 504 and 506.

Example Systems and Devices

The devices described above are further detailed below, including systems, wrist-wearable devices, headset devices, and smart textile-based garments. Specific operations described above may occur as a result of specific hardware, such hardware is described in further detail below. The devices described below are not limiting and features on these devices can be removed or additional features can be added to these devices. The different devices can include one or more analogous hardware components. For brevity, analogous devices and components are described below. Any differences in the devices and components are described below in their respective sections.

As described herein, a processor (e.g., a central processing unit (CPU) or microcontroller unit (MCU)), is an electronic component that is responsible for executing instructions and controlling the operation of an electronic device (e.g., a wrist-wearable device 800, a head-wearable device, an HIPD 1000, a smart textile-based garment 1100, or other computer system). There are various types of processors that may be used interchangeably or specifically required by embodiments described herein. For example, a processor may be (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing and/or customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs. As described herein, a graphics module is a component or software module that is designed to handle graphical operations and/or processes, and can include a hardware module and/or a software module.

As described herein, memory refers to electronic components in a computer or electronic device that store data and instructions for the processor to access and manipulate. The devices described herein can include volatile and non-volatile memory. Examples of memory can include (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware and/or boot loaders); (iii) flash memory, magnetic disk storage devices, optical disk storage devices, other non-volatile solid state storage devices, which can be configured to store data in electronic devices (e.g., universal serial bus (USB) drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, or JSON data). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including (i) a power source, which can be an alternating current (AC) adapter or a direct current (DC) adapter power supply; (ii) a charger input that can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include (i) USB and/or micro-USB interfaces configured for connecting devices to an electronic device; (ii) Bluetooth interfaces configured to allow devices to communicate with each other, including Bluetooth low energy (BLE); (iii) near-field communication (NFC) interfaces configured to be short-range wireless interfaces for operations such as access control; (iv) POGO pins, which may be small, spring-loaded pins configured to provide a charging interface; (v) wireless charging interfaces; (vi) global-position system (GPS) interfaces; (vii) Wi-Fi interfaces for providing a connection between a device and a wireless network; and (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface) and/or the proximity of other devices or objects; and (vii) light sensors (e.g., ToF sensors, infrared light sensors, or visible light sensors), and/or sensors for sensing data from the user or the user's environment. As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and diagnose neuromuscular disorders; (iv) electrooculography (EOG) sensors configured to measure the electrical activity of eye muscles to detect eye movement and diagnose eye disorders.

As described herein, an application stored in memory of an electronic device (e.g., software) includes instructions stored in the memory. Examples of such applications include (i) games; (ii) word processors; (iii) messaging applications; (iv) media-streaming applications; (v) financial applications;

(vi) calendars; (vii) clocks; (viii) web browsers; (ix) social media applications, (x) camera applications, (xi) web-based applications; (xii) health applications; (xiii) artificial-reality (AR) applications, and/or any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, or Bluetooth). In some embodiments, a communication interface can refer to a software layer that enables different software programs to communicate with each other (e.g., application programming interfaces (APIs) and protocols such as HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example AR Systems

Figure 7B:
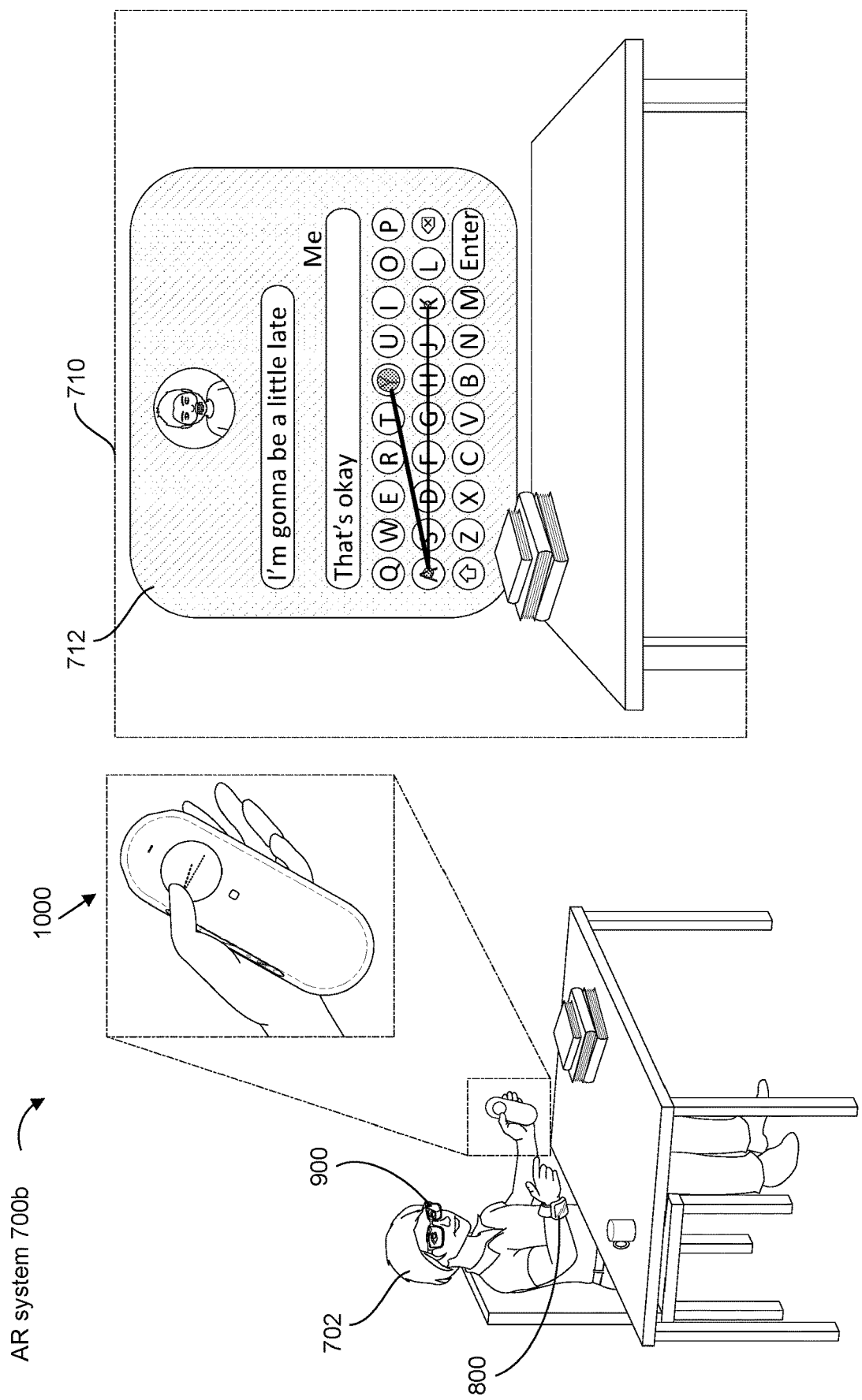
Figures 1, 7C:
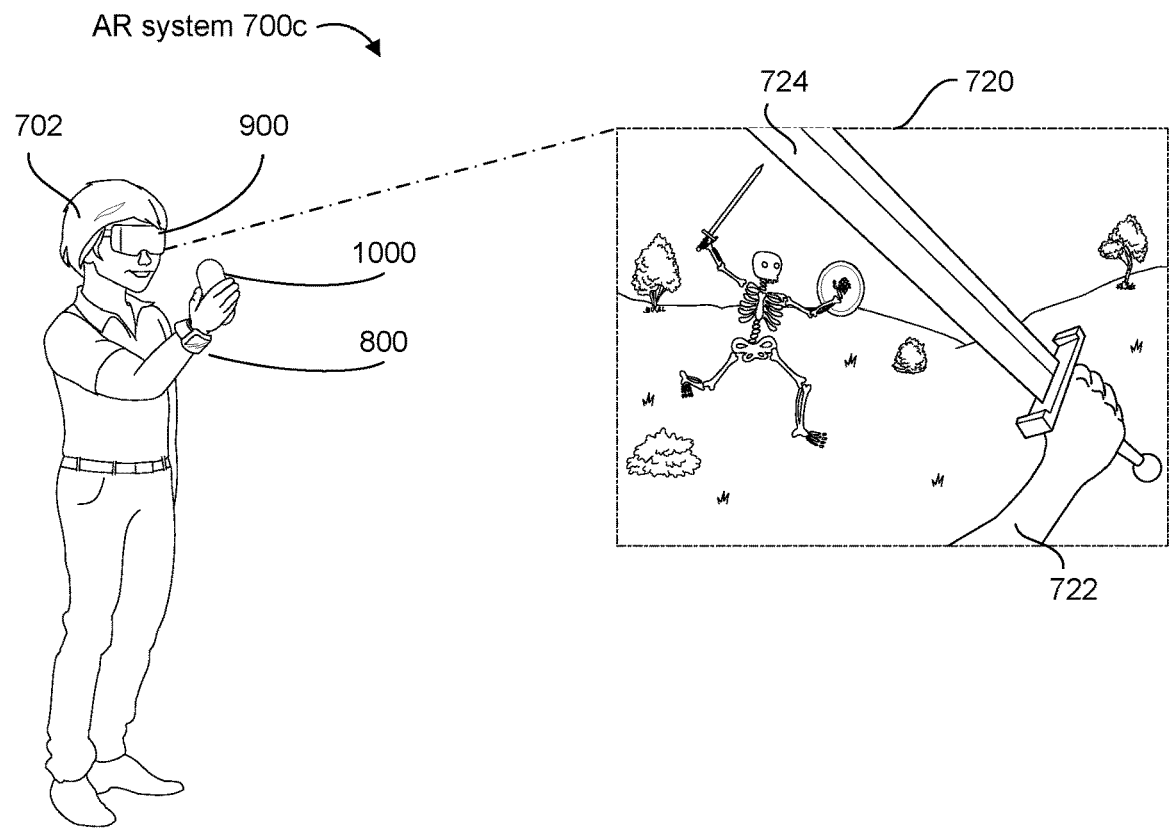
Figures 2, 7C:
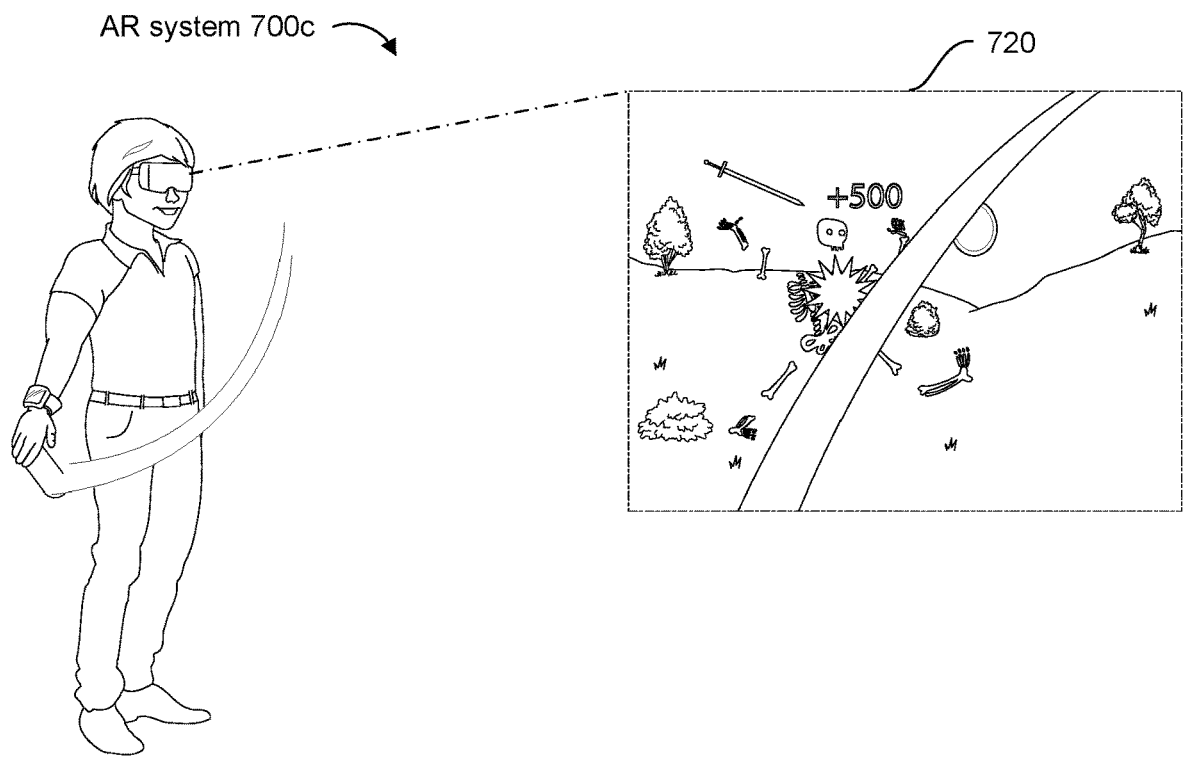
Figures 1, 7D:
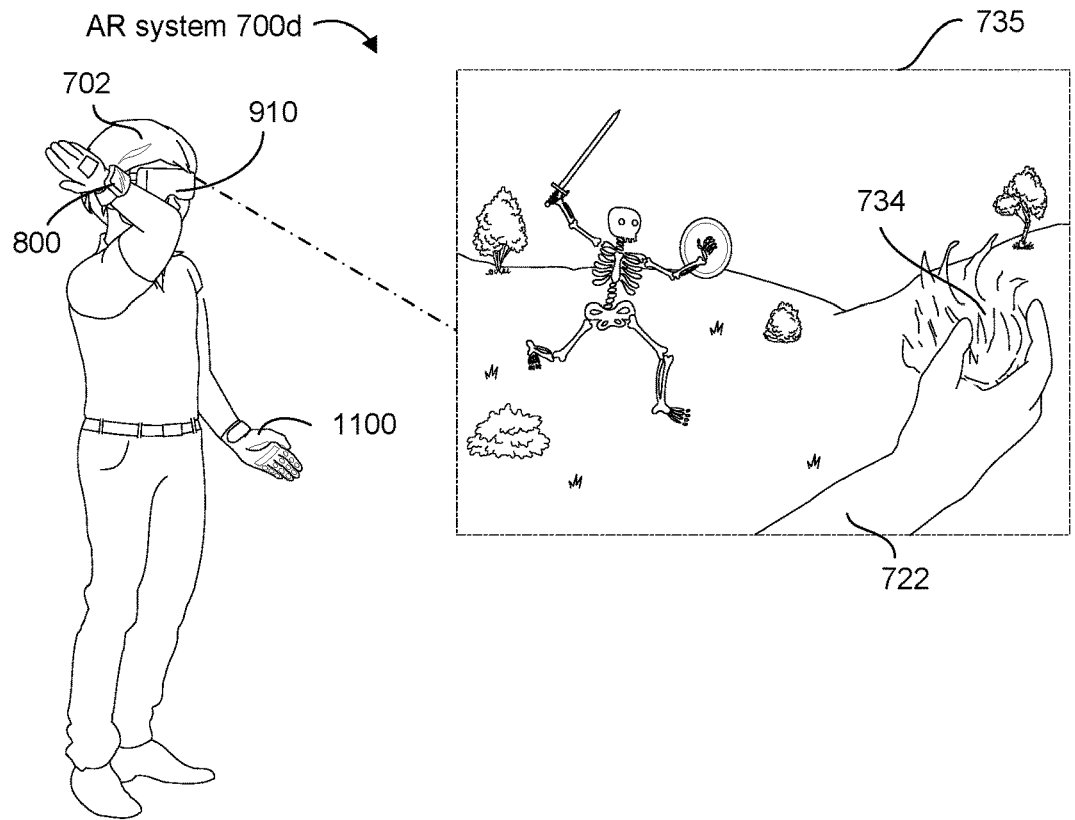
Figures 2, 7D:
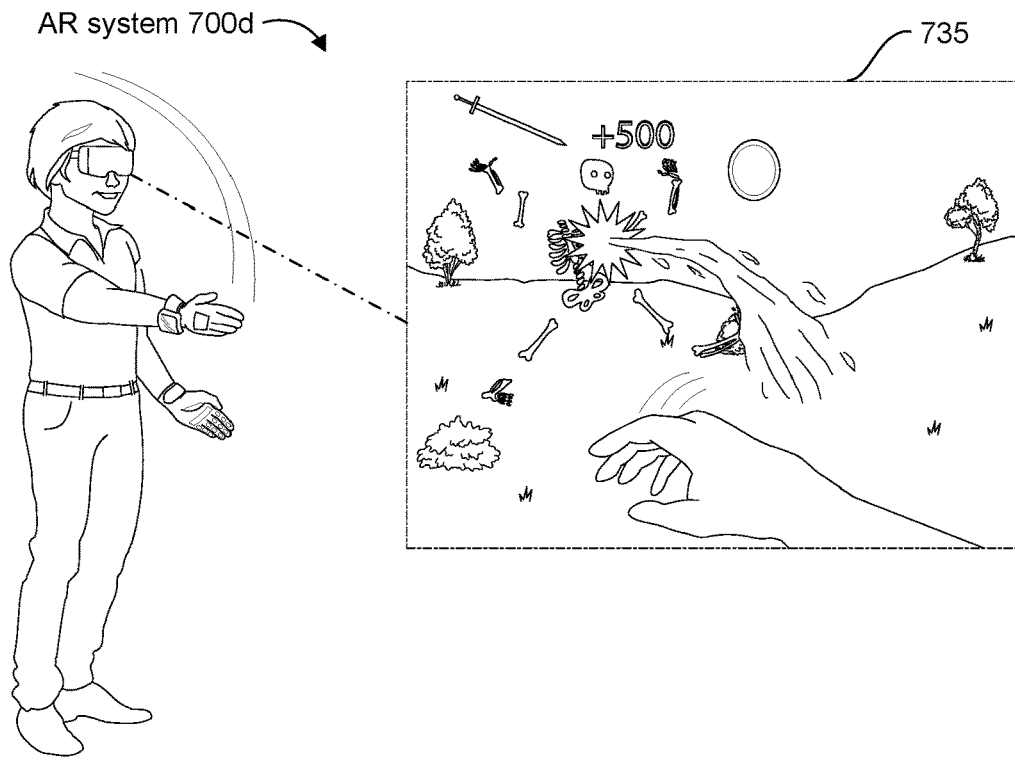

FIGS. 7A, 7B, 7C-1, 7C-2, 7D-1, and 7D-2 illustrate example AR systems, in accordance with some embodiments. FIG. 7A shows a first AR system 700a and first example user interactions using a wrist-wearable device 800, a head-wearable device (e.g., AR device 900), and/or a handheld intermediary processing device (HIPD) 1000. FIG. 7B shows a second AR system 700b and second example user interactions using a wrist-wearable device 800, AR device 900, and/or an HIPD 1000. FIGS. 7C-1 and 7C-2 show a third AR system 700c and third example user interactions using a wrist-wearable device 800, a head-wearable device (e.g., virtual-reality (VR) device 910), and/or an HIPD 1000. FIGS. 7D-1 and 7D-2 show a fourth AR system 700d and fourth example user interactions using a wrist-wearable device 800, VR device 910, and/or a smart textile-based garment 1100 (e.g., wearable gloves, haptic gloves). As the skilled artisan will appreciate upon reading the descriptions provided herein, the above-example AR systems (described in detail below) can perform various functions and/or operations described above with reference to FIGS. 1A to 6B.

The wrist-wearable device 800 and its constituent components are described below in reference to FIGS. 8A-8B, the head-wearable devices and their constituent components are described below in reference to FIGS. 9A-9D, and the HIPD 1000 and its constituent components are described below in reference to FIGS. 10A-10B. The smart textile-based garment 1100 and its one or more components are described below in reference to FIGS. 11A-11C. The wrist-wearable device 800, the head-wearable devices, and/or the HIPD 1000 can communicatively couple via a network 725 (e.g., cellular, near field, Wi-Fi, personal area network, or wireless LAN). Additionally, the wrist-wearable device 800, the head-wearable devices, and/or the HIPD 1000 can also communicatively couple with one or more servers 730, computers 740 (e.g., laptops or computers), mobile devices 750 (e.g., smartphones or tablets), and/or other electronic devices via the network 725 (e.g., cellular, near field, Wi-Fi, personal area network, or wireless LAN). Similarly, the smart textile-based garment 1100, when used, can also communicatively couple with the wrist-wearable device 800, the head-wearable devices, the HIPD 1000, the one or more servers 730, the computers 740, the mobile devices 750, and/or other electronic devices via the network 725.

Turning to FIG. 7A, a user 702 is shown wearing the wrist-wearable device 800 and the AR device 900, and having the HIPD 1000 on their desk. The wrist-wearable device 800, the AR device 900, and the HIPD 1000 facilitate user interaction with an AR environment. In particular, as shown by the first AR system 700a, the wrist-wearable device 800, the AR device 900, and/or the HIPD 1000 cause presentation of one or more avatars 704, digital representations of contacts 706, and virtual objects 708. As discussed below, the user 702 can interact with the one or more avatars 704, digital representations of the contacts 706, and virtual objects 708 via the wrist-wearable device 800, the AR device 900, and/or the HIPD 1000.

The user 702 can use any of the wrist-wearable device 800, the AR device 900, and/or the HIPD 1000 to provide user inputs. For example, the user 702 can perform one or more hand gestures that are detected by the wrist-wearable device 800 (e.g., using one or more EMG sensors and/or IMUs, described below in reference to FIGS. 8A-8B) and/or AR device 900 (e.g., using one or more image sensors or cameras, described below in reference to FIGS. 9A-9B) to provide a user input. Alternatively, or additionally, the user 702 can provide a user input via one or more touch surfaces of the wrist-wearable device 800, the AR device 900, and/or the HIPD 1000, and/or voice commands captured by a microphone of the wrist-wearable device 800, the AR device 900, and/or the HIPD 1000. In some embodiments, the wrist-wearable device 800, the AR device 900, and/or the HIPD 1000 include a digital assistant to help the user in providing a user input (e.g., completing a sequence of operations, suggesting different operations or commands, providing reminders, or confirming a command). In some embodiments, the user 702 can provide a user input via one or more facial gestures and/or facial expressions. For example, cameras of the wrist-wearable device 800, the AR device 900, and/or the HIPD 1000 can track the user 702's eyes for navigating a user interface.

The wrist-wearable device 800, the AR device 900, and/or the HIPD 1000 can operate alone or in conjunction to allow the user 702 to interact with the AR environment. In some embodiments, the HIPD 1000 is configured to operate as a central hub or control center for the wrist-wearable device 800, the AR device 900, and/or another communicatively coupled device. For example, the user 702 can provide an input to interact with the AR environment at any of the wrist-wearable device 800, the AR device 900, and/or the HIPD 1000, and the HIPD 1000 can identify one or more back-end and front-end tasks to cause the performance of the requested interaction and distribute instructions to cause the performance of the one or more back-end and front-end tasks at the wrist-wearable device 800, the AR device 900, and/or the HIPD 1000. In some embodiments, a back-end task is a background-processing task that is not perceptible by the user (e.g., rendering content, decompression, or compression), and a front-end task is a user-facing task that is perceptible to the user (e.g., presenting information to the user or providing feedback to the user). As described below in reference to FIGS. 10A-10B, the HIPD 1000 can perform the back-end tasks and provide the wrist-wearable device 800 and/or the AR device 900 operational data corresponding to the performed back-end tasks such that the wrist-wearable device 800 and/or the AR device 900 can perform the front-end tasks. In this way, the HIPD 1000, which has more computational resources and greater thermal headroom than the wrist-wearable device 800 and/or the AR device 900, performs computationally intensive tasks and reduces the computer resource utilization and/or power usage of the wrist-wearable device 800 and/or the AR device 900.

In the example shown by the first AR system 700a, the HIPD 1000 identifies one or more back-end tasks and front-end tasks associated with a user request to initiate an AR video call with one or more other users (represented by the avatar 704 and the digital representation of the contact 706) and distributes instructions to cause the performance of the one or more back-end tasks and front-end tasks. In particular, the HIPD 1000 performs back-end tasks for processing and/or rendering image data (and other data) associated with the AR video call and provides operational data associated with the performed back-end tasks to the AR device 900 such that the AR device 900 performs front-end tasks for presenting the AR video call (e.g., presenting the avatar 704 and the digital representation of the contact 706).

In some embodiments, the HIPD 1000 can operate as a focal or anchor point for causing the presentation of information. This allows the user 702 to be generally aware of where information is presented. For example, as shown in the first AR system 700a, the avatar 704 and the digital representation of the contact 706 are presented above the HIPD 1000. In particular, the HIPD 1000 and the AR device 900 operate in conjunction to determine a location for presenting the avatar 704 and the digital representation of the contact 706. In some embodiments, information can be presented within a predetermined distance from the HIPD 1000 (e.g., within five meters). For example, as shown in the first AR system 700a, virtual object 708 is presented on the desk some distance from the HIPD 1000. Similar to the above example, the HIPD 1000 and the AR device 900 can operate in conjunction to determine a location for presenting the virtual object 708. Alternatively, in some embodiments, presentation of information is not bound by the HIPD 1000. More specifically, the avatar 704, the digital representation of the contact 706, and the virtual object 708 do not have to be presented within a predetermined distance of the HIPD 1000.

User inputs provided at the wrist-wearable device 800, the AR device 900, and/or the HIPD 1000 are coordinated such that the user can use any device to initiate, continue, and/or complete an operation. For example, the user 702 can provide a user input to the AR device 900 to cause the AR device 900 to present the virtual object 708 and, while the virtual object 708 is presented by the AR device 900, the user 702 can provide one or more hand gestures via the wrist-wearable device 800 to interact and/or manipulate the virtual object 708.

FIG. 7B shows the user 702 wearing the wrist-wearable device 800 and the AR device 900, and holding the HIPD 1000. In the second AR system 700b, the wrist-wearable device 800, the AR device 900, and/or the HIPD 1000 are used to receive and/or provide one or more messages to a contact of the user 702. In particular, the wrist-wearable device 800, the AR device 900, and/or the HIPD 1000 detect and coordinate one or more user inputs to initiate a messaging application and prepare a response to a received message via the messaging application.

In some embodiments, the user 702 initiates, via a user input, an application on the wrist-wearable device 800, the AR device 900, and/or the HIPD 1000 that causes the application to initiate on at least one device. For example, in the second AR system 700b, the user 702 performs a hand gesture associated with a command for initiating a messaging application (represented by messaging user interface 712), the wrist-wearable device 800 detects the hand gesture, and, based on a determination that the user 702 is wearing AR device 900, causes the AR device 900 to present a messaging user interface 712 of the messaging application. The AR device 900 can present the messaging user interface 712 to the user 702 via its display (e.g., as shown by user 702's field of view 710). In some embodiments, the application is initiated and can be run on the device (e.g., the wrist-wearable device 800, the AR device 900, and/or the HIPD 1000) that detects the user input to initiate the application, and the device provides another device operational data to cause the presentation of the messaging application. For example, the wrist-wearable device 800 can detect the user input to initiate a messaging application, initiate and run the messaging application, and provide operational data to the AR device 900 and/or the HIPD 1000 to cause presentation of the messaging application. Alternatively, the application can be initiated and run at a device other than the device that detected the user input. For example, the wrist-wearable device 800 can detect the hand gesture associated with initiating the messaging application and cause the HIPD 1000 to run the messaging application and coordinate the presentation of the messaging application.

Further, the user 702 can provide a user input provided at the wrist-wearable device 800, the AR device 900, and/or the HIPD 1000 to continue and/or complete an operation initiated at another device. For example, after initiating the messaging application via the wrist-wearable device 800 and while the AR device 900 presents the messaging user interface 712, the user 702 can provide an input at the HIPD 1000 to prepare a response (e.g., shown by the swipe gesture performed on the HIPD 1000). The user 702's gestures performed on the HIPD 1000 can be provided and/or displayed on another device. For example, the user 702's swipe gestures performed on the HIPD 1000 are displayed on a virtual keyboard of the messaging user interface 712 displayed by the AR device 900.

In some embodiments, the wrist-wearable device 800, the AR device 900, the HIPD 1000, and/or other communicatively coupled devices can present one or more notifications to the user 702. The notification can be an indication of a new message, an incoming call, an application update, a status update, etc. The user 702 can select the notification via the wrist-wearable device 800, the AR device 900, or the HIPD 1000 and cause presentation of an application or operation associated with the notification on at least one device. For example, the user 702 can receive a notification that a message was received at the wrist-wearable device 800, the AR device 900, the HIPD 1000, and/or other communicatively coupled device and provide a user input at the wrist-wearable device 800, the AR device 900, and/or the HIPD 1000 to review the notification, and the device detecting the user input can cause an application associated with the notification to be initiated and/or presented at the wrist-wearable device 800, the AR device 900, and/or the HIPD 1000.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 900 can present to the user 702 game application data and the HIPD 1000 can use a controller to provide inputs to the game. Similarly, the user 702 can use the wrist-wearable device 800 to initiate a camera of the AR device 900, and the user can use the wrist-wearable device 800, the AR device 900, and/or the HIPD 1000 to manipulate the image capture (e.g., zoom in or out or apply filters) and capture image data.

Turning to FIGS. 7C-1 and 7C-2, the user 702 is shown wearing the wrist-wearable device 800 and a VR device 910, and holding the HIPD 1000. In the third AR system 700c, the wrist-wearable device 800, the VR device 910, and/or the HIPD 1000 are used to interact within an AR environment, such as a VR game or other AR application. While the VR device 910 presents a representation of a VR game (e.g., first AR game environment 720) to the user 702, the wrist-wearable device 800, the VR device 910, and/or the HIPD 1000 detect and coordinate one or more user inputs to allow the user 702 to interact with the VR game.

In some embodiments, the user 702 can provide a user input via the wrist-wearable device 800, the VR device 910, and/or the HIPD 1000 that causes an action in a corresponding AR environment. For example, the user 702 in the third AR system 700c (shown in FIG. 7C-1) raises the HIPD 1000 to prepare for a swing in the first AR game environment 720. The VR device 910, responsive to the user 702 raising the HIPD 1000, causes the AR representation of the user 722 to perform a similar action (e.g., raise a virtual object, such as a virtual sword 724). In some embodiments, each device uses respective sensor data and/or image data to detect the user input and provide an accurate representation of the user 702's motion. For example, image sensors 1054 (e.g., SLAM cameras or other cameras discussed below in FIGS. 10A and 10B) of the HIPD 1000 can be used to detect a position of the 1000 relative to the user 702's body such that the virtual object can be positioned appropriately within the first AR game environment 720; sensor data from the wrist-wearable device 800 can be used to detect a velocity at which the user 702 raises the HIPD 1000 such that the AR representation of the user 722 and the virtual sword 724 are synchronized with the user 702's movements; and image sensors 926 (FIGS. 9A-9C) of the VR device 910 can be used to represent the user 702's body, boundary conditions, or real-world objects within the first AR game environment 720.

In FIG. 7C-2, the user 702 performs a downward swing while holding the HIPD 1000. The user 702's downward swing is detected by the wrist-wearable device 800, the VR device 910, and/or the HIPD 1000 and a corresponding action is performed in the first AR game environment 720. In some embodiments, the data captured by each device is used to improve the user's experience within the AR environment. For example, sensor data of the wrist-wearable device 800 can be used to determine a speed and/or force at which the downward swing is performed and image sensors of the HIPD 1000 and/or the VR device 910 can be used to determine a location of the swing and how it should be represented in the first AR game environment 720, which, in turn, can be used as inputs for the AR environment (e.g., game mechanics, which can use detected speed, force, locations, and/or aspects of the user 702's actions to classify a user's inputs (e.g., user performs a light strike, hard strike, critical strike, glancing strike, miss) or calculate an output (e.g., amount of damage)).

While the wrist-wearable device 800, the VR device 910, and/or the HIPD 1000 are described as detecting user inputs, in some embodiments, user inputs are detected at a single device (with the single device being responsible for distributing signals to the other devices for performing the user input). For example, the HIPD 1000 can operate an application for generating the first AR game environment 720 and provide the VR device 910 with corresponding data for causing the presentation of the first AR game environment 720, as well as detect the 702's movements (while holding the HIPD 1000) to cause the performance of corresponding actions within the first AR game environment 720. Additionally or alternatively, in some embodiments, operational data (e.g., sensor data, image data, application data, device data, and/or other data) of one or more devices is provide to a single device (e.g., the HIPD 1000) to process the operational data and cause respective devices to perform an action associated with processed operational data.

In FIGS. 7D-1 and 7D-2, the user 702 is shown wearing the wrist-wearable device 800, the VR device 910, and smart textile-based garments 1100. In the fourth AR system 700d, the wrist-wearable device 800, the VR device 910, and/or the smart textile-based garments 1100 are used to interact within an AR environment (e.g., any AR system described above in reference to FIGS. 7A-7C-2, as well as FIGS. 1A to 6B). While the VR device 910 presents a representation of a VR game (e.g., second AR game environment 735) to the user 702, the wrist-wearable device 800, the VR device 910, and/or the smart textile-based garments 1100 detect and coordinate one or more user inputs to allow the user 702 to interact with the AR environment.

In some embodiments, the user 702 can provide a user input via the wrist-wearable device 800, the VR device 910, and/or the smart textile-based garments 1100 that causes an action in a corresponding AR environment. For example, the user 702 in the fourth AR system 700d (shown in FIG. 7D-1) raises a hand wearing the smart textile-based garments 1100 to prepare to cast a spell or throw an object within the second AR game environment 735. The VR device 910, responsive to the user 702 holding up their hand (wearing smart textile-based garments 1100), causes the AR representation of the user 722 to perform a similar action (e.g., hold a virtual object or throw a fireball 734). In some embodiments, each device uses respective sensor data and/or image data to detect the user input and provides an accurate representation of the user 702's motion.

In FIG. 7D-2, the user 702 performs a throwing motion while wearing the smart textile-based garment 1100. The user 702's throwing motion is detected by the wrist-wearable device 800, the VR device 910, and/or the smart textile-based garments 1100, and a corresponding action is performed in the second AR game environment 735. As described above, the data captured by each device is used to improve the user's experience within the AR environment. Although not shown, the smart textile-based garments 1100 can be used in conjunction with an VR device 910 and/or an HIPD 1000.

Having discussed example AR systems, devices for interacting with such AR systems, and other computing systems more generally, devices and components will now be discussed in greater detail below. Some definitions of devices and components that can be included in some or all of the example devices discussed below are defined here for ease of reference. A skilled artisan will appreciate that certain types of the components described below may be more suitable for a particular set of devices and less suitable for a different set of devices. But subsequent references to the components defined here should be considered to be encompassed by the definitions provided.

In some embodiments discussed below, example devices and systems, including electronic devices and systems, will be discussed. Such example devices and systems are not intended to be limiting, and one of skill in the art will understand that alternative devices and systems to the example devices and systems described herein may be used to perform the operations and construct the systems and devices that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices and/or a subset of components of one or more electronic devices, which facilitates communication, and/or data processing, and/or data transfer between the respective electronic devices and/or electronic components.

Example Wrist-Wearable Devices

Figure 8A:
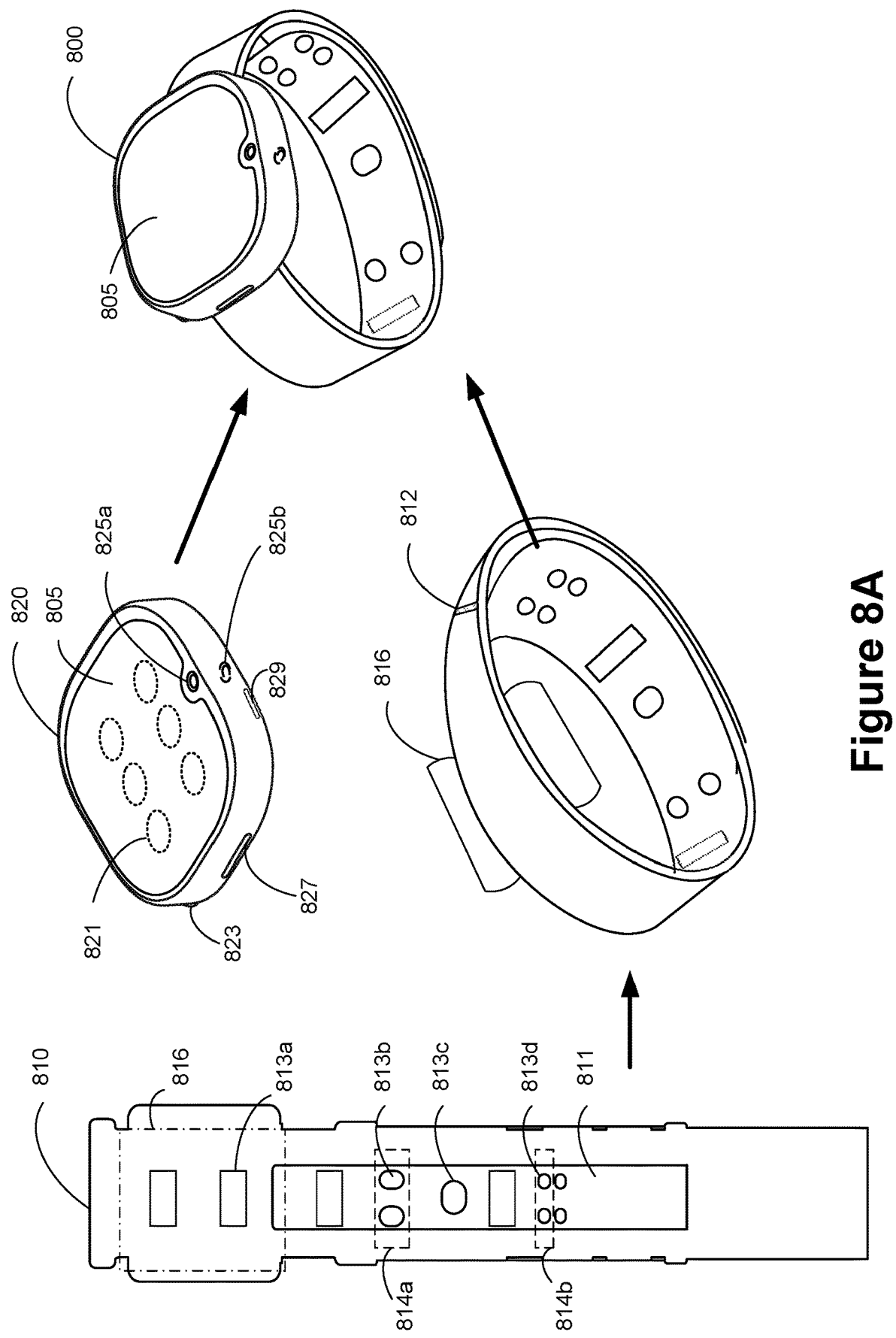
FIGS. 8A-8B illustrate an example wrist-wearable device in accordance with some embodiments.
Figure 8B:
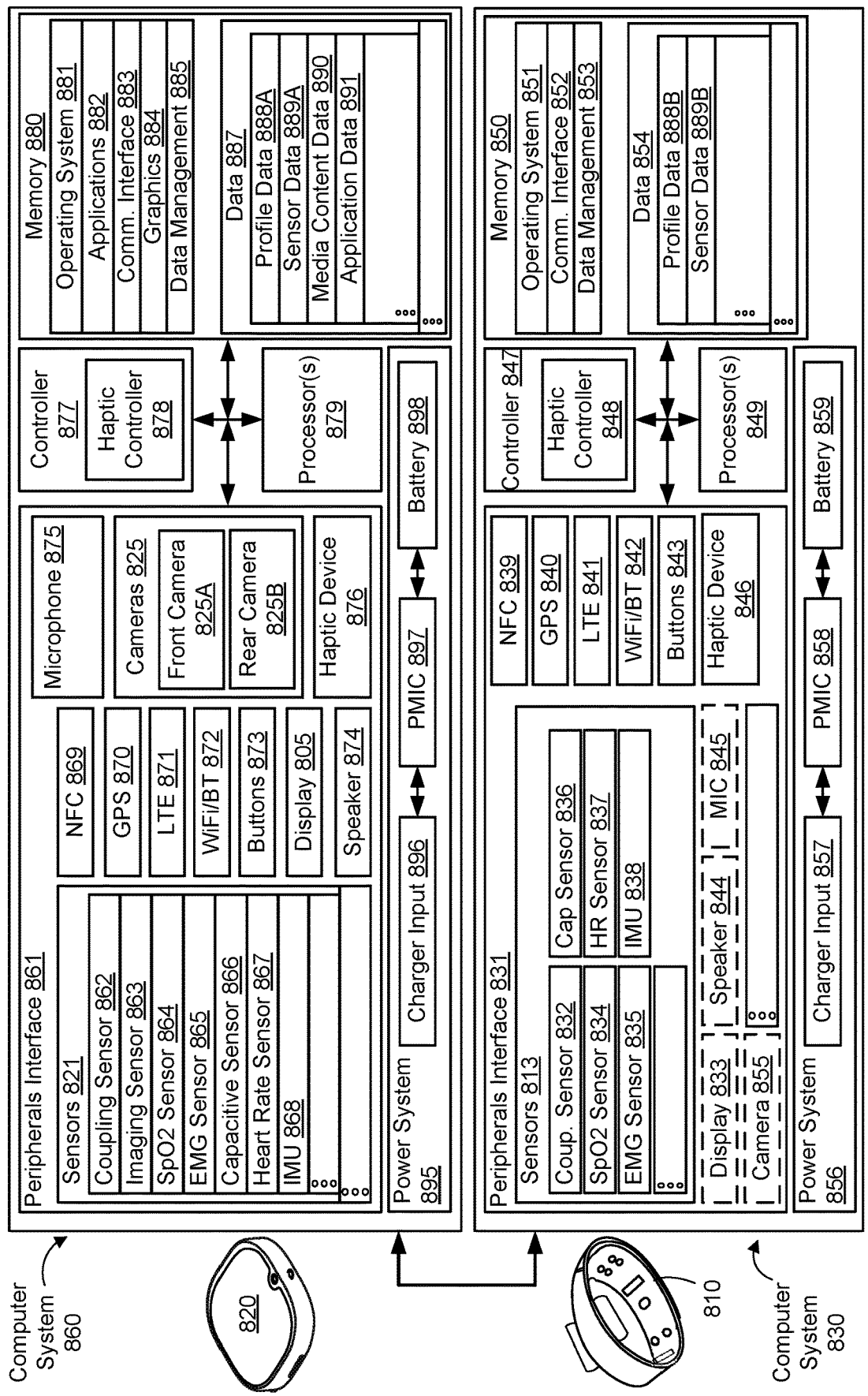

FIGS. 8A and 8B illustrate an example wrist-wearable device 800, in accordance with some embodiments. FIG. 8A illustrates components of the wrist-wearable device 800, which can be used individually or in combination, including combinations that include other electronic devices and/or electronic components.

FIG. 8A shows a wearable band 810 and a watch body 820 (or capsule) being coupled, as discussed below, to form the wrist-wearable device 800. The wrist-wearable device 800 can perform various functions and/or operations associated with navigating through user interfaces and selectively opening applications.

As will be described in more detail below, operations executed by the wrist-wearable device 800 can include (i) presenting content to a user (e.g., displaying visual content via a display 805); (ii) detecting (e.g., sensing) user input (e.g., sensing a touch on peripheral button 823 and/or at a touch screen of the display 805, a hand gesture detected by sensors (e.g., biopotential sensors)); (iii) sensing biometric data via one or more sensors 813 (e.g., neuromuscular signals, heart rate, temperature, or sleep); messaging (e.g., text, speech, or video); image capture via one or more imaging devices or cameras 825; wireless communications (e.g., cellular, near field, Wi-Fi, or personal area network); location determination; financial transactions; providing haptic feedback; alarms; notifications; biometric authentication; health monitoring; and/or sleep monitoring.

The above-example functions can be executed independently in the watch body 820, independently in the wearable band 810, and/or via an electronic communication between the watch body 820 and the wearable band 810. In some embodiments, functions can be executed on the wrist-wearable device 800 while an AR environment is being presented (e.g., via one of the AR systems 700a to 700d). As the skilled artisan will appreciate upon reading the descriptions provided herein, the wearable devices described herein can be used with other types of AR environments.

The wearable band 810 can be configured to be worn by a user such that an inner (or inside) surface of the wearable structure 811 of the wearable band 810 is in contact with the user's skin. When worn by a user, sensors 813 contact the user's skin. The sensors 813 can sense biometric data such as a user's heart rate, saturated oxygen level, temperature, sweat level, neuromuscular-signal sensors, or a combination thereof. The sensors 813 can also sense data about a user's environment, including a user's motion, altitude, location, orientation, gait, acceleration, position, or a combination thereof. In some embodiments, the sensors 813 are configured to track a position and/or motion of the wearable band 810. The one or more sensors 813 can include any of the sensors defined above and/or discussed below with respect to FIG. 8B.

The one or more sensors 813 can be distributed on an inside and/or an outside surface of the wearable band 810. In some embodiments, the one or more sensors 813 are uniformly spaced along the wearable band 810. Alternatively, in some embodiments, the one or more sensors 813 are positioned at distinct points along the wearable band 810. As shown in FIG. 8A, the one or more sensors 813 can be the same or distinct. For example, in some embodiments, the one or more sensors 813 can be shaped as a pill (e.g., sensor 813a), an oval, a circle a square, an oblong (e.g., sensor 813c), and/or any other shape that maintains contact with the user's skin (e.g., such that neuromuscular signal and/or other biometric data can be accurately measured at the user's skin). In some embodiments, the one or more sensors 813 are aligned to form pairs of sensors (e.g., for sensing neuromuscular signals based on differential sensing within each respective sensor). For example, sensor 813b is aligned with an adjacent sensor to form sensor pair 814a, and sensor 813d is aligned with an adjacent sensor to form sensor pair 814b. In some embodiments, the wearable band 810 does not have a sensor pair. Alternatively, in some embodiments, the wearable band 810 has a predetermined number of sensor pairs (one pair of sensors, three pairs of sensors, four pairs of sensors, six pairs of sensors, or sixteen pairs of sensors).

The wearable band 810 can include any suitable number of sensors 813. In some embodiments, the amount and arrangements of sensors 813 depend on the particular application for which the wearable band 810 is used. For instance, a wearable band 810 configured as an armband, wristband, or chest-band may include a plurality of sensors 813 with a different number of sensors 813 and different arrangement for each use case, such as medical use cases, compared to gaming or general day-to-day use cases.

In accordance with some embodiments, the wearable band 810 further includes an electrical ground electrode and a shielding electrode. The electrical ground and shielding electrodes, like the sensors 813, can be distributed on the inside surface of the wearable band 810 such that they contact a portion of the user's skin. For example, the electrical ground and shielding electrodes can be at an inside surface of coupling mechanism 816 or an inside surface of a wearable structure 811. The electrical ground and shielding electrodes can be formed and/or use the same components as the sensors 813. In some embodiments, the wearable band 810 includes more than one electrical ground electrode and more than one shielding electrode.

The sensors 813 can be formed as part of the wearable structure 811 of the wearable band 810. In some embodiments, the sensors 813 are flush or substantially flush with the wearable structure 811 such that they do not extend beyond the surface of the wearable structure 811. While flush with the wearable structure 811, the sensors 813 are still configured to contact the user's skin (e.g., via a skin-contacting surface). Alternatively, in some embodiments, the sensors 813 extend beyond the wearable structure 811 a predetermined distance (e.g., 0.1 mm to 2 mm) to make contact and depress into the user's skin. In some embodiments, the sensors 813 are coupled to an actuator (not shown) configured to adjust an extension height (e.g., a distance from the surface of the wearable structure 811) of the sensors 813 such that the sensors 813 make contact and depress into the user's skin. In some embodiments, the actuators adjust the extension height between 0.01 mm to 1.2 mm. This allows the user to customize the positioning of the sensors 813 to improve the overall comfort of the wearable band 810 when worn while still allowing the sensors 813 to contact the user's skin. In some embodiments, the sensors 813 are indistinguishable from the wearable structure 811 when worn by the user.

The wearable structure 811 can be formed of an elastic material, elastomers, etc., configured to be stretched and fitted to be worn by the user. In some embodiments, the wearable structure 811 is a textile or woven fabric. As described above, the sensors 813 can be formed as part of a wearable structure 811. For example, the sensors 813 can be molded into the wearable structure 811 or be integrated into a woven fabric (e.g., the sensors 813 can be sewn into the fabric and mimic the pliability of fabric (e.g., the sensors 813 can be constructed from a series of woven strands of fabric)).

The wearable structure 811 can include flexible electronic connectors that interconnect the sensors 813, the electronic circuitry, and/or other electronic components (described below in reference to FIG. 8B) that are enclosed in the wearable band 810. In some embodiments, the flexible electronic connectors are configured to interconnect the sensors 813, the electronic circuitry, and/or other electronic components of the wearable band 810 with respective sensors and/or other electronic components of another electronic device (e.g., watch body 820). The flexible electronic connectors are configured to move with the wearable structure 811 such that the user adjustment to the wearable structure 811 (e.g., resizing, pulling, or folding) does not stress or strain the electrical coupling of components of the wearable band 810.

As described above, the wearable band 810 is configured to be worn by a user. In particular, the wearable band 810 can be shaped or otherwise manipulated to be worn by a user. For example, the wearable band 810 can be shaped to have a substantially circular shape such that it can be configured to be worn on the user's lower arm or wrist. Alternatively, the wearable band 810 can be shaped to be worn on another body part of the user, such as the user's upper arm (e.g., around a bicep), forearm, chest, legs, etc. The wearable band 810 can include a retaining mechanism 812 (e.g., a buckle or a hook and loop fastener) for securing the wearable band 810 to the user's wrist or other body part. While the wearable band 810 is worn by the user, the sensors 813 sense data (referred to as sensor data) from the user's skin. In particular, the sensors 813 of the wearable band 810 obtain (e.g., sense and record) neuromuscular signals.

The sensed data (e.g., sensed neuromuscular signals) can be used to detect and/or determine the user's intention to perform certain motor actions. In particular, the sensors 813 sense and record neuromuscular signals from the user as the user performs muscular activations (e.g., movements or gestures). The detected and/or determined motor action (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 805 of the wrist-wearable device 800 and/or can be transmitted to a device responsible for rendering an AR environment (e.g., a head-mounted display) to perform an action in an associated AR environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 813 can be used to provide a user with an enhanced interaction with a physical object (e.g., devices communicatively coupled with the wearable band 810) and/or a virtual object in an AR application generated by an AR system (e.g., user interface objects presented on the display 805 or another computing device (e.g., a smartphone)).

In some embodiments, the wearable band 810 includes one or more haptic devices 846 (FIG. 8B; e.g., a vibratory haptic actuator) that are configured to provide haptic feedback (e.g., a cutaneous and/or kinesthetic sensation) to the user's skin. The sensors 813 and/or the haptic devices 846 can be configured to operate in conjunction with multiple applications including, without limitation, health monitoring, social media, games, and AR (e.g., the applications associated with AR).

The wearable band 810 can also include a coupling mechanism 816 (e.g., a cradle or a shape of the coupling mechanism can correspond to the shape of the watch body 820 of the wrist-wearable device 800) for detachably coupling a capsule (e.g., a computing unit) or watch body 820 (via a coupling surface of the watch body 820) to the wearable band 810. In particular, the coupling mechanism 816 can be configured to receive a coupling surface proximate to the bottom side of the watch body 820 (e.g., a side opposite to a front side of the watch body 820 where the display 805 is located), such that a user can push the watch body 820 downward into the coupling mechanism 816 to attach the watch body 820 to the coupling mechanism 816. In some embodiments, the coupling mechanism 816 can be configured to receive a top side of the watch body 820 (e.g., a side proximate to the front side of the watch body 820 where the display 805 is located) that is pushed upward into the cradle, as opposed to being pushed downward into the coupling mechanism 816. In some embodiments, the coupling mechanism 816 is an integrated component of the wearable band 810 such that the wearable band 810 and the coupling mechanism 816 are a single unitary structure. In some embodiments, the coupling mechanism 816 is a type of frame or shell that allows the watch body 820 coupling surface to be retained within or on the wearable band 810 coupling mechanism 816 (e.g., a cradle, a tracker band, a support base, or a clasp).

The coupling mechanism 816 can allow for the watch body 820 to be detachably coupled to the wearable band 810 through a friction fit, a magnetic coupling, a rotation-based connector, a shear-pin coupler, a retention spring, one or more magnets, a clip, a pin shaft, a hook-and-loop fastener, or a combination thereof. A user can perform any type of motion to couple the watch body 820 to the wearable band 810 and to decouple the watch body 820 from the wearable band 810. For example, a user can twist, slide, turn, push, pull, or rotate the watch body 820 relative to the wearable band 810, or a combination thereof, to attach the watch body 820 to the wearable band 810 and to detach the watch body 820 from the wearable band 810. Alternatively, as discussed below, in some embodiments, the watch body 820 can be decoupled from the wearable band 810 by actuation of the release mechanism 829.

The wearable band 810 can be coupled with a watch body 820 to increase the functionality of the wearable band 810 (e.g., converting the wearable band 810 into a wrist-wearable device 800, adding an additional computing unit and/or battery to increase computational resources and/or a battery life of the wearable band 810, or adding additional sensors to improve sensed data). As described above, the wearable band 810 (and the coupling mechanism 816) is configured to operate independently (e.g., execute functions independently) from watch body 820. For example, the coupling mechanism 816 can include one or more sensors 813 that contact a user's skin when the wearable band 810 is worn by the user and provide sensor data for determining control commands.

A user can detach the watch body 820 (or capsule) from the wearable band 810 in order to reduce the encumbrance of the wrist-wearable device 800 to the user. For embodiments in which the watch body 820 is removable, the watch body 820 can be referred to as a removable structure, such that in these embodiments the wrist-wearable device 800 includes a wearable portion (e.g., the wearable band 810) and a removable structure (the watch body 820).

Turning to the watch body 820, the watch body 820 can have a substantially rectangular or circular shape. The watch body 820 is configured to be worn by the user on their wrist or on another body part. More specifically, the watch body 820 is sized to be easily carried by the user, attached on a portion of the user's clothing, and/or coupled to the wearable band 810 (forming the wrist-wearable device 800). As described above, the watch body 820 can have a shape corresponding to the coupling mechanism 816 of the wearable band 810. In some embodiments, the watch body 820 includes a single release mechanism 829 or multiple release mechanisms (e.g., two release mechanisms 829 positioned on opposing sides of the watch body 820, such as spring-loaded buttons) for decoupling the watch body 820 and the wearable band 810. The release mechanism 829 can include, without limitation, a button, a knob, a plunger, a handle, a lever, a fastener, a clasp, a dial, a latch, or a combination thereof.

A user can actuate the release mechanism 829 by pushing, turning, lifting, depressing, shifting, or performing other actions on the release mechanism 829. Actuation of the release mechanism 829 can release (e.g., decouple) the watch body 820 from the coupling mechanism 816 of the wearable band 810, allowing the user to use the watch body 820 independently from wearable band 810 and vice versa. For example, decoupling the watch body 820 from the wearable band 810 can allow the user to capture images using rear-facing camera 825b. Although the coupling mechanism 816 is shown positioned at a corner of watch body 820, the release mechanism 829 can be positioned anywhere on watch body 820 that is convenient for the user to actuate. In addition, in some embodiments, the wearable band 810 can also include a respective release mechanism for decoupling the watch body 820 from the coupling mechanism 816. In some embodiments, the release mechanism 829 is optional and the watch body 820 can be decoupled from the coupling mechanism 816, as described above (e.g., via twisting or rotating).

The watch body 820 can include one or more peripheral buttons 823 and 827 for performing various operations at the watch body 820. For example, the peripheral buttons 823 and 827 can be used to turn on or wake (e.g., transition from a sleep state to an active state) the display 805, unlock the watch body 820, increase or decrease volume, increase or decrease brightness, interact with one or more applications, interact with one or more user interfaces. Additionally, or alternatively, in some embodiments, the display 805 operates as a touch screen and allows the user to provide one or more inputs for interacting with the watch body 820.

In some embodiments, the watch body 820 includes one or more sensors 821. The sensors 821 of the watch body 820 can be the same or distinct from the sensors 813 of the wearable band 810. The sensors 821 of the watch body 820 can be distributed on an inside and/or an outside surface of the watch body 820. In some embodiments, the sensors 821 are configured to contact a user's skin when the watch body 820 is worn by the user. For example, the sensors 821 can be placed on the bottom side of the watch body 820 and the coupling mechanism 816 can be a cradle with an opening that allows the bottom side of the watch body 820 to directly contact the user's skin. Alternatively, in some embodiments, the watch body 820 does not include sensors that are configured to contact the user's skin (e.g., including sensors internal and/or external to the watch body 820 that are configured to sense data of the watch body 820 and the watch body 820's surrounding environment). In some embodiments, the sensors 813 are configured to track a position and/or motion of the watch body 820.

The watch body 820 and the wearable band 810 can share data using a wired communication method (e.g., a Universal Asynchronous Receiver/Transmitter (UART) or a USB transceiver) and/or a wireless communication method (e.g., near-field communication or Bluetooth). For example, the watch body 820 and the wearable band 810 can share data sensed by the sensors 813 and 821, as well as application- and device-specific information (e.g., active and/or available applications), output devices (e.g., display or speakers), and/or input devices (e.g., touch screens, microphones, or imaging sensors).

In some embodiments, the watch body 820 can include, without limitation, a front-facing camera 825a and/or a rear-facing camera 825b, sensors 821 (e.g., a biometric sensor, an IMU sensor, a heart rate sensor, a saturated oxygen sensor, a neuromuscular-signal sensor, an altimeter sensor, a temperature sensor, a bioimpedance sensor, a pedometer sensor, an optical sensor (e.g., FIG. 8B; imaging sensor 863), a touch sensor, a sweat sensor). In some embodiments, the watch body 820 can include one or more haptic devices 876 (FIG. 8B; a vibratory haptic actuator) that is configured to provide haptic feedback (e.g., a cutaneous and/or kinesthetic sensation) to the user. The sensors 821 and/or the haptic device 876 can also be configured to operate in conjunction with multiple applications, including, without limitation, health-monitoring applications, social media applications, game applications, and AR applications (e.g., the applications associated with AR).

As described above, the watch body 820 and the wearable band 810, when coupled, can form the wrist-wearable device 800. When coupled, the watch body 820 and wearable band 810 operate as a single device to execute functions (e.g., operations, detections, or communications) described herein. In some embodiments, each device is provided with particular instructions for performing the one or more operations of the wrist-wearable device 800. For example, in accordance with a determination that the watch body 820 does not include neuromuscular-signal sensors, the wearable band 810 can include alternative instructions for performing associated instructions (e.g., providing sensed neuromuscular-signal data to the watch body 820 via a different electronic device). Operations of the wrist-wearable device 800 can be performed by the watch body 820 alone or in conjunction with the wearable band 810 (e.g., via respective processors and/or hardware components) and vice versa. In some embodiments, operations of the wrist-wearable device 800, the watch body 820, and/or the wearable band 810 can be performed in conjunction with one or more processors and/or hardware components of another communicatively coupled device (e.g., FIGS. 10A-10B; the HIPD 1000).

As described below with reference to the block diagram of FIG. 8B, the wearable band 810 and/or the watch body 820 can each include independent resources required to independently execute functions. For example, the wearable band 810 and/or the watch body 820 can each include a power source (e.g., a battery), a memory, data storage, a processor (e.g., a CPU), communications, a light source, and/or input/output devices.

FIG. 8B shows block diagrams of a computing system 830 corresponding to the wearable band 810 and a computing system 860 corresponding to the watch body 820, according to some embodiments. A computing system of the wrist-wearable device 800 includes a combination of components of the wearable band computing system 830 and the watch body computing system 860, in accordance with some embodiments.

The watch body 820 and/or the wearable band 810 can include one or more components shown in watch body computing system 860. In some embodiments, a single integrated circuit includes all or a substantial portion of the components of the watch body computing system 860 that are included in a single integrated circuit. Alternatively, in some embodiments, components of the watch body computing system 860 are included in a plurality of integrated circuits that are communicatively coupled. In some embodiments, the watch body computing system 860 is configured to couple (e.g., via a wired or wireless connection) with the wearable band computing system 830, which allows the computing systems to share components, distribute tasks, and/or perform other operations described herein (individually or as a single device).

The watch body computing system 860 can include one or more processors 879, a controller 877, a peripherals interface 861, a power system 895, and memory (e.g., a memory 880), each of which are defined above and described in more detail below.

The power system 895 can include a charger input 896, a power-management integrated circuit (PMIC) 897, and a battery 898, each of which are defined above. In some embodiments, a watch body 820 and a wearable band 810 can have respective charger inputs (e.g., charger inputs 896 and 857), respective batteries (e.g., batteries 898 and 859), and can share power with each other (e.g., the watch body 820 can power and/or charge the wearable band 810 and vice versa). Although watch body 820 and/or the wearable band 810 can include respective charger inputs, a single charger input can charge both devices when coupled. The watch body 820 and the wearable band 810 can receive a charge using a variety of techniques. In some embodiments, the watch body 820 and the wearable band 810 can use a wired charging assembly (e.g., power cords) to receive the charge. Alternatively, or in addition, the watch body 820 and/or the wearable band 810 can be configured for wireless charging. For example, a portable charging device can be designed to mate with a portion of watch body 820 and/or wearable band 810 and wirelessly deliver usable power to a battery of watch body 820 and/or wearable band 810. The watch body 820 and the wearable band 810 can have independent power systems (e.g., power system 895 and 856) to enable each to operate independently. The watch body 820 and wearable band 810 can also share power (e.g., one can charge the other) via respective PMICs (e.g., PMICs 897 and 858) that can share power over power and ground conductors and/or over wireless charging antennas.

In some embodiments, the peripherals interface 861 can include one or more sensors 821, many of which listed below are defined above. The sensors 821 can include one or more coupling sensors 862 for detecting when the watch body 820 is coupled with another electronic device (e.g., a wearable band 810). The sensors 821 can include imaging sensors 863 (one or more of the cameras 825 and/or separate imaging sensors 863 (e.g., thermal-imaging sensors)). In some embodiments, the sensors 821 include one or more SpO2 sensors 864. In some embodiments, the sensors 821 include one or more biopotential-signal sensors (e.g., EMG sensors 865, which may be disposed on a user-facing portion of the watch body 820 and/or the wearable band 810). In some embodiments, the sensors 821 include one or more capacitive sensors 866. In some embodiments, the sensors 821 include one or more heart rate sensors 867. In some embodiments, the sensors 821 include one or more IMUs 868. In some embodiments, one or more IMUs 868 can be configured to detect movement of a user's hand or other location that the watch body 820 is placed or held.

In some embodiments, the peripherals interface 861 includes an NFC component 869, a GPS component 870, a long-term evolution (LTE) component 871, and/or a Wi-Fi and/or Bluetooth communication component 872. In some embodiments, the peripherals interface 861 includes one or more buttons 873 (e.g., the peripheral buttons 823 and 827 in FIG. 8A), which, when selected by a user, cause operations to be performed at the watch body 820. In some embodiments, the peripherals interface 861 includes one or more indicators, such as a light-emitting diode (LED), to provide a user with visual indicators (e.g., message received, low battery, an active microphone, and/or a camera).

The watch body 820 can include at least one display 805 for displaying visual representations of information or data to the user, including user-interface elements and/or three-dimensional (3D) virtual objects. The display can also include a touch screen for inputting user inputs, such as touch gestures, swipe gestures, and the like. The watch body 820 can include at least one speaker 874 and at least one microphone 875 for providing audio signals to the user and receiving audio input from the user. The user can provide user inputs through the microphone 875 and can also receive audio output from the speaker 874 as part of a haptic event provided by the haptic controller 878. The watch body 820 can include at least one camera 825, including a front-facing camera 825*a* and a rear-facing camera 825*b*. The cameras 825 can include ultra-wide-angle cameras, wide-angle cameras, fish-eye cameras, spherical cameras, telephoto cameras, depth-sensing cameras, or other types of cameras.

The watch body computing system 860 can include one or more haptic controllers 878 and associated componentry (e.g., haptic devices 876) for providing haptic events at the watch body 820 (e.g., a vibrating sensation or audio output in response to an event at the watch body 820). The haptic controllers 878 can communicate with one or more haptic devices 876, such as electroacoustic devices, including a speaker of the one or more speakers 874 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 878 can provide haptic events to respective haptic actuators that are capable of being sensed by a user of the watch body 820. In some embodiments, the one or more haptic controllers 878 can receive input signals from an application of the applications 882.

In some embodiments, the computer system 830 and/or the computer system 860 can include memory 880, which can be controlled by a memory controller of the one or more controllers 877 and/or one or more processors 879. In some embodiments, software components stored in the memory 880 include one or more applications 882 configured to perform operations at the watch body 820. In some embodiments, the one or more applications 882 include games, word processors, messaging applications, calling applications, web browsers, social media applications, media streaming applications, financial applications, calendars, clocks, etc. In some embodiments, software components stored in the memory 880 include one or more communication interface modules 883 as defined above. In some embodiments, software components stored in the memory 880 include one or more graphics modules 884 for rendering, encoding, and/or decoding audio and/or visual data; and one or more data management modules 885 for collecting, organizing, and/or providing access to the data 887 stored in memory 880. In some embodiments, one or more of applications 882 and/or one or more modules can work in conjunction with one another to perform various tasks at the watch body 820.

In some embodiments, software components stored in the memory 880 can include one or more operating systems 881 (e.g., a Linux-based operating system, an Android operating system, etc.). The memory 880 can also include data 887. The data 887 can include profile data 888A, sensor data 889A, media content data 890, and/or application data 891.

It should be appreciated that the watch body computing system 860 is an example of a computing system within the watch body 820, and that the watch body 820 can have more or fewer components than shown in the watch body computing system 860, combine two or more components, and/or have a different configuration and/or arrangement of the components. The various components shown in watch body computing system 860 are implemented in hardware, software, firmware, or a combination thereof, including one or more signal processing and/or application-specific integrated circuits.

Turning to the wearable band computing system 830, one or more components that can be included in the wearable band 810 are shown. The wearable band computing system 830 can include more or fewer components than shown in the watch body computing system 860, combine two or more components, and/or have a different configuration and/or arrangement of some or all of the components. In some embodiments, all, or a substantial portion of the components of the wearable band computing system 830 are included in a single integrated circuit. Alternatively, in some embodiments, components of the wearable band computing system 830 are included in a plurality of integrated circuits that are communicatively coupled. As described above, in some embodiments, the wearable band computing system 830 is configured to couple (e.g., via a wired or wireless connection) with the watch body computing system 860, which allows the computing systems to share components, distribute tasks, and/or perform other operations described herein (individually or as a single device).

The wearable band computing system 830, similar to the watch body computing system 860, can include one or more processors 849, one or more controllers 847 (including one or more haptics controller 848), a peripherals interface 831 that can include one or more sensors 813 and other peripheral devices, power source (e.g., a power system 856), and memory (e.g., a memory 850) that includes an operating system (e.g., an operating system 851), data (e.g., data 854 including profile data 888B, sensor data 889B, etc.), and one or more modules (e.g., a communications interface module 852, a data management module 853, etc.).

The one or more sensors 813 can be analogous to sensors 821 of the computer system 860 in light of the definitions above. For example, sensors 813 can include one or more coupling sensors 832, one or more SpO2 sensors 834, one or more EMG sensors 835, one or more capacitive sensors 836, one or more heart rate sensors 837, and one or more IMU sensors 838.

The peripherals interface 831 can also include other components analogous to those included in the peripheral interface 861 of the computer system 860, including an NFC component 839, a GPS component 840, an LTE component 841, a Wi-Fi and/or Bluetooth communication component 842, and/or one or more haptic devices 876 as described above in reference to peripherals interface 861. In some embodiments, the peripherals interface 831 includes one or more buttons 843, a display 833, a speaker 844, a microphone 845, and a camera 855. In some embodiments, the peripherals interface 831 includes one or more indicators, such as an LED.

It should be appreciated that the wearable band computing system 830 is an example of a computing system within the wearable band 810, and that the wearable band 810 can have more or fewer components than shown in the wearable band computing system 830, combine two or more components, and/or have a different configuration and/or arrangement of the components. The various components shown in wearable band computing system 830 can be implemented in one or a combination of hardware, software, and firmware, including one or more signal processing and/or application-specific integrated circuits.

The wrist-wearable device 800 with respect to FIG. 8A is an example of the wearable band 810 and the watch body 820 coupled, so the wrist-wearable device 800 will be understood to include the components shown and described for the wearable band computing system 830 and the watch body computing system 860. In some embodiments, wrist-wearable device 800 has a split architecture (e.g., a split mechanical architecture or a split electrical architecture) between the watch body 820 and the wearable band 810. In other words, all of the components shown in the wearable band computing system 830 and the watch body computing system 860 can be housed or otherwise disposed in a combined watch device 800, or within individual components of the watch body 820, wearable band 810, and/or portions thereof (e.g., a coupling mechanism 816 of the wearable band 810).

The techniques described above can be used with any device for sensing neuromuscular signals, including the arm-wearable devices of FIG. 8A-8B, but could also be used with other types of wearable devices for sensing neuromuscular signals (such as body-wearable or head-wearable devices that might have neuromuscular sensors closer to the brain or spinal column).

In some embodiments, a wrist-wearable device 800 can be used in conjunction with a head-wearable device described below (e.g., AR device 900 and VR device 910) and/or an HIPD 1000, and the wrist-wearable device 800 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). In some embodiments, a wrist-wearable device 800 can also be used in conjunction with a wearable garment, such as smart textile-based garment 1100 described below in reference to FIGS. 11A-11C. Having thus described example wrist-wearable device, attention will now be turned to example head-wearable devices, such AR device 900 and VR device 910.

Example Head-Wearable Devices

FIGS. 9A, 9B-1, 9B-2, and 9C show example head-wearable devices, in accordance with some embodiments. Head-wearable devices can include, but are not limited to, AR devices 900 (e.g., AR or smart eyewear devices, such as smart glasses, smart monocles, smart contacts, etc.), VR devices 910 (e.g., VR headsets or head-mounted displays (HMDs)), or other ocularly coupled devices. The AR devices 900 and the VR devices 910 are instances of the head-wearable device 100 described in reference to FIGS. 1-5, such that the head-wearable device should be understood to have the features of the AR devices 900 and/or the VR devices 910 and vice versa. The AR devices 900 and the VR devices 910 can perform various functions and/or operations associated with navigating through user interfaces and selectively opening applications, as well as the functions and/or operations described above.

Figure 9A:
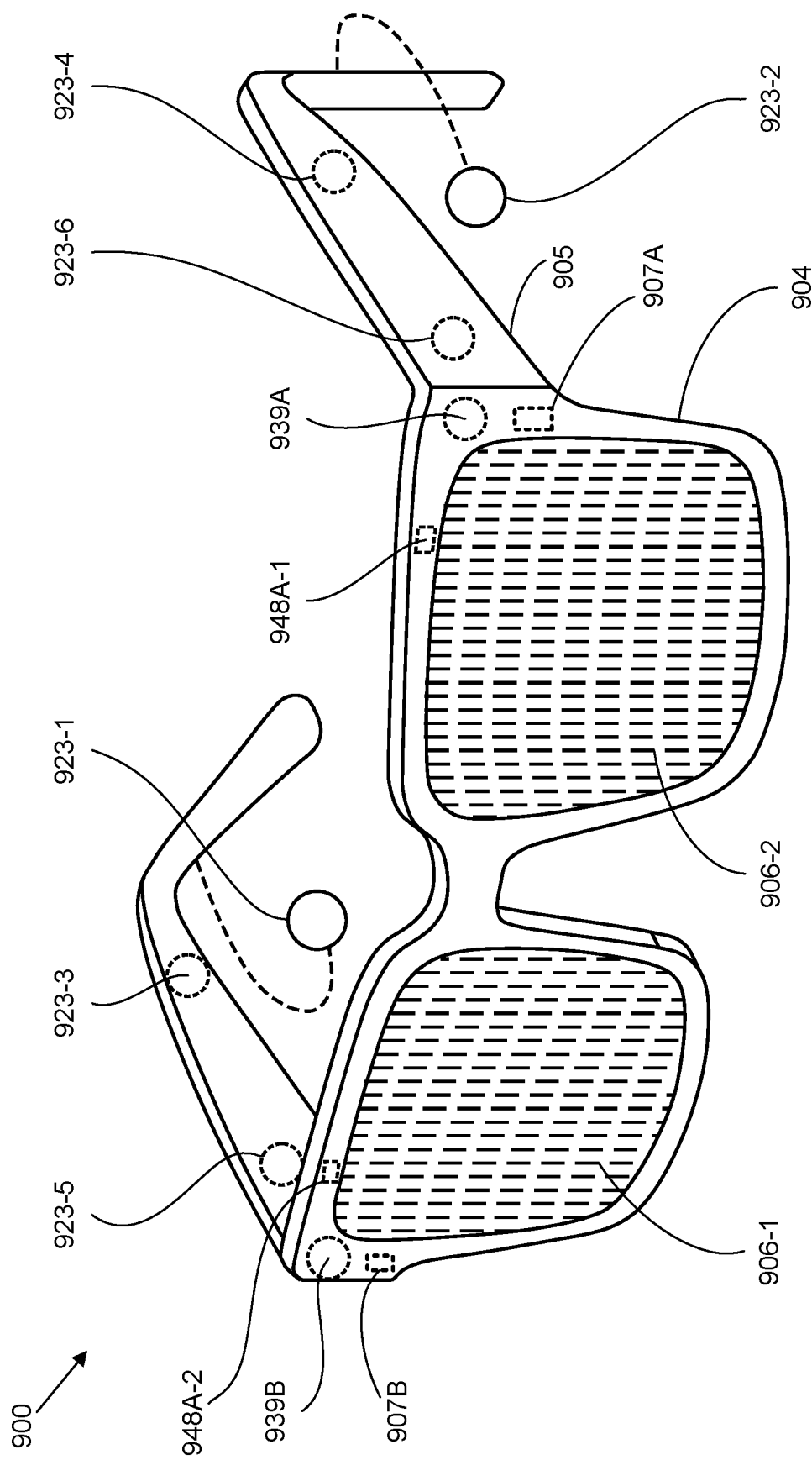
Figures 1, 9B:
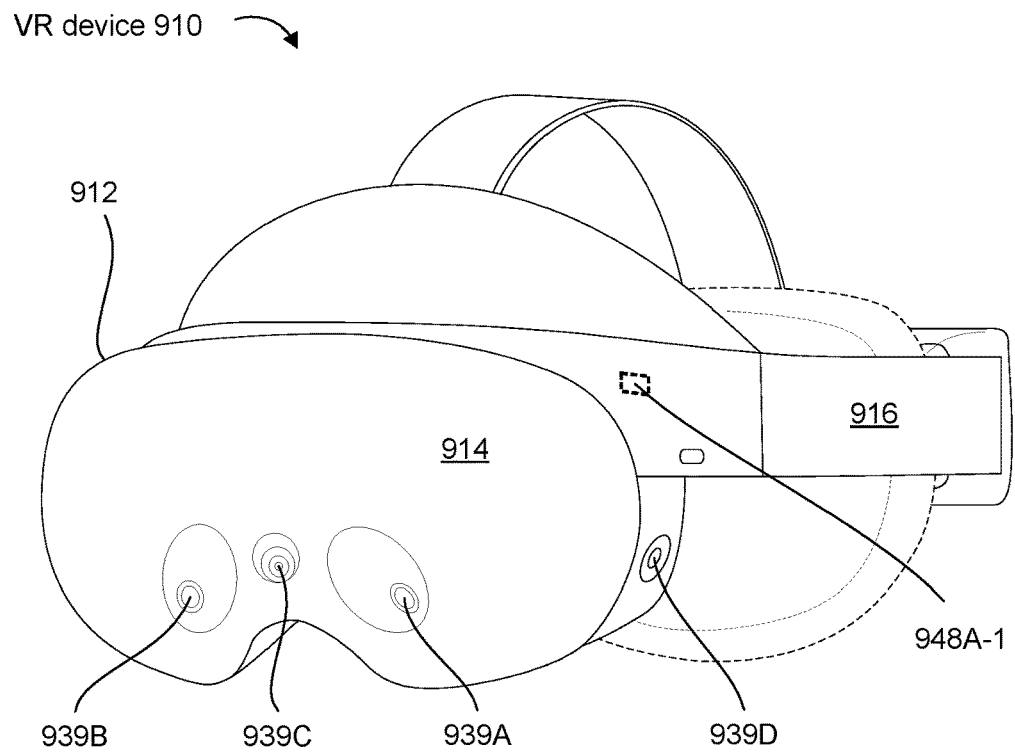
Figures 2, 9B:
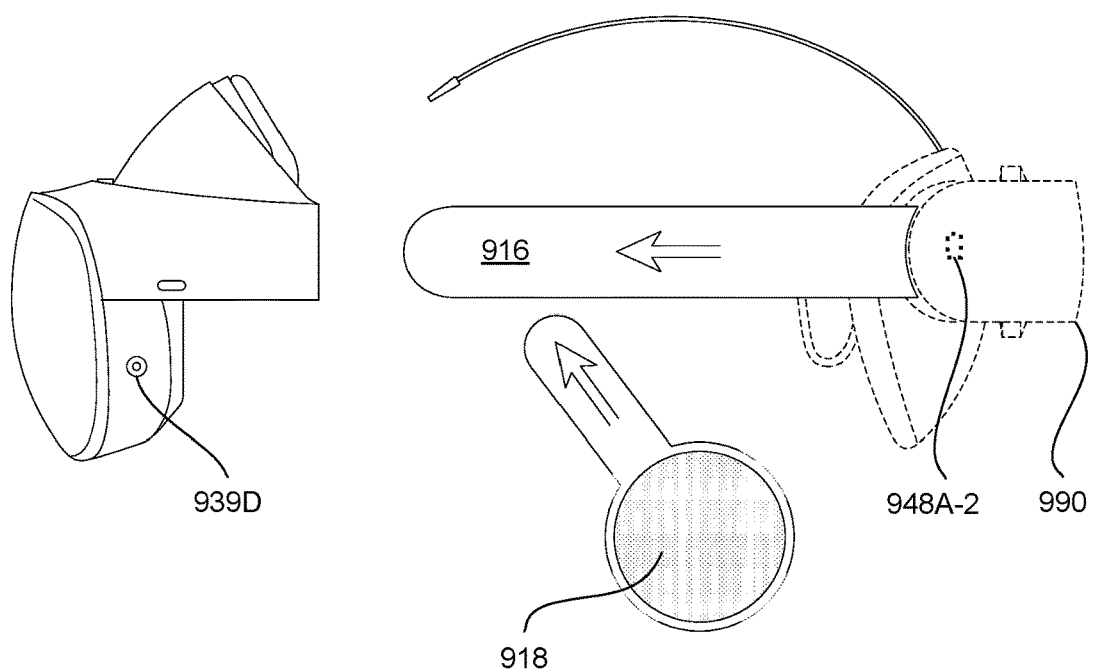

In some embodiments, an AR system (e.g., FIGS. 7A-7D-2; AR systems 700a-700d) includes an AR device 900 (as shown in FIG. 9A) and/or VR device 910 (as shown in FIGS. 9B-1-B-2). In some embodiments, the AR device 900 and the VR device 910 can include one or more analogous components (e.g., components for presenting interactive AR environments, such as processors, memory, and/or presentation devices, including one or more displays and/or one or more waveguides), some of which are described in more detail with respect to FIG. 9C. The head-wearable devices can use display projectors (e.g., display projector assemblies 907A and 907B) and/or waveguides for projecting representations of data to a user. Some embodiments of head-wearable devices do not include displays.

FIG. 9A shows an example visual depiction of the AR device 900 (e.g., which may also be described herein as augmented-reality glasses and/or smart glasses). The AR device 900 can work in conjunction with additional electronic components that are not shown in FIGS. 9A, such as a wearable accessory device and/or an intermediary processing device, in electronic communication or otherwise configured to be used in conjunction with the AR device 900. In some embodiments, the wearable accessory device and/or the intermediary processing device may be configured to couple with the AR device 900 via a coupling mechanism in electronic communication with a coupling sensor 924, where the coupling sensor 924 can detect when an electronic device becomes physically or electronically coupled with the AR device 900. In some embodiments, the AR device 900 can be configured to couple to a housing (e.g., a portion of frame 904 or temple arms 905), which may include one or more additional coupling mechanisms configured to couple with additional accessory devices. The components shown in FIG. 9A can be implemented in hardware, software, firmware, or a combination thereof, including one or more signal-processing components and/or application-specific integrated circuits (ASICs).

The AR device 900 includes mechanical glasses components, including a frame 904 configured to hold one or more lenses (e.g., one or both lenses 906-1 and 906-2). One of ordinary skill in the art will appreciate that the AR device 900 can include additional mechanical components, such as hinges configured to allow portions of the frame 904 of the AR device 900 to be folded and unfolded, a bridge configured to span the gap between the lenses 906-1 and 906-2 and rest on the user's nose, nose pads configured to rest on the bridge of the nose and provide support for the AR device 900, earpieces configured to rest on the user's ears and provide additional support for the AR device 900, temple arms 905 configured to extend from the hinges to the earpieces of the AR device 900, and the like. One of ordinary skill in the art will further appreciate that some examples of the AR device 900 can include none of the mechanical components described herein. For example, smart contact lenses configured to present AR to users may not include any components of the AR device 900.

The lenses 906-1 and 906-2 can be individual displays or display devices (e.g., a waveguide for projected representations). The lenses 906-1 and 906-2 may act together or independently to present an image or series of images to a user. In some embodiments, the lenses 906-1 and 906-2 can operate in conjunction with one or more display projector assemblies 907A and 907B to present image data to a user. While the AR device 900 includes two displays, embodiments of this disclosure may be implemented in AR devices with a single near-eye display (NED) or more than two NEDs.

The AR device 900 includes electronic components, many of which will be described in more detail below with respect to FIG. 9C. Some example electronic components are illustrated in FIG. 9A, including sensors 923-1, 923-2, 923-3, 923-4, 923-5, and 923-6, which can be distributed along a substantial portion of the frame 904 of the AR device 900. The different types of sensors are described below in reference to FIG. 9C. The AR device 900 also includes a left camera 939A and a right camera 939B, which are located on different sides of the frame 904. The eyewear device includes one or more processors 948A and 948B (e.g., an integral microprocessor, such as an ASIC) that is embedded into a portion of the frame 904.

FIGS. 9B-1 and 9B-2 show an example visual depiction of the VR device 910 (e.g., a head-mounted display (HMD) 912, also referred to herein as an AR headset, a head-wearable device, or a VR headset). The HMD 912 includes a front body 914 and a frame 916 (e.g., a strap or band) shaped to fit around a user's head (e.g., the strap 108 shown by the top view of the head-wearable device 100 in FIG. 1G). In some embodiments, the front body 914 and/or the frame 916 includes one or more electronic elements for facilitating presentation of and/or interactions with an AR and/or VR system (e.g., displays, processors (e.g., processor 948A-1), IMUs, tracking emitters or detectors, or sensors). In some embodiments, the HMD 912 includes output audio transducers (e.g., an audio transducer 918-1), as shown in FIG. 9B-2. In some embodiments, one or more components, such as the output audio transducer(s) 918 and the frame 916, can be configured to attach and detach (e.g., are detachably attachable) to the HMD 912 (e.g., a portion or all of the frame 916 and/or the output audio transducer 918), as shown in FIG. 9B-2. In some embodiments, coupling a detachable component to the HMD 912 causes the detachable component to come into electronic communication with the HMD 912. The VR device 910 includes electronic components, many of which will be described in more detail below with respect to FIG. 9C.

FIGS. 9B-1 and 9B-2 also show that the VR device 910 having one or more cameras, such as the left camera 939A and the right camera 939B, which can be analogous to the left and right cameras on the frame 904 of the AR device 900. In some embodiments, the VR device 910 includes one or more additional cameras (e.g., cameras 939C and 939D), which can be configured to augment image data obtained by the cameras 939A and 939B by providing more information. For example, the camera 939C can be used to supply color information that is not discerned by cameras 939A and 939B. In some embodiments, one or more of the cameras 939A to 939D can include an optional IR (infrared) cut filter configured to remove IR light from being received at the respective camera sensors.

The VR device 910 can include a housing 990 storing one or more components of the VR device 910 and/or additional components of the VR device 910. The housing 990 can be a modular electronic device configured to couple with the VR device 910 (or an AR device 900) and supplement and/or extend the capabilities of the VR device 910 (or an AR device 900). For example, the housing 990 can include additional sensors, cameras, power sources, and processors (e.g., processor 948A-2), to improve and/or increase the functionality of the VR device 910. Examples of the different components included in the housing 990 are described below in reference to FIG. 9C.

Alternatively, or in addition, in some embodiments, the head-wearable device, such as the VR device 910 and/or the AR device 900, includes, or is communicatively coupled to, another external device (e.g., a paired device), such as an HIPD 10 (discussed below in reference to FIGS. 10A-10B) and/or an optional neckband. The optional neckband can couple to the head-wearable device via one or more connectors (e.g., wired or wireless connectors). The head-wearable device and the neckband can operate independently without any wired or wireless connection between them. In some embodiments, the components of the head-wearable device and the neckband are located on one or more additional peripheral devices paired with the head-wearable device, the neckband, or some combination thereof. Furthermore, the neckband is intended to represent any suitable type or form of paired device. Thus, the following discussion of neckbands may also apply to various other paired devices, such as smartwatches, smartphones, wrist bands, other wearable devices, hand-held controllers, tablet computers, or laptop computers.

In some situations, pairing external devices, such as an intermediary processing device (e.g., an HIPD device 1000, an optional neckband, and/or a wearable accessory device) with the head-wearable devices (e.g., an AR device 900 and/or a VR device 910) enables the head-wearable devices to achieve a similar form factor of a pair of glasses while still providing sufficient battery and computational power for expanded capabilities. Some, or all, of the battery power, computational resources, and/or additional features of the head-wearable devices can be provided by a paired device or shared between a paired device and the head-wearable devices, thus reducing the weight, heat profile, and form factor of the head-wearable device overall while allowing the head-wearable device to retain its desired functionality. For example, the intermediary processing device (e.g., the HIPD 1000) can allow components that would otherwise be included in a head-wearable device to be included in the intermediary processing device (and/or a wearable device or accessory device), thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computational capacity than might otherwise have been possible on the head-wearable devices, standing alone. Because weight carried in the intermediary processing device can be less invasive to a user than weight carried in the head-wearable devices, a user may tolerate wearing a lighter eyewear device and carrying or wearing the paired device for greater lengths of time than the user would tolerate wearing a heavier eyewear device standing alone, thereby enabling an AR environment to be incorporated more fully into a user's day-to-day activities.

In some embodiments, the intermediary processing device is communicatively coupled with the head-wearable device and/or to other devices. The other devices may provide certain functions (e.g., tracking, localizing, depth mapping, processing, and/or storage) to the head-wearable device. In some embodiments, the intermediary processing device includes a controller and a power source. In some embodiments, sensors of the intermediary processing device are configured to sense additional data that can be shared with the head-wearable devices in an electronic format (analog or digital).

The controller of the intermediary processing device processes information generated by the sensors on the intermediary processing device and/or the head-wearable devices. The intermediary processing device, such as an HIPD 1000, can process information generated by one or more of its sensors and/or information provided by other communicatively coupled devices. For example, a head-wearable device can include an IMU, and the intermediary processing device (a neckband and/or an HIPD 1000) can compute all inertial and spatial calculations from the IMUs located on the head-wearable device. Additional examples of processing performed by a communicatively coupled device, such as the HIPD 1000, are provided below in reference to FIGS. 10A and 10B.

AR systems may include a variety of types of visual feedback mechanisms. For example, display devices in the AR devices 900 and/or the VR devices 910 may include one or more liquid-crystal displays (LCDs), light emitting diode (LED) displays, organic LED (OLED) displays, and/or any other suitable type of display screen. AR systems may include a single display screen for both eyes or may provide a display screen for each eye, which may allow for additional flexibility for varifocal adjustments or for correcting a refractive error associated with the user's vision. Some AR systems also include optical subsystems having one or more lenses (e.g., conventional concave or convex lenses, Fresnel lenses, or adjustable liquid lenses) through which a user may view a display screen. In addition to or instead of using display screens, some AR systems include one or more projection systems. For example, display devices in the AR device 900 and/or the VR device 910 may include micro-LED projectors that project light (e.g., using a waveguide) into display devices, such as clear combiner lenses that allow ambient light to pass through. The display devices may refract the projected light toward a user's pupil and may enable a user to simultaneously view both AR content and the real world. AR systems may also be configured with any other suitable type or form of image projection system. As noted, some AR systems may, instead of blending an artificial reality with actual reality, substantially replace one or more of a user's sensory perceptions of the real world with a virtual experience.

While the example head-wearable devices are respectively described herein as the AR device 900 and the VR device 910, either or both of the example head-wearable devices described herein can be configured to present fully immersive VR scenes presented in substantially all of a user's field of view, additionally or alternatively to, subtler augmented-reality scenes that are presented within a portion, less than all, of the user's field of view.

In some embodiments, the AR device 900 and/or the VR device 910 can include haptic feedback systems. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback can be implemented using motors, piezoelectric actuators, fluidic systems, and/or a variety of other types of feedback mechanisms. The haptic feedback systems may be implemented independently of other AR devices, within other AR devices, and/or in conjunction with other AR devices (e.g., wrist-wearable devices that may be incorporated into headwear, gloves, body suits, handheld controllers, environmental devices (e.g., chairs or floormats), and/or any other type of device or system, such as a wrist-wearable device 800, an HIPD 1000, smart textile-based garment 1100), and/or other devices described herein.

Figure 9C:
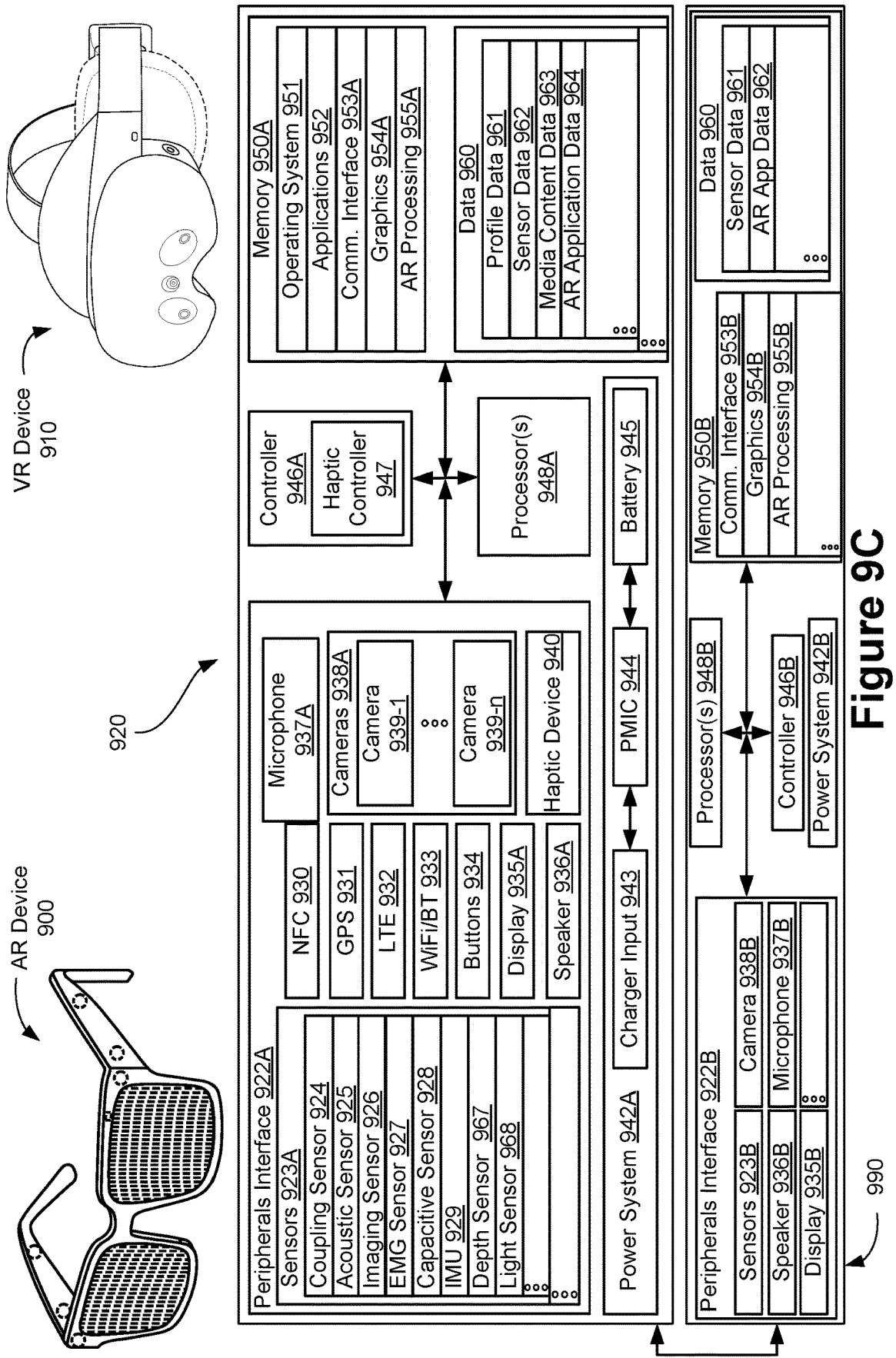

FIG. 9C illustrates a computing system 920 and an optional housing 990, each of which shows components that can be included in a head-wearable device (e.g., the AR device 900 and/or the VR device 910). In some embodiments, more or fewer components can be included in the optional housing 990 depending on practical restraints of the respective head-wearable device being described. Additionally or alternatively, the optional housing 990 can include additional components to expand and/or augment the functionality of a head-wearable device.

In some embodiments, the computing system 920 and/or the optional housing 990 can include one or more peripheral interfaces 922A and 922B, one or more power systems 942A and 942B (including charger input 943, PMIC 944, and battery 945), one or more controllers 946A and 946B (including one or more haptic controllers 947), one or more processors 948A and 948B (as defined above, including any of the examples provided), and memory 950A and 950B, which can all be in electronic communication with each other. For example, the one or more processors 948A and/or 948B can be configured to execute instructions stored in the memory 950A and/or 950B, which can cause a controller of the one or more controllers 946A and/or 946B to cause operations to be performed at one or more peripheral devices of the peripherals interfaces 922A and/or 922B. In some embodiments, each operation described can occur based on electrical power provided by the power system 942A and/or 942B.

In some embodiments, the peripherals interface 922A can include one or more devices configured to be part of the computing system 920, many of which have been defined above and/or described with respect to wrist-wearable devices shown in FIGS. 8A and 8B. For example, the peripherals interface can include one or more sensors 923A. Some example sensors include one or more coupling sensors 924, one or more acoustic sensors 925, one or more imaging sensors 926, one or more EMG sensors 927, one or more capacitive sensors 928, and/or one or more IMUs 929. In some embodiments, the sensors 923A further include depth sensors 967, light sensors 968, and/or any other types of sensors defined above or described with respect to any other embodiments discussed herein.

In some embodiments, the peripherals interface can include one or more additional peripheral devices, including one or more NFC devices 930, one or more GPS devices 931, one or more LTE devices 932, one or more Wi-Fi and/or Bluetooth devices 933, one or more buttons 934 (e.g., including buttons that are slidable or otherwise adjustable), one or more displays 935A, one or more speakers 936A, one or more microphones 937A, one or more cameras 938A (e.g., including the first camera 939-1 through nth camera 939-n, which are analogous to the left camera 939A and/or the right camera 939B), one or more haptic devices 940, and/or any other types of peripheral devices defined above or described with respect to any other embodiments discussed herein.

The head-wearable devices can include a variety of types of visual feedback mechanisms (e.g., presentation devices). For example, display devices in the AR device 900 and/or the VR device 910 can include one or more liquid-crystal displays (LCDs), light emitting diode (LED) displays, organic LED (OLED) displays, micro-LEDs, and/or any other suitable types of display screens. The head-wearable devices can include a single display screen (e.g., configured to be seen by both eyes) and/or can provide separate display screens for each eye, which can allow for additional flexibility for varifocal adjustments and/or for correcting a refractive error associated with the user's vision. Some embodiments of the head-wearable devices also include optical subsystems having one or more lenses (e.g., conventional concave or convex lenses, Fresnel lenses, or adjustable liquid lenses) through which a user can view a display screen. For example, respective displays 935A can be coupled to each of the lenses 906-1 and 906-2 of the AR device 900. The displays 935A coupled to each of the lenses 906-1 and 906-2 can act together or independently to present an image or series of images to a user. In some embodiments, the AR device 900 and/or the VR device 910 includes a single display 935A (e.g., a near-eye display) or more than two displays 935A.

In some embodiments, a first set of one or more displays 935A can be used to present an augmented-reality environment, and a second set of one or more display devices 935A can be used to present a VR environment. In some embodiments, one or more waveguides are used in conjunction with presenting AR content to the user of the AR device 900 and/or the VR device 910 (e.g., as a means of delivering light from a display projector assembly and/or one or more displays 935A to the user's eyes). In some embodiments, one or more waveguides are fully or partially integrated into the AR device 900 and/or the VR device 910. Additionally, or alternatively, to display screens, some AR systems include one or more projection systems. For example, display devices in the AR device 900 and/or the VR device 910 can include micro-LED projectors that project light (e.g., using a waveguide) into display devices, such as clear combiner lenses that allow ambient light to pass through. The display devices can refract the projected light toward a user's pupil and can enable a user to simultaneously view both AR content and the real world. The head-wearable devices can also be configured with any other suitable type or form of image projection system. In some embodiments, one or more waveguides are provided, additionally or alternatively, to the one or more display(s) 935A.

In some embodiments of the head-wearable devices, ambient light and/or a real-world live view (e.g., a live feed of the surrounding environment that a user would normally see) can be passed through a display element of a respective head-wearable device presenting aspects of the AR system. In some embodiments, ambient light and/or the real-world live view can be passed through a portion, less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable devices, and an amount of ambient light and/or the real-world live view (e.g., 15%-50% of the ambient light and/or the real-world live view) can be passed through the user interface element, such that the user can distinguish at least a portion of the physical environment over which the user interface element is being displayed.

The head-wearable devices can include one or more external displays 935A for presenting information to users. For example, an external display 935A can be used to show a current battery level, network activity (e.g., connected, disconnected), current activity (e.g., playing a game, in a call, in a meeting, or watching a movie), and/or other relevant information. In some embodiments, the external displays 935A can be used to communicate with others. For example, a user of the head-wearable device can cause the external displays 935A to present a "do not disturb" notification. The external displays 935A can also be used by the user to share any information captured by the one or more components of the peripherals interface 922A and/or generated by the head-wearable device (e.g., during operation and/or performance of one or more applications).

The memory 950A can include instructions and/or data executable by one or more processors 948A (and/or processors 948B of the housing 990) and/or a memory controller of the one or more controllers 946A (and/or controller 946B of the housing 990). The memory 950A can include one or more operating systems 951, one or more applications 952, one or more communication interface modules 953A, one or more graphics modules 954A, one or more AR processing modules 955A, and/or any other types of modules or components defined above or described with respect to any other embodiments discussed herein.

The data 960 stored in memory 950A can be used in conjunction with one or more of the applications and/or programs discussed above. The data 960 can include profile data 961, sensor data 962, media content data 963, AR application data 964, and/or any other types of data defined above or described with respect to any other embodiments discussed herein.

In some embodiments, the controller 946A of the head-wearable devices processes information generated by the sensors 923A on the head-wearable devices and/or another component of the head-wearable devices and/or communicatively coupled with the head-wearable devices (e.g., components of the housing 990, such as components of peripherals interface 922B). For example, the controller 946A can process information from the acoustic sensors 925 and/or image sensors 926. For each detected sound, the controller 946A can perform a direction of arrival (DOA) estimation to estimate a direction from which the detected sound arrived at a head-wearable device. As one or more of the acoustic sensors 925 detect sounds, the controller 946A can populate an audio data set with the information (e.g., represented by sensor data 962).

In some embodiments, a physical electronic connector can convey information between the head-wearable devices and another electronic device, and/or between one or more processors 948A of the head-wearable devices and the controller 946A. The information can be in the form of optical data, electrical data, wireless data, or any other transmittable data form. Moving the processing of information generated by the head-wearable devices to an intermediary processing device can reduce weight and heat in the eyewear device, making it more comfortable and safer for a user. In some embodiments, an optional accessory device (e.g., an electronic neckband or an HIPD 1000) is coupled to the head-wearable devices via one or more connectors. The connectors can be wired or wireless connectors and can include electrical and/or non-electrical (e.g., structural) components. In some embodiments, the head-wearable devices and the accessory device can operate independently without any wired or wireless connection between them.

The head-wearable devices can include various types of computer vision components and subsystems. For example, the AR device 900 and/or the VR device 910 can include one or more optical sensors such as two-dimensional (2D) or three-dimensional (3D) cameras, ToF depth sensors, single-beam or sweeping laser rangefinders, 3D LiDAR sensors, and/or any other suitable type or form of optical sensor. A head-wearable device can process data from one or more of these sensors to identify a location of a user and/or aspects of the user's real-world physical surroundings, including the locations of real-world objects within the real-world physical surroundings. In some embodiments, the methods described herein are used to map the real world, to provide a user with context about real-world surroundings, and/or to generate interactable virtual objects (which can be replicas or digital twins of real-world objects that can be interacted with an AR environment), among a variety of other functions. For example, FIGS. 9B-1 and 9B-2 show the VR device 910 having cameras 939A-939D, which can be used to provide depth information for creating a voxel field and a 2D mesh to provide object information to the user to avoid collisions.

The optional housing 990 can include analogous components to those describe above with respect to the computing system 920. For example, the optional housing 990 can include a respective peripherals interface 922B, including more or fewer components to those described above with respect to the peripherals interface 922A. As described above, the components of the optional housing 990 can be used to augment and/or expand on the functionality of the head-wearable devices. For example, the optional housing 990 can include respective sensors 923B, speakers 936B, displays 935B, microphones 937B, cameras 938B, and/or other components to capture and/or present data. Similarly, the optional housing 990 can include one or more processors 948B, controllers 946B, and/or memory 950B (including respective communication interface modules 953B, one or more graphics modules 954B, one or more AR processing modules 955B) that can be used individually and/or in conjunction with the components of the computing system 920.

The techniques described above in FIGS. 9A-9C can be used with different head-wearable devices. In some embodiments, the head-wearable devices (e.g., the AR device 900 and/or the VR device 910) can be used in conjunction with one or more wearable devices such as a wrist-wearable device 800 (or components thereof) and/or a smart textile-based garment 1100 (FIGS. 11A-11C), as well as an HIPD 1000. Having thus described example the head-wearable devices, attention will now be turned to example handheld intermediary processing devices, such as HIPD 1000.

Example Handheld Intermediary Processing Devices

Figure 10A:
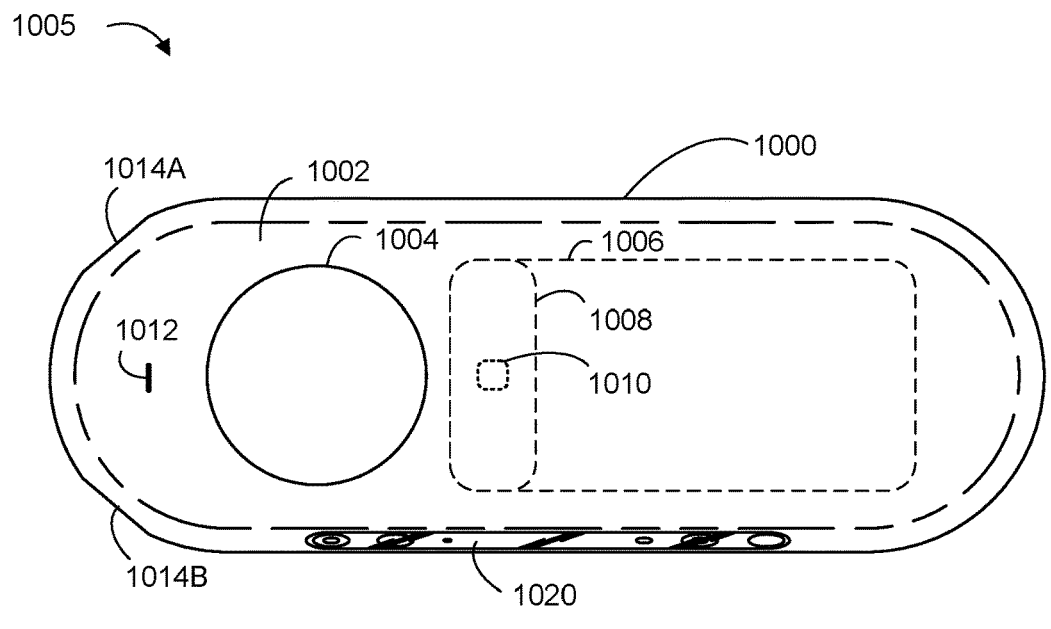
FIGS. 10A-10B illustrate an example handheld intermediary processing device, in accordance with some embodiments.
Figure 10A:
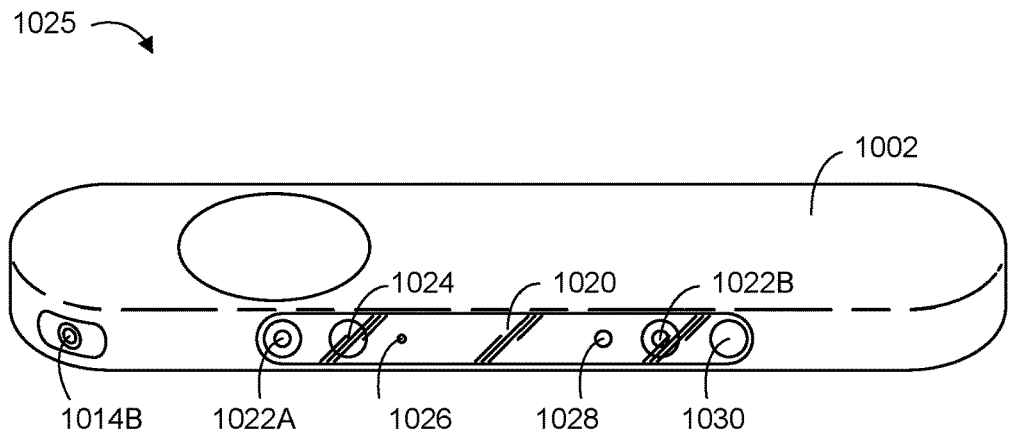
Figure 10B:
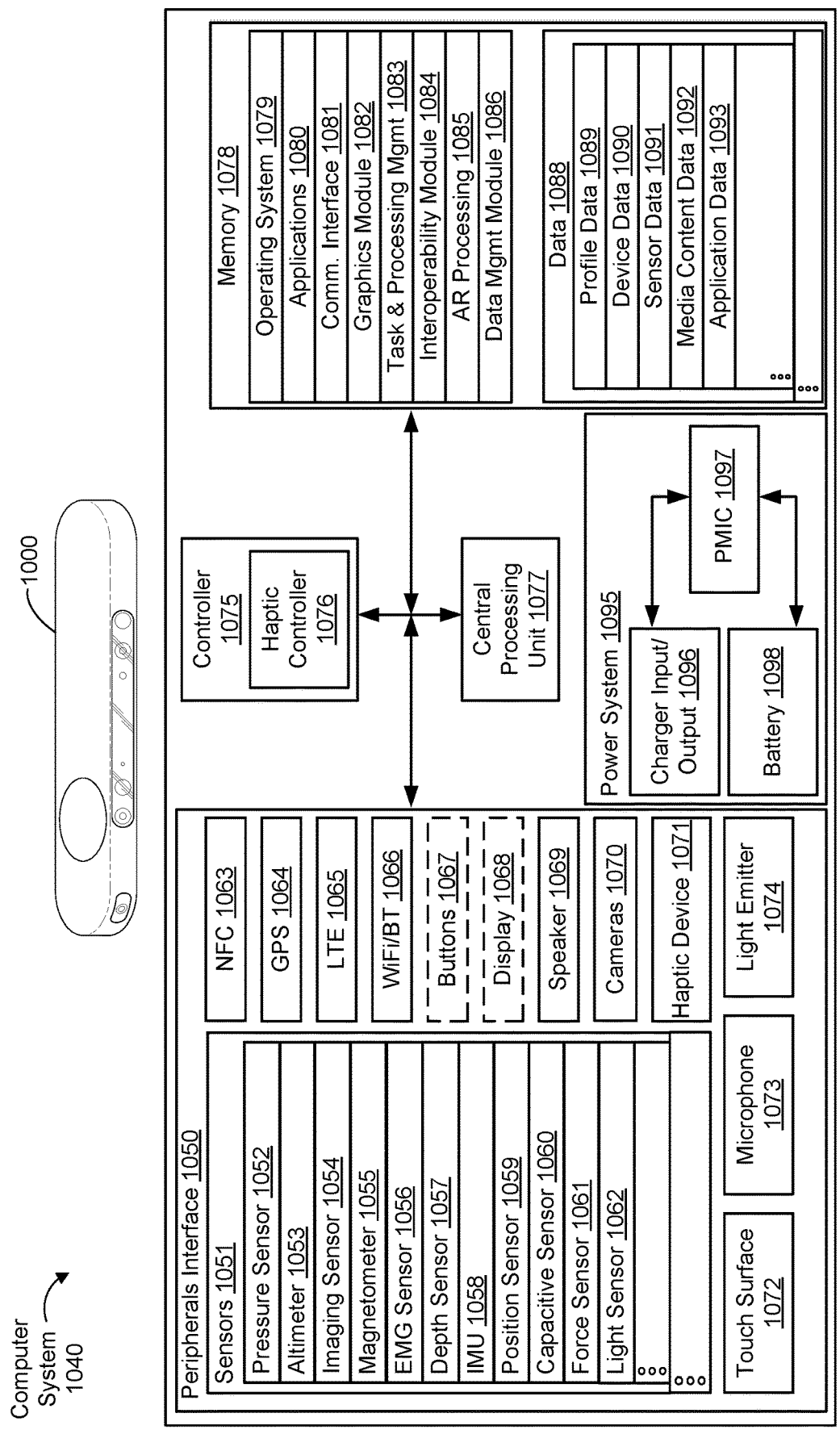

FIGS. 10A and 10B illustrate an example handheld intermediary processing device (HIPD) 1000, in accordance with some embodiments. The HIPD 1000 can perform various functions and/or operations associated with navigating through user interfaces and selectively opening applications, as well as the functions and/or operations described above with reference to FIGS. 12A to 15 related to tracking using a projector configured to project structured light directed towards the controller (e.g., the HIPD 1000).

FIG. 10A shows a top view 1005 and a side view 1025 of the HIPD 1000. The HIPD 1000 is configured to communicatively couple with one or more wearable devices (or other electronic devices) associated with a user. For example, the HIPD 1000 is configured to communicatively couple with a user's wrist-wearable device 800 (or components thereof, such as the watch body 820 and the wearable band 810), AR device 900, and/or VR device 910. The HIPD 1000 can be configured to be held by a user (e.g., as a handheld controller), carried on the user's person (e.g., in their pocket or in their bag), placed in proximity of the user (e.g., placed on their desk while seated at their desk or on a charging dock), and/or placed at or within a predetermined distance from a wearable device or other electronic device (e.g., where, in some embodiments, the predetermined distance is the maximum distance (e.g., 10 meters) at which the HIPD 1000 can successfully be communicatively coupled with an electronic device, such as a wearable device).

The HIPD 1000 can perform various functions independently and/or in conjunction with one or more wearable devices (e.g., wrist-wearable device 800, AR device 900, and/or VR device 910). The HIPD 1000 is configured to increase and/or improve the functionality of communicatively coupled devices, such as the wearable devices. The HIPD 1000 is configured to perform one or more functions or operations associated with interacting with user interfaces and applications of communicatively coupled devices, interacting with an AR environment, interacting with a VR environment, and/or operating as a human-machine interface controller. Additionally, as will be described in more detail below, functionality and/or operations of the HIPD 1000 can include, without limitation, task offloading and/or handoffs; thermals offloading and/or handoffs, 6 degrees of freedom (6 DoF) raycasting and/or gaming (e.g., using imaging devices or cameras 1014A and 1014B, which can be used for simultaneous localization and mapping (SLAM), and/or with other image processing techniques), portable charging; messaging, image capturing via one or more imaging devices or cameras (e.g., cameras 1022A and 1022B), sensing user input (e.g., sensing a touch on a multitouch input surface 1002), wireless communications and/or interlining (e.g., cellular, near field, Wi-Fi, or personal area network), location determination, financial transactions, providing haptic feedback, alarms, notifications, biometric authentication, health monitoring, sleep monitoring. The above-example functions can be executed independently in the HIPD 1000 and/or in communication between the HIPD 1000 and another wearable device described herein. In some embodiments, functions can be executed on the HIPD 1000 in conjunction with an AR environment. As the skilled artisan will appreciate upon reading the descriptions provided herein, the HIPD 1000 described herein can be used with any type of suitable AR environment.

While the HIPD 1000 is communicatively coupled with a wearable device and/or other electronic device, the HIPD 1000 is configured to perform one or more operations initiated at the wearable device and/or the other electronic device. In particular, one or more operations of the wearable device and/or the other electronic device can be offloaded to the HIPD 1000 to be performed. The HIPD 1000 performs one or more operations of the wearable device and/or the other electronic device and provides data corresponding to the completed operations to the wearable device and/or the other electronic device. For example, a user can initiate a video stream using the AR device 900 and back-end tasks associated with performing the video stream (e.g., video rendering) can be offloaded to the HIPD 1000, which the HIPD 1000 performs and provides corresponding data to the AR device 900 to perform remaining front-end tasks associated with the video stream (e.g., presenting the rendered video data via a display of the AR device 900). In this way, the HIPD 1000, which has more computational resources and greater thermal headroom than a wearable device can perform computationally intensive tasks for the wearable device, improving performance of an operation performed by the wearable device.

The HIPD 1000 includes a multi-touch input surface 1002 on a first side (e.g., a front surface) that is configured to detect one or more user inputs. In particular, the multi-touch input surface 1002 can detect single-tap inputs, multi-tap inputs, swipe gestures and/or inputs, force-based and/or pressure-based touch inputs, held taps, and the like. The multi-touch input surface 1002 is configured to detect capacitive touch inputs and/or force (and/or pressure) touch inputs. The multi-touch input surface 1002 includes a first touch-input surface 1004 defined by a surface depression, and a second touch-input surface 1006 defined by a substantially planar portion. The first touch-input surface 1004 can be disposed adjacent to the second touch-input surface 1006. In some embodiments, the first touch-input surface 1004 and the second touch-input surface 1006 can be different dimensions, shapes, and/or cover different portions of the multi-touch input surface 1002. For example, the first touch-input surface 1004 can be substantially circular and the second touch-input surface 1006 is substantially rectangular. In some embodiments, the surface depression of the multi-touch input surface 1002 is configured to guide user handling of the HIPD 1000. In particular, the surface depression is configured such that the user holds the HIPD 1000 upright when held in a single hand (e.g., such that the using imaging devices or cameras 1014A and 1014B are pointed toward a ceiling or the sky). Additionally, the surface depression is configured such that the user's thumb rests within the first touch-input surface 1004.

In some embodiments, the different touch-input surfaces include a plurality of touch-input zones. For example, the second touch-input surface 1006 includes at least a first touch-input zone 1008 within a second touch-input zone 1006 and a third touch-input zone 1010 within the first touch-input zone 1008. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the first touch-input zone 1008 causes the HIPD 1000 to perform a first command and a user input detected within the second touch-input zone 1006 causes the HIPD 1000 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the first touch-input zone 1008 can be configured to detect force touch inputs (e.g., a magnitude at which the user presses down) and capacitive touch inputs, and the second touch-input zone 1006 can be configured to detect capacitive touch inputs.

The HIPD 1000 includes one or more sensors 1051 for sensing data used in the performance of one or more operations and/or functions. For example, the HIPD 1000 can include an IMU that is used in conjunction with cameras 1014 for 3-dimensional object manipulation (e.g., enlarging, moving, destroying, etc. an object) in an AR or VR environment. Non-limiting examples of the sensors 1051 included in the HIPD 1000 include a light sensor, a magnetometer, a depth sensor, a pressure sensor, and a force sensor. Additional examples of the sensors 1051 are provided below in reference to FIG. 10B.

The HIPD 1000 can include one or more light indicators 1012 to provide one or more notifications to the user. In some embodiments, the light indicators are LEDs or other types of illumination devices. The light indicators 1012 can operate as a privacy light to notify the user and/or others near the user that an imaging device and/or microphone are active. In some embodiments, a light indicator is positioned adjacent to one or more touch-input surfaces. For example, a light indicator can be positioned around the first touch-input surface 1004. The light indicators can be illuminated in different colors and/or patterns to provide the user with one or more notifications and/or information about the device. For example, a light indicator positioned around the first touch-input surface 1004 can flash when the user receives a notification (e.g., a message), change red when the HIPD 1000 is out of power, operate as a progress bar (e.g., a light ring that is closed when a task is completed (e.g., 0% to 100%)), operates as a volume indicator, etc.).

In some embodiments, the HIPD 1000 includes one or more additional sensors on another surface. For example, as shown FIG. 10A, HIPD 1000 includes a set of one or more sensors (e.g., sensor set 1020) on an edge of the HIPD 1000. The sensor set 1020, when positioned on an edge of the of the HIPD 1000, can be positioned at a predetermined tilt angle (e.g., 26 degrees), which allows the sensor set 1020 to be angled toward the user when placed on a desk or other flat surface. Alternatively, in some embodiments, the sensor set 1020 is positioned on a surface opposite the multi-touch input surface 1002 (e.g., a back surface). The one or more sensors of the sensor set 1020 are discussed in detail below.

The side view 1025 of the of the HIPD 1000 shows the sensor set 1020 and camera 1014B. The sensor set 1020 includes one or more cameras 1022A and 1022B, a depth projector 1024, an ambient light sensor 1028, and a depth receiver 1030. In some embodiments, the sensor set 1020 includes a light indicator 1026. The light indicator 1026 can operate as a privacy indicator to let the user and/or those around them know that a camera and/or microphone is active. The sensor set 1020 is configured to capture a user's facial expression such that the user can puppet a custom avatar (e.g., showing emotions, such as smiles, laughter, etc., on the avatar or a digital representation of the user). The sensor set 1020 can be configured as a side stereo red-green-blue (RGB) system, a rear indirect time-of-flight (iToF) system, or a rear stereo RGB system. As the skilled artisan will appreciate upon reading the descriptions provided herein, the HIPD 1000 described herein can use different sensor set 1020 configurations and/or sensor set 1020 placement.

In some embodiments, the HIPD 1000 includes one or more haptic devices 1071 (FIG. 10B; e.g., a vibratory haptic actuator) that are configured to provide haptic feedback (e.g., kinesthetic sensation). The sensors 1051, and/or the haptic devices 1071 can be configured to operate in conjunction with multiple applications and/or communicatively coupled devices including, without limitation, a wearable devices, health monitoring applications, social media applications, game applications, and artificial reality applications (e.g., the applications associated with artificial reality).

The HIPD 1000 is configured to operate without a display. However, in optional embodiments, the HIPD 1000 can include a display 1068 (FIG. 10B). The HIPD 1000 can also income one or more optional peripheral buttons 1067 (FIG. 10B). For example, the peripheral buttons 1067 can be used to turn on or turn off the HIPD 1000. Further, the HIPD 1000 housing can be formed of polymers and/or elastomer elastomers. The HIPD 1000 can be configured to have a non-slip surface to allow the HIPD 1000 to be placed on a surface without requiring a user to watch over the HIPD 1000. In other words, the HIPD 1000 is designed such that it would not easily slide off a surfaces. In some embodiments, the HIPD 1000 include one or magnets to couple the HIPD 1000 to another surface. This allows the user to mount the HIPD 1000 to different surfaces and provide the user with greater flexibility in use of the HIPD 1000.

As described above, the HIPD 1000 can distribute and/or provide instructions for performing the one or more tasks at the HIPD 1000 and/or a communicatively coupled device. For example, the HIPD 1000 can identify one or more back-end tasks to be performed by the HIPD 1000 and one or more front-end tasks to be performed by a communicatively coupled device. While the HIPD 1000 is configured to offload and/or handoff tasks of a communicatively coupled device, the HIPD 1000 can perform both back-end and front-end tasks (e.g., via one or more processors, such as CPU 1077; FIG. 10B). The HIPD 1000 can, without limitation, can be used to perform augmenting calling (e.g., receiving and/or sending 3D or 2.5D live volumetric calls, live digital human representation calls, and/or avatar calls), discreet messaging, 6 DoF portrait/landscape gaming, AR/VR object manipulation, AR/VR content display (e.g., presenting content via a virtual display), and/or other AR/VR interactions. The HIPD 1000 can perform the above operations alone or in conjunction with a wearable device (or other communicatively coupled electronic device).

FIG. 10B shows block diagrams of a computing system 1040 of the HIPD 1000, in accordance with some embodiments. The HIPD 1000, described in detail above, can include one or more components shown in HIPD computing system 1040. The HIPD 1000 will be understood to include the components shown and described below for the HIPD computing system 1040. In some embodiments, all, or a substantial portion of the components of the HIPD computing system 1040 are included in a single integrated circuit. Alternatively, in some embodiments, components of the HIPD computing system 1040 are included in a plurality of integrated circuits that are communicatively coupled.

The HIPD computing system 1040 can include a processor (e.g., a CPU 1077, a GPU, and/or a CPU with integrated graphics), a controller 1075, a peripherals interface 1050 that includes one or more sensors 1051 and other peripheral devices, a power source (e.g., a power system 1095), and memory (e.g., a memory 1078) that includes an operating system (e.g., an operating system 1079), data (e.g., data 1088), one or more applications (e.g., applications 1080), and one or more modules (e.g., a communications interface module 1081, a graphics module 1082, a task and processing management module 1083, an interoperability module 1084, an AR processing module 1085, a data management module 1086, etc.). The HIPD computing system 1040 further includes a power system 1095 that includes a charger input and output 1096, a PMIC 1097, and a battery 1098, all of which are defined above.

In some embodiments, the peripherals interface 1050 can include one or more sensors 1051. The sensors 1051 can include analogous sensors to those described above in reference to FIG. 8B. For example, the sensors 1051 can include imaging sensors 1054, (optional) EMG sensors 1056, IMUs 1058, and capacitive sensors 1060. In some embodiments, the sensors 1051 can include one or more pressure sensor 1052 for sensing pressure data, an altimeter 1053 for sensing an altitude of the HIPD 1000, a magnetometer 1055 for sensing a magnetic field, a depth sensor 1057 (or a time-of flight sensor) for determining a difference between the camera and the subject of an image, a position sensor 1059 (e.g., a flexible position sensor) for sensing a relative displacement or position change of a portion of the HIPD 1000, a force sensor 1061 for sensing a force applied to a portion of the HIPD 1000, and a light sensor 1062 (e.g., an ambient light sensor) for detecting an amount of lighting. The sensors 1051 can include one or more sensors not shown in FIG. 10B.

Analogous to the peripherals described above in reference to FIG. 8B, the peripherals interface 1050 can also include an NFC component 1063, a GPS component 1064, an LTE component 1065, a Wi-Fi and/or Bluetooth communication component 1066, a speaker 1069, a haptic device 1071, and a microphone 1073. As described above in reference to FIG. 10A, the HIPD 1000 can optionally include a display 1068 and/or one or more buttons 1067. The peripherals interface 1050 can further include one or more cameras 1070, touch surfaces 1072, and/or one or more light emitters 1074. The multi-touch input surface 1002 described above in reference to FIG. 10A is an example of touch surface 1072. The light emitters 1074 can be one or more LEDs, lasers, etc. and can be used to project or present information to a user. For example, the light emitters 1074 can include light indicators 1012 and 1026 described above in reference to FIG. 10A. The cameras 1070 (e.g., cameras 1014A, 1014B, and 1022 described above in FIG. 10A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 1070 can be used for SLAM; 6 DoF ray casting, gaming, object manipulation, and/or other rendering; facial recognition and facial expression recognition, etc.

Similar to the watch body computing system 860 and the watch band computing system 830 described above in reference to FIG. 8B, the HIPD computing system 1040 can include one or more haptic controllers 1076 and associated componentry (e.g., haptic devices 1071) for providing haptic events at the HIPD 1000.

Memory 1078 can include high-speed random-access memory and/or non-volatile memory, such as one or more magnetic disk storage devices, flash memory devices, or other non-volatile solid-state memory devices. Access to the memory 1078 by other components of the HIPD 1000, such as the one or more processors and the peripherals interface 1050, can be controlled by a memory controller of the controllers 1075.

In some embodiments, software components stored in the memory 1078 include one or more operating systems 1079, one or more applications 1080, one or more communication interface modules 1081, one or more graphics modules 1082, one or more data management modules 1086, which are analogous to the software components described above in reference to FIG. 8B.

In some embodiments, software components stored in the memory 1078 include a task and processing management module 1083 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 1083 uses data 1088 (e.g., device data 1090) to distribute the one or more front-end and/or back-end tasks based on communicatively coupled devices' computing resources, available power, thermal headroom, ongoing operations, and/or other factors. For example, the task and processing management module 1083 can cause the performance of one or more back-end tasks (of an operation performed at communicatively coupled AR device 900) at the HIPD 1000 in accordance with a determination that the operation is utilizing a predetermined amount (e.g., at least 70%) of computing resources available at the AR device 900.

In some embodiments, software components stored in the memory 1078 include an interoperability module 1084 for exchanging and utilizing information received and/or provided to distinct communicatively coupled devices. The interoperability module 1084 allows for different systems, devices, and/or applications to connect and communicate in a coordinated way without user input. In some embodiments, software components stored in the memory 1078 include an AR module 1085 that is configured to process signals based at least on sensor data for use in an AR and/or VR environment. For example, the AR processing module 1085 can be used for 3D object manipulation, gesture recognition, facial and facial expression, recognition, etc.

The memory 1078 can also include data 1088, including structured data. In some embodiments, the data 1088 can include profile data 1089, device data 1089 (including device data of one or more devices communicatively coupled with the HIPD 1000, such as device type, hardware, software, configurations, etc.), sensor data 1091, media content data 1092, and application data 1093.

It should be appreciated that the HIPD computing system 1040 is an example of a computing system within the HIPD 1000, and that the HIPD 1000 can have more or fewer components than shown in the HIPD computing system 1040, combine two or more components, and/or have a different configuration and/or arrangement of the components. The various components shown in HIPD computing system 1040 are implemented in hardware, software, firmware, or a combination thereof, including one or more signal processing and/or application-specific integrated circuits.

Figure 11B:
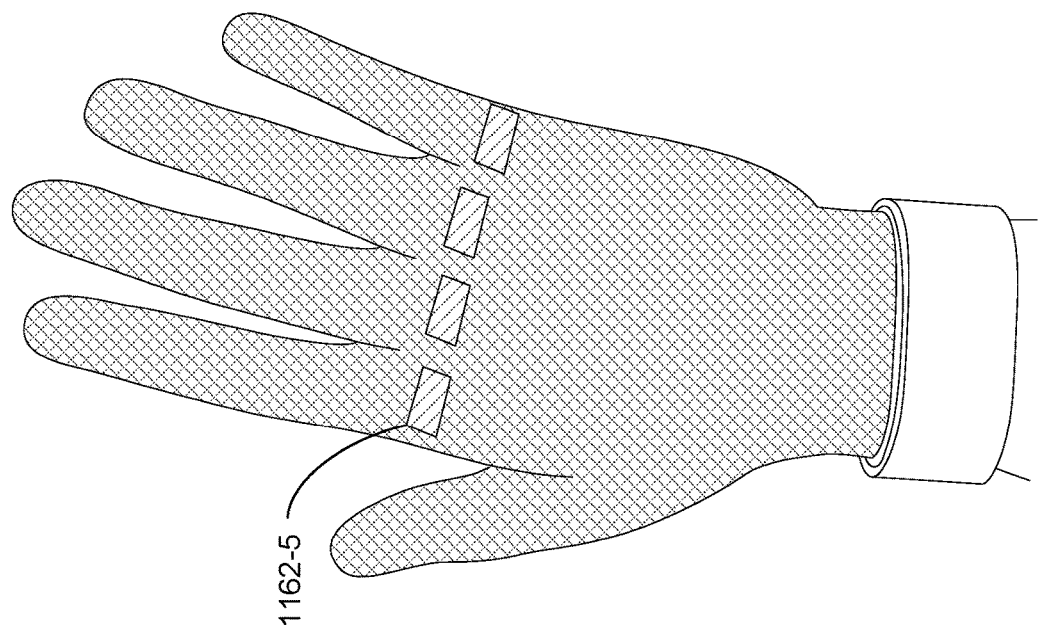
FIGS. 11A-11C illustrate an example smart textile-based garment in accordance with some embodiments.
Figure 11A:
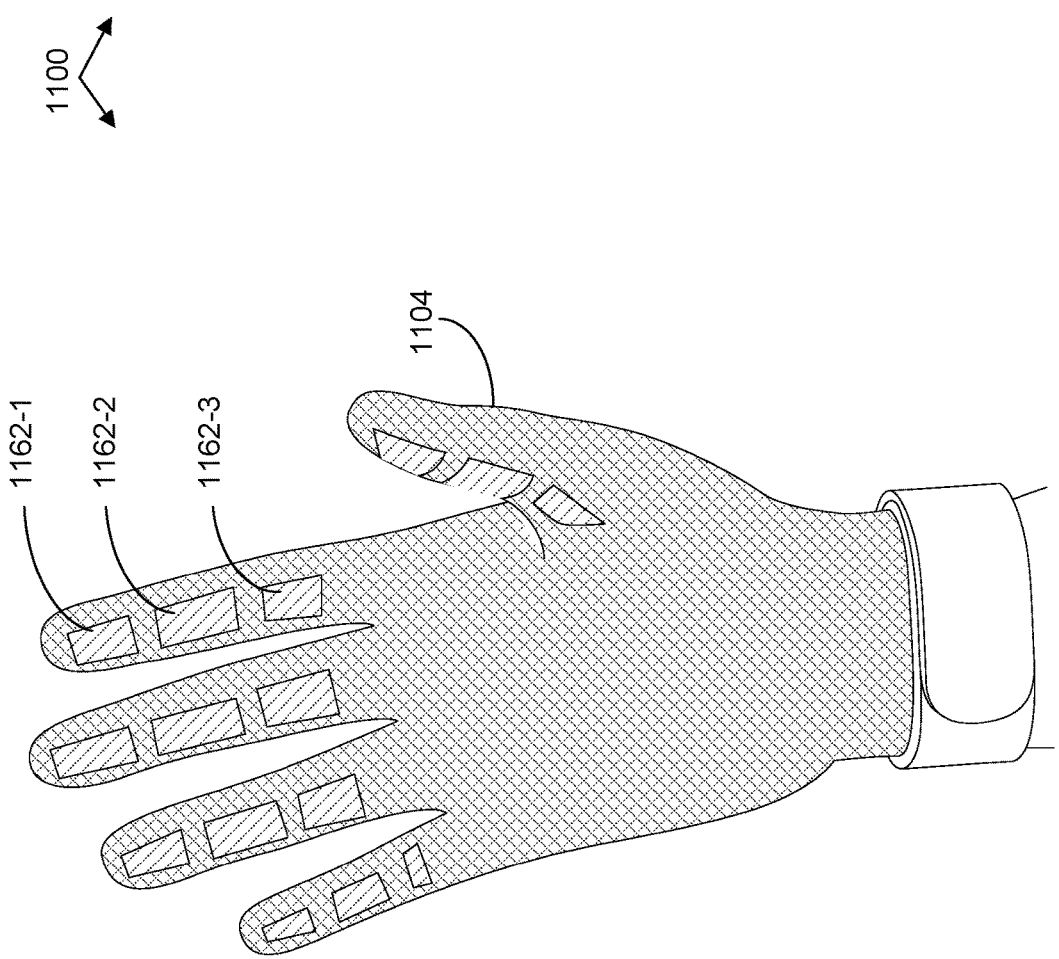
Figure 11C:
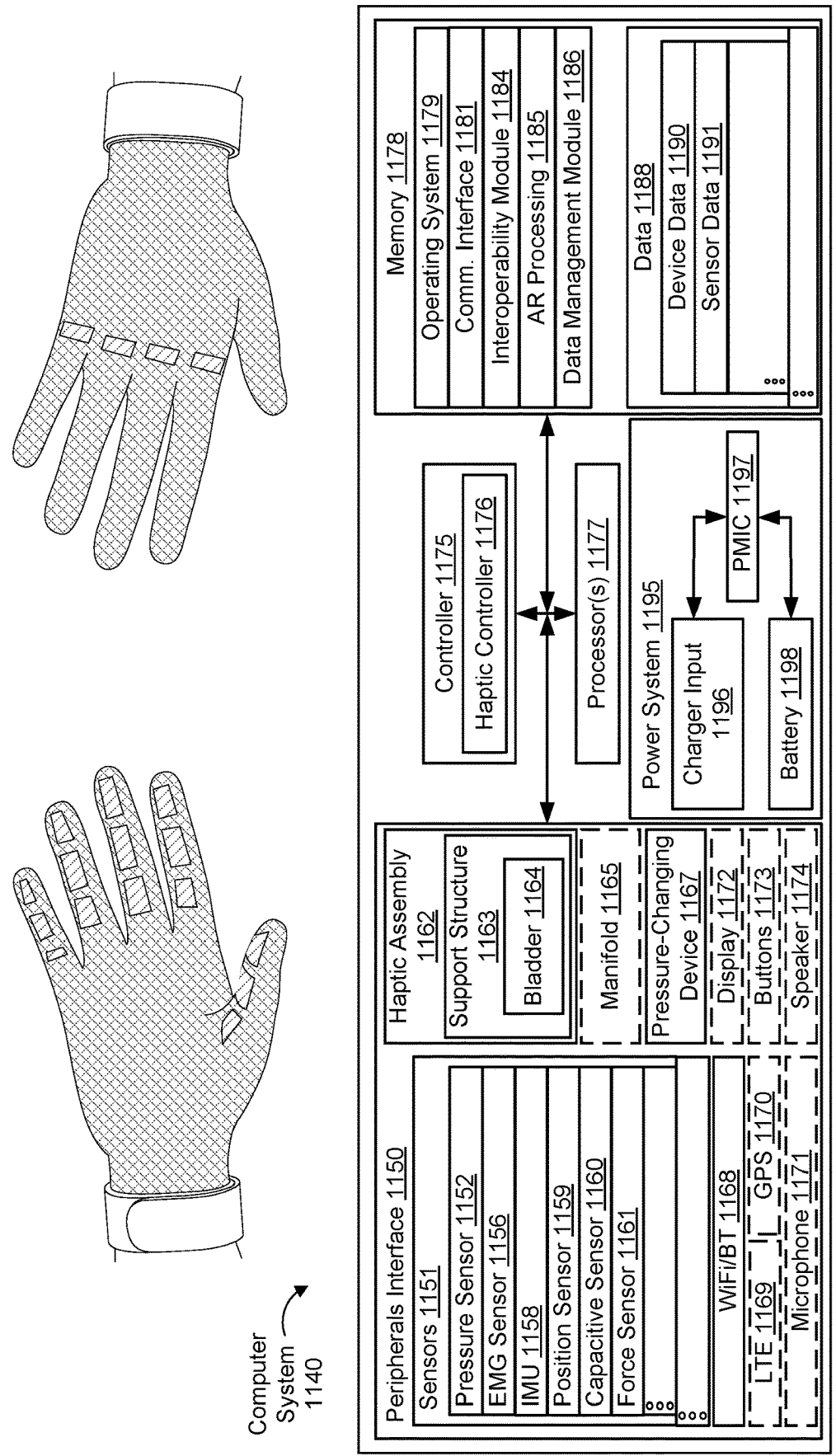

The techniques described above in FIG. 10A-10B can be used with any device used as a human-machine interface controller. In some embodiments, an HIPD 1000 can be used in conjunction with one or more wearable device such as a head-wearable device (e.g., AR device 900 and VR device 910) and/or a wrist-wearable device 800 (or components thereof). In some embodiments, an HIPD 1000 can also be used in conjunction with a wearable garment, such as smart textile-based garment 1100 (FIGS. 11A-11C). Having thus described example HIPD 1000, attention will now be turned to example feedback devices, such as smart textile-based garment 1100.

Example Smart Textile-Based Garments

FIGS. 11A and 11B illustrate an example smart textile-based garment, in accordance with some embodiments. The smart textile-based garment 1100 (e.g., wearable gloves, a shirt, a headband, a wristbands, socks, etc.) is configured to communicatively couple with one or more electronic devices, such as a wrist-wearable device 800, a head-wearable device, an HIPD 1000, a laptop, tablet, and/or other computing devices. The smart textile-based garment 1100 can perform various functions and/or operations associated with navigating through user interfaces and selectively opening applications, as well as the functions and/or operations described above with reference to FIGS. 12A to 15.

The smart textile-based garment 1100 can be part of an AR system, such as AR system 700d described above in reference to FIGS. 7D-1 and 7D-2. The smart textile-based garment 1100 is also configured to provide feedback (e.g., tactile or other haptic feedback) to a user based on the user's interactions with a computing system (e.g., navigation of a user interface, operation of an application (e.g., game vibrations, media responsive haptics), device notifications, etc.)), and/or the user's interactions within an AR environment. In some embodiments, the smart textile-based garment 1100 receives instructions from a communicatively coupled device (e.g., the wrist-wearable device 800, a head-wearable device, and HIPD 1000, etc.) for causing the performance of a feedback response. Alternatively, or in addition, in some embodiments, the smart textile-based garment 1100 determines one or more feedback responses to provide a user. The smart textile-based garment 1100 can determine the one or more feedback responses based on sensor data captured by one or more of its sensors (e.g., sensors 1151; FIG. 11C) or communicatively coupled sensors (e.g., sensors of a wrist-wearable device 800, a head-wearable device, an HIPD 1000, and/or other computing device).

Non-limiting examples of the feedback determined by the smart textile-based garment 1100 and/or a communicatively coupled device include visual feedback, audio feedback, haptic (e.g., tactile, kinesthetic, etc.) feedback, thermal or temperature feedback, and/or other sensory perceptible feedback. The smart textile-based garment 1100 can include respective feedback devices (e.g., a haptic device or assembly 1162 or other feedback devices or assemblies) to provide the feedback responses to the user. Similarly, the smart textile-based garment 1100 can communicatively couple with another device (and/or the other device's feedback devices) to coordinate the feedback provided to the user. For example, a VR device 910 can present an AR environment to a user and as the user interacts with objects within the AR environment, such as a virtual cup, the smart textile-based garment 1100 provides respective response to the user. In particular, the smart textile-based garment 1100 can provide haptic feedback to prevent (or, at a minimum, hinder/resist movement of) one or more of the user's fingers from bending past a certain point to simulate the sensation of touching a solid cup and/or thermal feedback to simulate the sensation of a cold or warm beverage.

Additionally or alternatively, in some embodiments, the smart textile-based garment 1100 is configured to operate as a controller configured to perform one or more functions or operations associated with interacting with user interfaces and applications of communicatively coupled devices, interacting with an AR environment, interacting with VR environment, and/or operating as a human-machine interface controller, as well as functions and/or operations described above with reference to FIGS. 10A to 10B, and FIGS. 12A to 15.

FIG. 11A shows one or more haptic assemblies 1162 (e.g., first through fourth haptic assemblies 1162-1 through 1162-4) on a portion of the smart textile-based garment 1100 adjacent to a palmar side of the user's hand and FIG. 11B shows additional haptic assemblies (e.g., a fifth haptic assembly 1162-5) on a portion of the smart textile-based garment 1100 adjacent to a dorsal side of the user's hand. In some embodiments, the haptic assemblies 1162 include a mechanism that, at a minimum, provide resistance when a respective haptic assembly 1162 is transitioned from a first state (e.g., a first pressurized state (e.g., at atmospheric pressure or deflated)) to a second state (e.g., a second pressurized state (e.g., inflated to a threshold pressure)). In other words, the haptic assemblies 1162 described can transition between a first pressurized state and a second pressurized state to provide haptic feedback to the user. Structures of haptic assemblies 1162 can be integrated into various devices configured to be in contact or proximity to a user's skin, including, but not limited to devices such as glove worn devices, body worn clothing device, headset devices. Each of the haptic assemblies 1162 can be included in or physically coupled to a garment component 1104 of the smart textile-based garment 1100. For example, each of the haptic assemblies 1162-1, 1162-2, 1162-3, . . . 1162-N are physically coupled to the garment 1104 are configured to contact respective phalanges of a user's thumb and fingers.

Due to the ever-changing nature of artificial-reality, the haptic assemblies 1162 may be required to transition between the multiple states hundreds, or perhaps thousands of times, during a single use. Thus, the haptic assemblies 1162 described herein are durable and designed to quickly transition from state to state. To provide some context, in a first pressurized state, the haptic assemblies 1162 do not impede free movement of a portion of the wearer's body. For example, one or more haptic assemblies 1162 incorporated into a glove are made from flexible materials that do not impede free movement of the wearer's hand and fingers (e.g., an electrostatic-zipping actuator). The haptic assemblies 1162 are configured to conform to a shape of the portion of the wearer's body when in the first pressurized state. However, once in a second pressurized state, the haptic assemblies 1162 can be configured to restrict and/or impede free movement of the portion of the wearer's body (e.g., appendages of the user's hand). For example, the respective haptic assembly 1162 (or multiple respective haptic assemblies) can restrict movement of a wearer's finger (e.g., prevent the finger from curling or extending) when the haptic assembly 1162 is in the second pressurized state. Moreover, once in the second pressurized state, the haptic assemblies 1162 may take different shapes, with some haptic assemblies 1162 configured to take a planar, rigid shape (e.g., flat and rigid), while some other haptic assemblies 1162 are configured to curve or bend, at least partially.

The smart textile-based garment 1100 can be one of a plurality of devices in an AR system (e.g., AR systems of FIGS. 7A-7D-2). For example, a user can wear a pair of gloves (e.g., a first type of smart textile-based garment 1100), wear a haptics component of a wrist-wearable device 800 (FIGS. 8A-8B), wear a headband (e.g., a second type of smart textile-based garment 1100), hold an HIPD 1000, etc. As explained above, the haptic assemblies 1162 are configured to provide haptic simulations to a wearer of the smart textile-based garments 1100. The garment 1104 of each smart textile-based garment 1100 can be one of various articles of clothing (e.g., gloves, socks, shirts, pants, etc.). Thus, a user may wear multiple smart textile-based garments 1100 that are each configured to provide haptic stimulations to respective parts of the body where the smart textile-based garments 1100 are being worn. Although the smart textile-based garment 1100 are described as an individual device, in some embodiments, the smart textile-based garment 1100 can be combined with other wearable devices described herein. For example, the smart textile-based garment 1100 can form part of a VR device 910 (e.g., a headband portion).

FIG. 11C shows block diagrams of a computing system 1140 of the haptic assemblies 1162, in accordance with some embodiments. The computing system 1140 can include one or more peripheral interfaces 1150, one or more power systems 1195 (including charger input 1196, PMIC 1197, and battery 1198), one or more controllers 1175 (including one or more haptic controllers 1176), one or more processors 1177 (as defined above, including any of the examples provided), and memory 1178, which can all be in electronic communication with each other. For example, the one or more processors 1177 can be configured to execute instructions stored in the memory 1178, which can cause a controller of the one or more controllers 1175 to cause operations to be performed at one or more peripheral devices of the peripherals interface 1150. In some embodiments, each operation described can occur based on electrical power provided by the power system 1195.

In some embodiments, the peripherals interface 1150 can include one or more devices configured to be part of the computing system 1140, many of which have been defined above and/or described with respect to wrist-wearable devices shown in FIGS. 8A-10B. For example, the peripherals interface 1150 can include one or more sensors 1151, such as one or more pressure sensors 1152, one or more EMG sensors 1156, one or more IMUs 1158, one or more position sensors 1159, one or more capacitive sensors 1160, one or more force sensors 1161; and/or any other types of sensors defined above or described with respect to any other embodiments discussed herein. In some embodiments, the peripherals interface can include one or more additional peripheral devices, including one or more Wi-Fi and/or Bluetooth devices 1168, an LTE component 1169, a GPS component 1170, a microphone 1171, one or more haptic assemblies 1162, one or more support structures 1163 which can include one or more bladders 1164, one or more manifolds 1165, one or more pressure-changing devices 1167, one or more displays 1172, one or more buttons 1173, one or more speakers 1174, and/or any other types of peripheral devices defined above or described with respect to any other embodiments discussed herein. In some embodiments, computing system 1140 includes more or fewer components than those shown in FIG. 11C.

In some embodiments, each haptic assembly 1162 includes a support structure 1163 and at least one bladder 1164. The bladder 1164 (e.g., a membrane) is a sealed, inflatable pocket made from a durable and puncture-resistant material, such as thermoplastic polyurethane (TPU), a flexible polymer, or the like. The bladder 1164 contains a medium (e.g., a fluid such as air, inert gas, or even a liquid) that can be added to or removed from the bladder 1164 to change pressure (e.g., fluid pressure) inside the bladder 1164. The support structure 1163 is made from a material that is stronger and stiffer than the material of the bladder 1164. A respective support structure 1163 coupled to a respective bladder 1164 is configured to reinforce the respective bladder 1164 as the respective bladder changes shape and size due to changes in pressure (e.g., fluid pressure) inside the bladder. The above example haptic assembly 1162 is non-limiting. The haptic assembly 1162 can include eccentric rotating mass (ERM), linear resonant actuators (LRA), voice coil motor (VCM), piezo haptic actuator, thermoelectric devices, solenoid actuators, ultrasonic transducers, thermo-resistive heaters, Peltier devices, and/or other devices configured to generate a perceptible response.

The smart textile-based garment 1100 also includes a haptic controller 1176 and a pressure-changing device 1167. Alternatively, in some embodiments, the computing system 1140 is communicatively coupled with a haptic controller 1176 and/or pressure-changing device 1167 (e.g., in electronic communication with one or more processors 1177 of the computing system 1140). The haptic controller 1176 is configured to control operation of the pressure-changing device 1167, and in turn operation of the smart textile-based garments 1100. For example, the haptic controller 1176 sends one or more signals to the pressure-changing device 1167 to activate the pressure-changing device 1167 (e.g., turn it on and off). The one or more signals can specify a desired pressure (e.g., pounds per square inch) to be output by the pressure-changing device 1167. Generation of the one or more signals, and in turn the pressure output by the pressure-changing device 1167, can be based on information collected by sensors 1151 of the smart textile-based garment 1100 and/or other communicatively coupled device. For example, the haptic controller 1176 can provide one or more signals, based on collected sensor data, to cause the pressure-changing device 1167 to increase the pressure (e.g., fluid pressure) inside a first haptic assembly 1162 at a first time, and provide one or more additional signals, based on additional sensor data, to the pressure-changing device 1167, to cause the pressure-changing device 1167 to further increase the pressure inside a second haptic assembly 1162 at a second time after the first time. Further, the haptic controller 1176 can provide one or more signals to cause the pressure-changing device 1167 to inflate one or more bladders 1164 in a first portion of a smart textile-based garment 1100 (e.g., a first finger), while one or more bladders 1164 in a second portion of the smart textile-based garment 1100 (e.g., a second finger) remain unchanged. Additionally, the haptic controller 1176 can provide one or more signals to cause the pressure-changing device 1167 to inflate one or more bladders 1164 in a first smart textile-based garment 1100 to a first pressure and inflate one or more other bladders 1164 in the first smart textile-based garment 1100 to a second pressure different from the first pressure. Depending on the number of smart textile-based garments 1100 serviced by the pressure-changing device 1167, and the number of bladders therein, many different inflation configurations can be achieved through the one or more signals, and the examples above are not meant to be limiting.

The smart textile-based garment 1100 may include an optional manifold 1165 between the pressure-changing device 1167, the haptic assemblies 1162, and/or other portions of the smart textile-based garment 1100. The manifold 1165 may include one or more valves (not shown) that pneumatically couple each of the haptic assemblies 1162 with the pressure-changing device 1167 via tubing. In some embodiments, the manifold 1165 is in communication with the controller 1175, and the controller 1175 controls the one or more valves of the manifold 1165 (e.g., the controller generates one or more control signals). The manifold 1165 is configured to switchably couple the pressure-changing device 1167 with one or more haptic assemblies 1162 of the smart textile-based garment 1100. In some embodiments, one or more smart textile-based garments 1100 or other haptic devices can be coupled in a network of haptic devices, and the manifold 1165 can distribute the fluid between the coupled smart textile-based garments 1100.

In some embodiments, instead of using the manifold 1165 to pneumatically couple the pressure-changing device 1167 with the haptic assemblies 1162, the smart textile-based garment 1100 may include multiple pressure-changing devices 1167, where each pressure-changing device 1167 is pneumatically coupled directly with a single (or multiple) haptic assembly 1162. In some embodiments, the pressure-changing device 1167 and the optional manifold 1165 can be configured as part of one or more of the smart textile-based garments 1100 (not illustrated) while, in other embodiments, the pressure-changing device 1167 and the optional manifold 1165 can be configured as external to the smart textile-based garments 1100. In some embodiments, a single pressure-changing device 1167 can be shared by multiple smart textile-based garments 1100 or other haptic devices. In some embodiments, the pressure-changing device 1167 is a pneumatic device, hydraulic device, a pneudraulic device, or some other device capable of adding and removing a medium (e.g., fluid, liquid, or gas) from the one or more haptic assemblies 1162.

The memory 1178 includes instructions and data, some or all of which may be stored as non-transitory computer-readable storage media within the memory 1178. For example, the memory 1178 can include one or more operating systems 1179, one or more communication interface applications 1181, one or more interoperability modules 1184, one or more AR processing applications 1185, one or more data-management modules 1186, and/or any other types of data defined above or described with respect to FIGS. 8A-10B.

The memory 1178 also includes data 1188, which can be used in conjunction with one or more of the applications discussed above. The data 1188 can include device data 1190, sensor data 1191, and/or any other types of data defined above or described with respect to FIGS. 8A-10B.

The different components of the computing system 1140 (and the smart textile-based garment 1100) shown in FIGS. 11A to 11C can be coupled via a wired connection (e.g., via busing). Alternatively, one or more of the devices shown in FIGS. 11A to 11C may be wirelessly connected (e.g., via short-range communication signals).

Example Handheld Controller Devices

In accordance with some embodiments described herein, the systems and devices described herein can be used in conjunction with one or more handheld controllers for use within an artificial-reality environment (e.g., the AR system 700c). Some example controllers for use by the systems herein will now be described in more detail below.

Figure 12A:
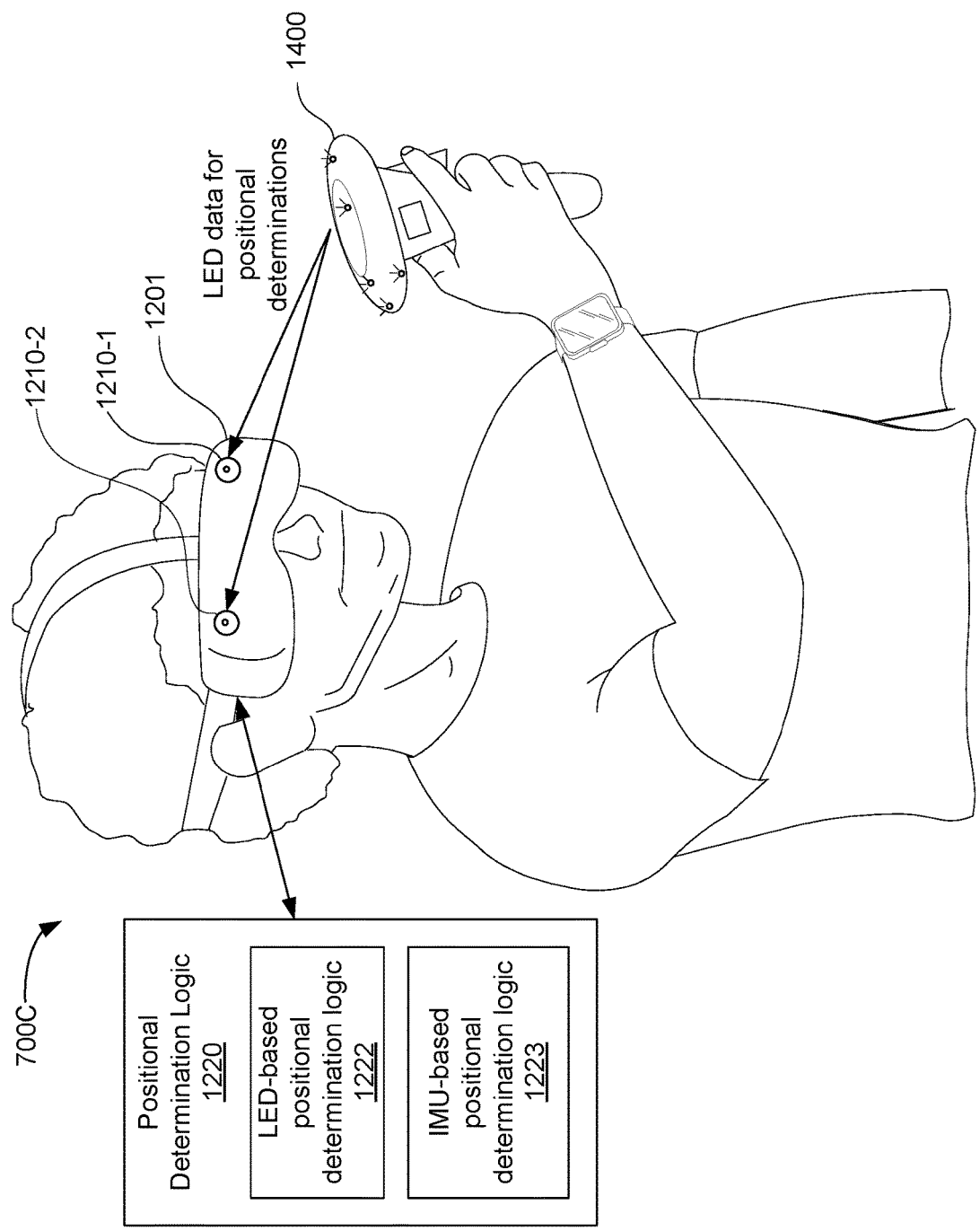
FIG. 12A is an illustration showing a scenario in which a user of an artificial-reality system is holding a controller that includes a desirable arrangement of illumination sources to assist with positional determinations for the controller in accordance with some embodiments.

FIG. 12A is an illustration showing a scenario in which a user of the artificial-reality system 700c is holding a controller 1400 that includes an arrangement of illumination sources to assist with positional determinations for the controller 1400 in accordance with some embodiments. The artificial-reality system 700c includes cameras 1210-1 and 1210-2 of a headset 1201, a handheld controller 1400 with desirably-positioned illumination sources (e.g., depicted as LEDs in this example and represented with the three lines extending from each LED to represent transmission of light), and positional determination logic 1220 (which includes LED-based positional determination logic 1222 and/or IMU-based positional determination logic 1223). In some examples, an algorithm and/or method is utilized to combine the IMU or motion-based positional determinations with the LED or vision-based positional determinations. Positional determination logic 1220 can be executed by a processor or microcontroller of the headset 1201 (or a processor or microcontroller that is at least in communication with the headset 1201, such as one of the central processing unit 1077 of the HIPD 1000). The positional determination logic 1220 can include an LED-based positional determination logic 1222 and/or an IMU-based positional determination logic 1223. The positional determination logic 1220 can be just one aspect and other modules can be associated with the headset 1201, and the other modules can include, for example, camera controller logic, display rendering logic, audio processing logic, and logic for processing other signals received directly from the handheld controller 1400 (e.g., signals generated by operation of buttons 435 (shown in FIG. 12B) or the thumbstick 1430 (shown in FIG. 12B) of the handheld controller).

Figure 12B:
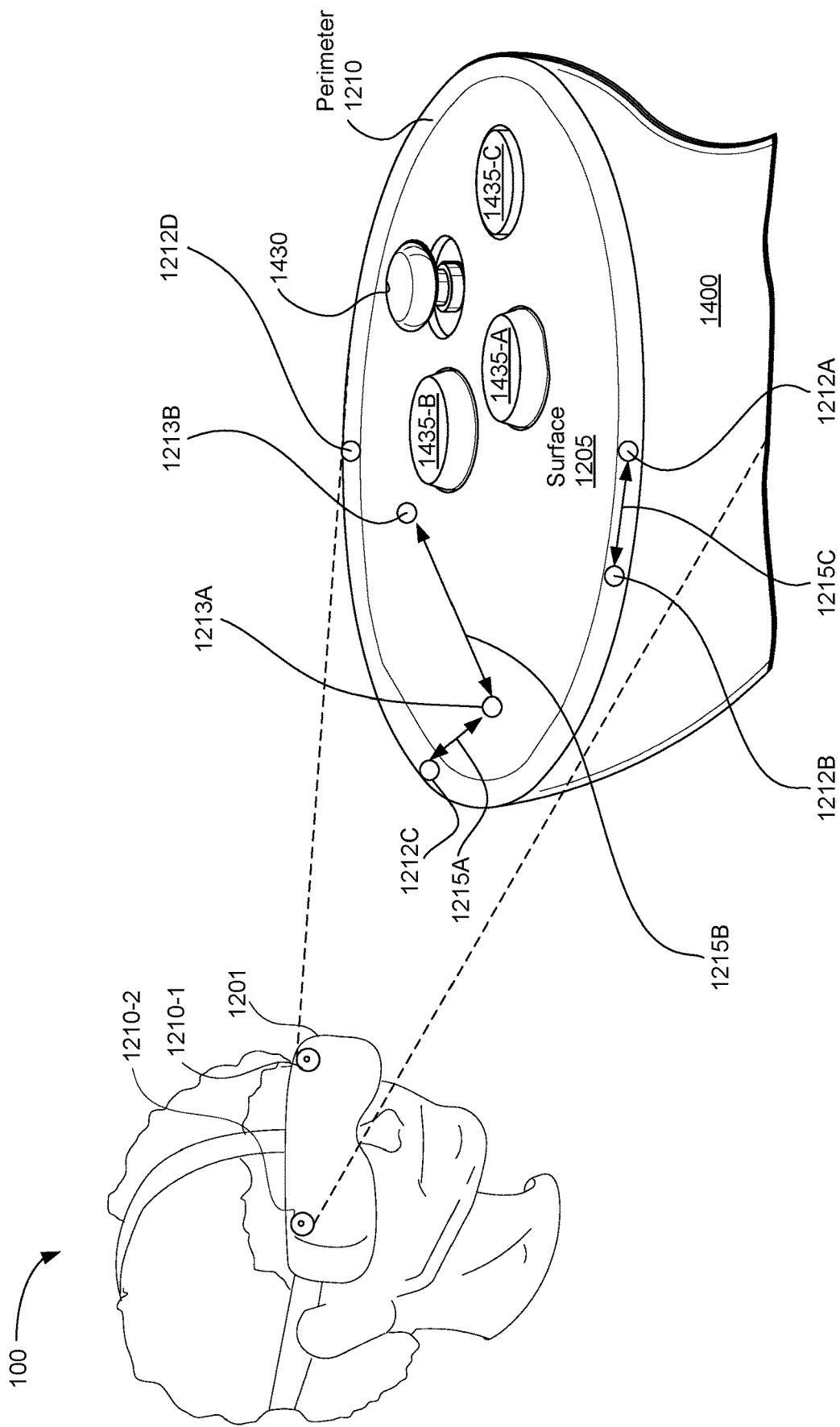
FIG. 12B illustrates a close-up view of the controller of FIG. 12A in accordance with some embodiments.

FIG. 12B illustrates a close-up view of the controller 1400 of FIG. 12A in accordance with some embodiments. The controller 1400 shown in FIG. 12A includes a surface 1205 and a perimeter 1210. As shown in FIG. 12B by the dashed lines extending from the cameras on the virtual-reality headset, the cameras 1210A and 1210B have a field of view (FOV) that enables them to view the controller 1400 and collect data from each of the illumination sources (e.g., the perimeter LEDs 1212 and the surface LEDs 1213 in the depicted example). In some embodiments, the cameras 1210A and 1210B are instances of the image sensors described previously (e.g., the image sensors 518 and/or 520). The desirable arrangement of illuminations sources (e.g., LEDs) can be selected such that the greatest number of illumination sources is viewable at the greatest number of orientations of the controller 1400 within the FOV of respective cameras 1210 of the headset 1201. As shown in FIG. 14B, certain of the illumination sources can be disposed at positions within a perimeter 210 of a top cover of the controller 1400, while others of the illumination sources can be disposed at positions within a front-facing outer surface 502 of the top cover of the controller 1400. Each of these respective positions, as well as how many illumination sources to position dispose at the perimeter and surface can be selected to achieve the goal of having the greatest number of illumination sources viewable at the greatest number of orientations of the handheld controller within the FOV of the cameras 1210 of the headset 1201. As explained in more detail below, it can also be desirable to select the respective positions by accounting for a digit-occluded region of the top cover of the controller 1400 and ensuring that certain illumination sources are positioned such that they are visible even while a digit is present within the digit-occluded region of the top cover and might be occluding some of the illumination sources. While the LEDs 1212 and 1213 are labelled as LEDs in FIG. 12B, it should be appreciated that the LEDs might not be externally exposed, but instead that each of the depicted circular LEDs is a position on the top cover at which light from a respective LED would be transmitted through, e.g., a light-transparent top cover to be viewable by a camera of an artificial-reality system (e.g., to the cameras 1210 of the headset 1201).

FIG. 12B also depicts examples of blur-reducing separation distances between adjacent illumination sources. These are shown as blur-reducing separation distances 1215, including examples showing blur-reducing separation distances between two perimeter-located illumination sources (e.g., blur-reducing separation distance 1215c between illumination sources 1212A and 1212B), blur-reducing separation distances between two surface-located illumination sources (e.g., blur-reducing separation distance 1215b between illumination sources 1213A and 1213B), and blur-reducing separation distances between one perimeter-location illumination source and a surface-located illumination source (e.g., blur-reducing separation distances 1215a between illumination source 1212C and illumination sources 1213A). In some embodiments, in addition to selecting appropriate positions at which to dispose the illumination sources, the blur-reducing separation distances can also be selected to further help to optimize the transmission of the light-based data from the illumination sources to cameras of an artificial-reality system, such that a blurring effect that can occur when two illumination sources are positioned too close together is reduced and/or eliminated (e.g., a reduction of at least 80% of a blurring effect).

Figure 13A:
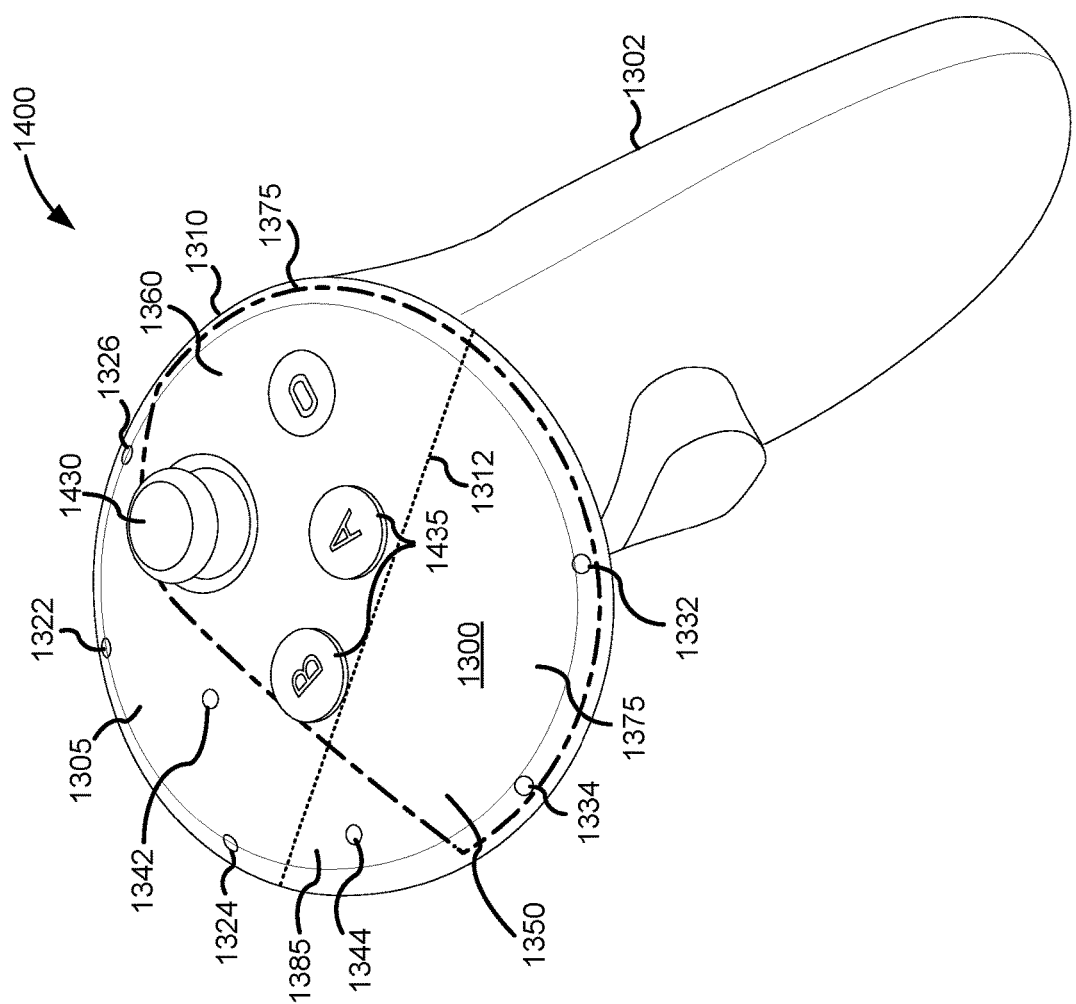
FIGS. 13A-13E illustrate example handheld controllers with arrangements of illumination sources in accordance with some embodiments.

FIG. 13A illustrates an example handheld controller 1400, in accordance with some embodiments. The handheld controller 1400 includes a handle 1302, a top cover 1300, a thumbstick 1430, and buttons 1435. The handheld controller 1400 can be the same handheld controller shown and described with reference to FIGS. 12A and 12B, as well as the handheld controller described below in connection with the other figures.

The top cover 1300 has a surface 1305 surrounded by a perimeter 1310. The surface 1305 has a digit-occluded region 1375 and a different region 1385 separated from the digit-occluded region. In some embodiments, the perimeter 1310 is chamfered or rounded downward from the surface 1305. In some embodiments, perimeter-positioned LEDs disposed within the perimeter are positioned at an angle that aligns with the rounded or chamfered perimeter to help improve visibility of light from the illumination sources by cameras of the headset 1201. FIG. 13A further shows an example flat-to-slant transition line 1312.

During operation (e.g., the operation scenarios shown in FIGS. 12A-12B), a user can hold the handheld controller 1400 at the handle 1302 such that handle 1302 is grasped in the user's palm, leaving one or more of the user's fingers and thumb (also referred to herein as "digits") available to operate the controls on the handheld controller 1400 (e.g., buttons 1435 or thumbstick 1430). Typically, the user may operate the thumbstick 1430 using a thumb (hence, the name thumbstick), but other digits may also be used depending on the user's preference.

During operation, the user holding the handheld controller 1400 by its handle 1302, may place a digit on the surface 1305 (this surface can be a region of the top cover of the controller that is outside of the perimeter 1310 shown in FIG. 12B) of the top cover 1300, e.g., when not operating the controls of the handheld controller 1400. Consequently, a portion of the top surface 1305 of the top cover 1300 can be at least partially occluded from the camera 1210 of the AR system 700c when a digit is present in this fashion or while otherwise interacting with buttons or the thumbstick 1430. Similarly, when operating the controls of the handheld controller 1400, a portion of the top surface 1305 of the top cover 1300 can be at least partially occluded from the camera 1210 of the AR system 700c. The entire region of the top surface 1305 that is potentially at least partially occluded from the camera 1210 of the AR system 700c when the user holding the handheld controller 1400 is using the handheld controller using a digit is referred to as the digit-occluded region (e.g., a digit-occluded region 1375). The digit-occluded region 1375 is within a reachable distance of a digit of the user at a time when the handheld controller is held by the user. An example digit-occluded region 1375 is depicted in FIG. 13A.

In contrast, the different region 1385 is a region of the top cover 1300 that is not occluded from the camera by a digit of the user when the user is operating the controls of the controller. The different region can be a region that is not within a reachable distance of any digit of the user while the handheld controller is held by the user at the handle 1302. An example different region 1385 is depicted in FIG. 13A.

The handheld controller 1400 further includes illumination sources (also referred to herein as light sources) located at various positions 1322, 1324, 1326, 1332, 1342, 1344 on the surface 1305 or along the perimeter 1310 of the top cover 1300. Additional examples of respective positions for illumination sources are shown and described in the context of FIGS. 12A to 12B and 13B to 13E. In some embodiments, the top cover 1300 of the handheld controller 1400 is transparent to light at the various positions where the illumination sources are located to enable the illumination sources to transmit light-based data to the camera 1210.

The illumination sources may be light emitting diodes (LEDs) and may have same or different colors. In some embodiments, a single light source, e.g., an LED or a laser, may provide light to one or more illumination sources (e.g., simultaneously or sequentially). For example, a single LED may provide light to more than one illumination sources using, e.g., a light guide or an optic fiber connected to the LED and guiding the light from the LED to corresponding illumination sources.

The illumination sources are disposed at various positions throughout the surface 1305 of the top cover 1300 to be viewable by the camera 1210 in a (maximum) number of orientations of the handheld controller 1400 when a user is using the handheld controller 1400. For example, a first position 1322 is located on the perimeter 1310 in the different region 1385, a second position 1332 is disposed on the perimeter 1310 in the digit-occluded region 1375, a third position 1326 is disposed on the perimeter 1310 in the different region 1385, and a fourth position 1342 disposed on the surface 1305 in the different region 1385. Other illumination sources located at various other positions, e.g., 1344, 1324, etc. may also be present on the handheld controller 1400. The illumination sources provide data from the handheld controller 1400 which is used by the camera 1210 to make determinations of the position and orientation of the handheld controller 1400 relative to the camera when the user is operating the handheld controller 1400.

The illumination sources are disposed such that adjacent illumination sources are separated from one another by at least a blur-reducing separation distance (e.g., as was described for the example of FIG. 12B). For example, the adjacent illumination sources at positions 1332 and 1334 disposed within the digit-occluded region 1375 are separated from one another by at least a first blur-reducing separation distance. Similarly, adjacent illumination sources at positions 1322 and 1324 disposed within the different region 1385 are separated from one another by at least a second blur-reducing separation distance. In some embodiments, the first blur-reducing separation distance is different from the second blur-reducing separation distance.

Likewise, adjacent illumination sources at positions 1322, 1324, 1326, 1332, and/or 1334 disposed along the perimeter 1310 of the top cover 1300 are separated from one another by at least a third blur-reducing separation distance, and the adjacent illumination sources at positions 1342 and 1344 disposed on the surface 1305 of the top cover 1300 are separated from one another by at least a fourth blur-reducing separation distance. In some embodiments, the third blur-reducing separation distance and fourth blur-reducing separation distance are different.

In some embodiments, at least one illumination source is disposed at a position (e.g., 1342) closer to one of the buttons 1435. In some embodiments, at least one illumination source is disposed between the thumbstick 1430 and one of the buttons 1435. In embodiments in which the perimeter 1310 is chamfered, the illumination sources disposed along the perimeter 1310 may be disposed at an angle that aligns with the rounded portion of the perimeter 1310, e.g., tangential to the curve of the perimeter 1310.

In some embodiments, a first illumination source is disposed within the digit-occluded region at a first position (e.g., 1332) along the perimeter 1310. The first position is selected such that it is visible to the camera 1210 while the handheld controller 1400 is in one of a first set of orientations, e.g., when the user is tilting the handheld controller 1400 rightward while operating the thumbstick 1430 such that the illumination source at position 1332 is not occluded by the digit of the user.

In some embodiments, a second illumination source is disposed within the digit-occluded region at a second position (e.g., 1334) along the perimeter 1310. The second position is selected such that it is visible to the camera 1210 while the handheld controller 1400 is in one of a second set of orientations, e.g., when the user is holding the handheld controller 1400 flat while operating the thumbstick 1430 such that the illumination source at position 1334 is not occluded by the digit of the user.

In some embodiments, the first position 1332 is located to be visible to the camera 1210 while the digit of the user is at least partially occluding the second position 1334 from the camera 1210; and the second position 1334 is located to be visible to the camera 1210 while the digit of the user is at least partially occluding the first position 1332 from the camera 1210.

In some embodiments, a third illumination source is disposed within the different region at a third position (e.g., 1344) on the surface 1305 of the top cover 1300 such that the third position is away from the perimeter. In some embodiments, the second position 1334 and the third position 1344 are visible to the camera 1210 while the digit of the user is within the digit-occluded region.

In some embodiments, the surface 1305 of the top cover 1300 includes a flat surface 1360 adjacent a first portion of the perimeter 1310 of the top cover 1300, and an angled surface 1350 extending at an angle away from the flat surface 1360 to a second portion of the perimeter 1310 of the top cover 1300 (e.g., the angled surface can begin at a transition point of a flat or planar surface of the top cover, e.g., the transition line 1312 in FIG. 13A). For example, the angle at which the angled surface 1350 extends away from the flat surface 1360 is designed to enable ergonomic comfort for the user when operating the controls of the handheld controller. In addition, the angle at which the angled surface 1350 extends away from the flat surface 1360 may be designed such that the surface 1305 of the handheld controller 1400 is viewable by the camera 1210 in a (maximum) number of orientations of the handheld controller 1400 when the user is operating the controls of the handheld controller 1400. Thus, the angle between the flat surface 1360 and the angled surface 1350 may be in a range from 90° to 179°. For example, the angle between the flat surface 1360 and the angled surface 1350 may be 95°, 100°, 105°, 110°, 115°, 120°, 125°, 130°, 135°, 140°, 145°, 150°, 155°, 160°, 165°, 170°, 175°, or any value between any two of these values.

In such embodiments, the handheld controller 1400 may include a first illumination source positioned at a first portion of the perimeter 1310 (e.g., position 1324) or at a second portion of the perimeter 1310 (e.g., position 1332) to be visible to a camera (e.g., camera 1210) of the virtual-reality system. A second illumination source is positioned at the flat surface 1360 of the top cover (e.g., position 1342) to be visible to the camera (e.g., camera 1210). A third illumination source is positioned at the angled surface 1350 (e.g., position 1344) to be visible to the camera (e.g., camera 1210). In some embodiments, the third illumination source is positioned away from the digit-occluded region.

The angled surface 1350 includes a digit-occluded region 1375 that is occluded from the camera when a digit of a user who is holding the handheld controller 1400 is at or near the digit-occluded region 1375, and the different region 1385 that is not occluded from the camera by a digit of a user who is holding the handheld controller when the user is operating the controls of the handheld controller 1400. In some embodiments, an additional illumination source is positioned along the perimeter 1310 of the top cover 1300 in the digit-occluded region (e.g., position 1334).

In accordance with some embodiments, two or more of the various illumination sources are configured to provide data to a camera (e.g., camera 1210) of the virtual-reality system. For example, the camera is a position-tracking camera 1210 configured to monitor the data to allow the artificial-reality system to determine, in part, a current position of the handheld controller in a three-dimensional space. In some embodiments, data from the position-tracking camera is combined with motion data (e.g., from an IMU sensor) to track the controller.

In some embodiments, the positions of the various illumination sources are selected such that at least two of the positions are visible to the camera at a greatest number of orientations of the handheld controller relative to the camera in a three-dimensional space. In some embodiments, respective gains (e.g., brightness levels) of the illumination sources are configured/adjusted to reduce (or prevent) illumination/blob merging. In some embodiments, an exposure time and/or gain of the camera is adjusted to reduce (or prevent) illumination/blob merging. In some embodiments, a resolution of the camera is adjusted to reduce (or prevent) illumination/blob merging. For example, a 1280×1080 resolution is used (without downsampling) to identifying the illumination sources. In some embodiments, illumination timing (e.g., a duty cycle) of the illumination sources is configured/adjusted to reduce (or prevent) illumination/blob merging. For example, the illumination sources are configured to have an on time of less than 20 microseconds, less than 15 microseconds, or less than 10 microseconds.

Figure 13B:
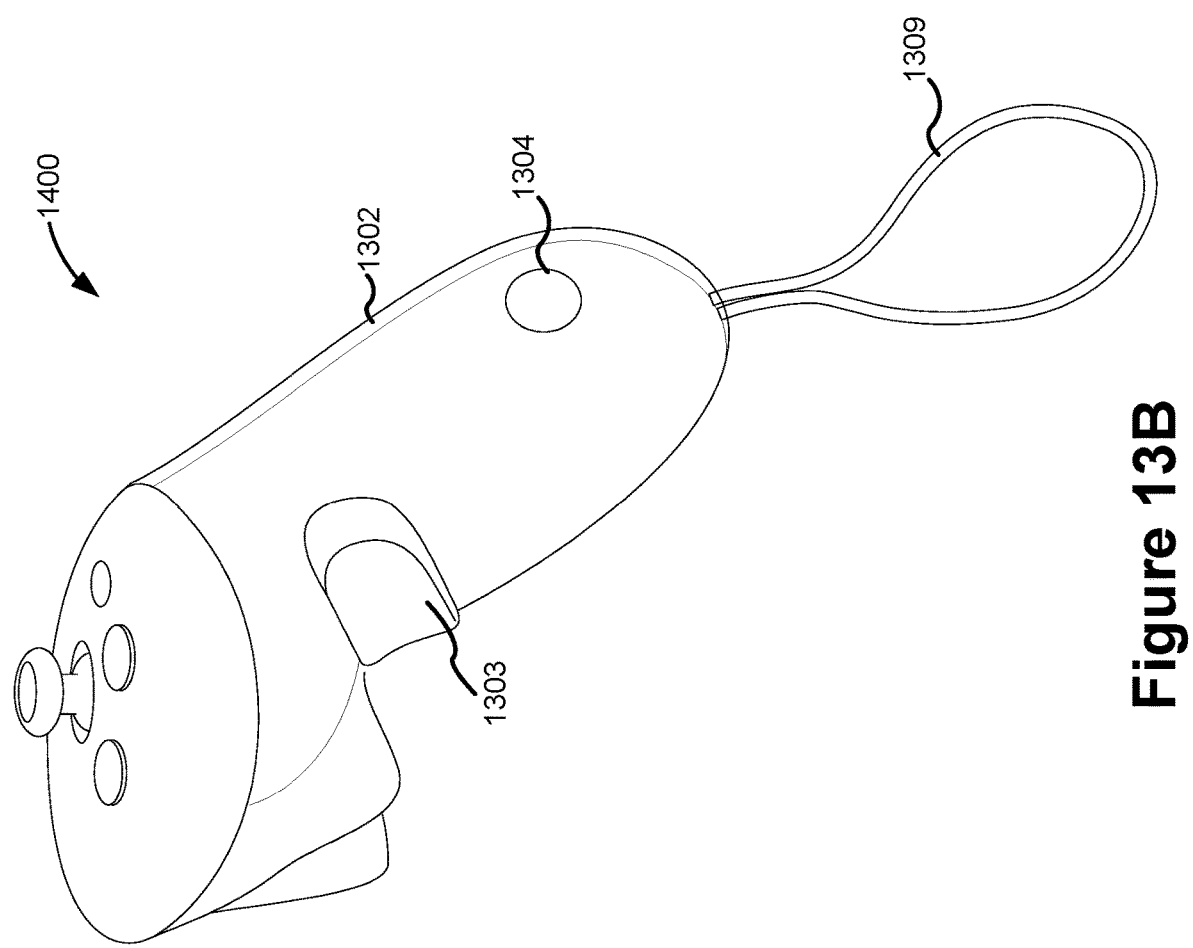
Figure 13D:
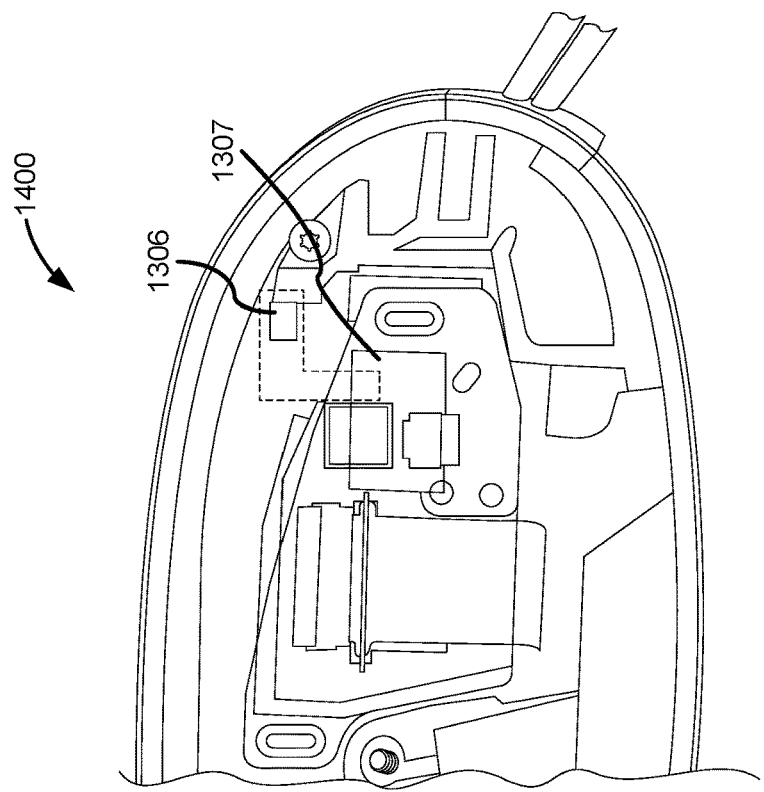
Figure 13C:
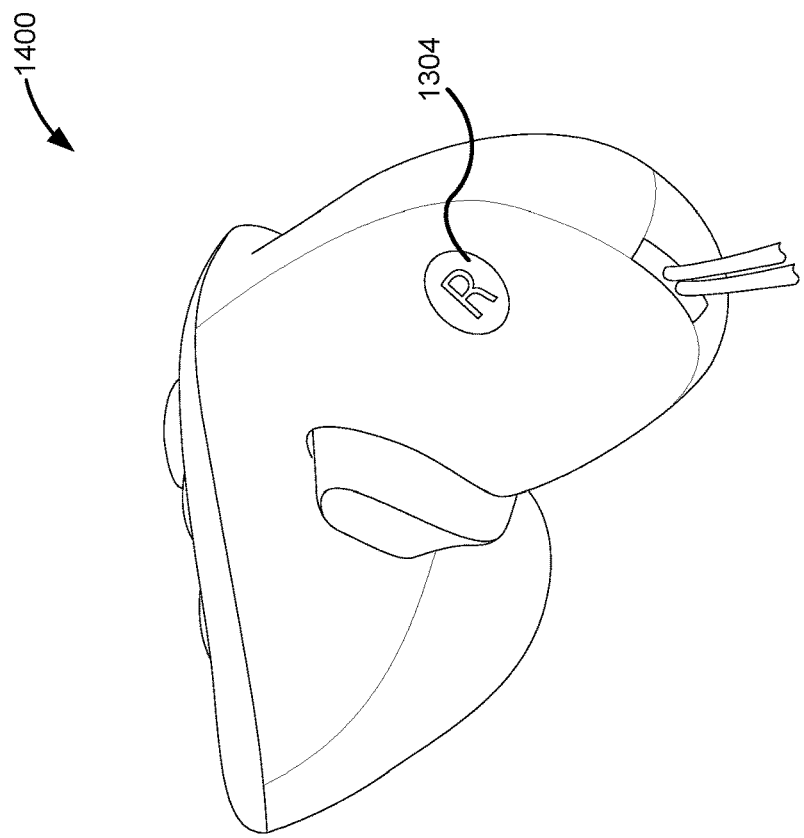

FIGS. 13B and 13C illustrate the handheld controller 1400 including an illumination source 1304 at a position on the handle 1302, in accordance with some embodiments. In some embodiments, the illumination source 1304 is positioned at a location on the handle 1302 that is unlikely to be covered by a user's hand while the user is using the handheld controller 1400 (e.g., a bottom portion of the handle). In accordance with some embodiments, the controller 1400 in FIG. 13B includes a lanyard 1309. In some circumstances, the addition of the illumination source 1304 in the handle 1302 improves tracking (and reacquisition of) the controller 1400. The illumination source 1304 may also improve pose stability for the controller 1400 and constellation tracking. In some embodiments, more than one illumination source is positioned in the handle 1302. In some embodiments, two illumination sources in the handle 1302 are separated by a predefined distance (e.g., to reduce illumination merging and/or occlusion risks). In some embodiments, the handle 1302 has a cover composed of a transparent (e.g., an IR transparent) material. In some embodiments, the handle 1302 includes a transparent window (e.g., an IR transparent window) for the illumination source 1304.

The handheld controller 1400 in FIGS. 13B and 13C is configured to be gripped by a right hand of the user and the illumination source 1304 is located on a side of the handle 1302 that faces to the user's left while the user is using the handheld controller 1400. The handheld controller 1400 includes a button 1303 on the handle 1302 in accordance with some embodiments. In some embodiments, an artificial-reality system includes the handheld controller 1400 and a second handheld controller configured to be held in the user's left hand while the user is using it. In some embodiments, the second handheld controller has a mirrored arrangement to the handheld controller 1400. For example, the second handheld controller has an illumination source at a position on its handle that faces to the user's right while the user is using the second controller.

FIG. 13D illustrates an interior view of the handheld controller 1400 in accordance with some embodiments. FIG. 13D shows an illumination source 1306 corresponding to the illumination source 1304 and coupled to an interface board 1307 of the handheld controller 1400. In some embodiments, the illumination source 1306 is communicatively coupled to the interface board 1307 via a flex cable or flexible printed circuit board. In some embodiments, a cover of the handle 1302 includes a transparent window for a particular band of light (e.g., IR transparent) to allow illumination from the illumination source 1306 to leave the handle 1302. In some embodiments, the transparent window is coupled to a lanyard mount (e.g., for the lanyard 1309).

Figure 13E:
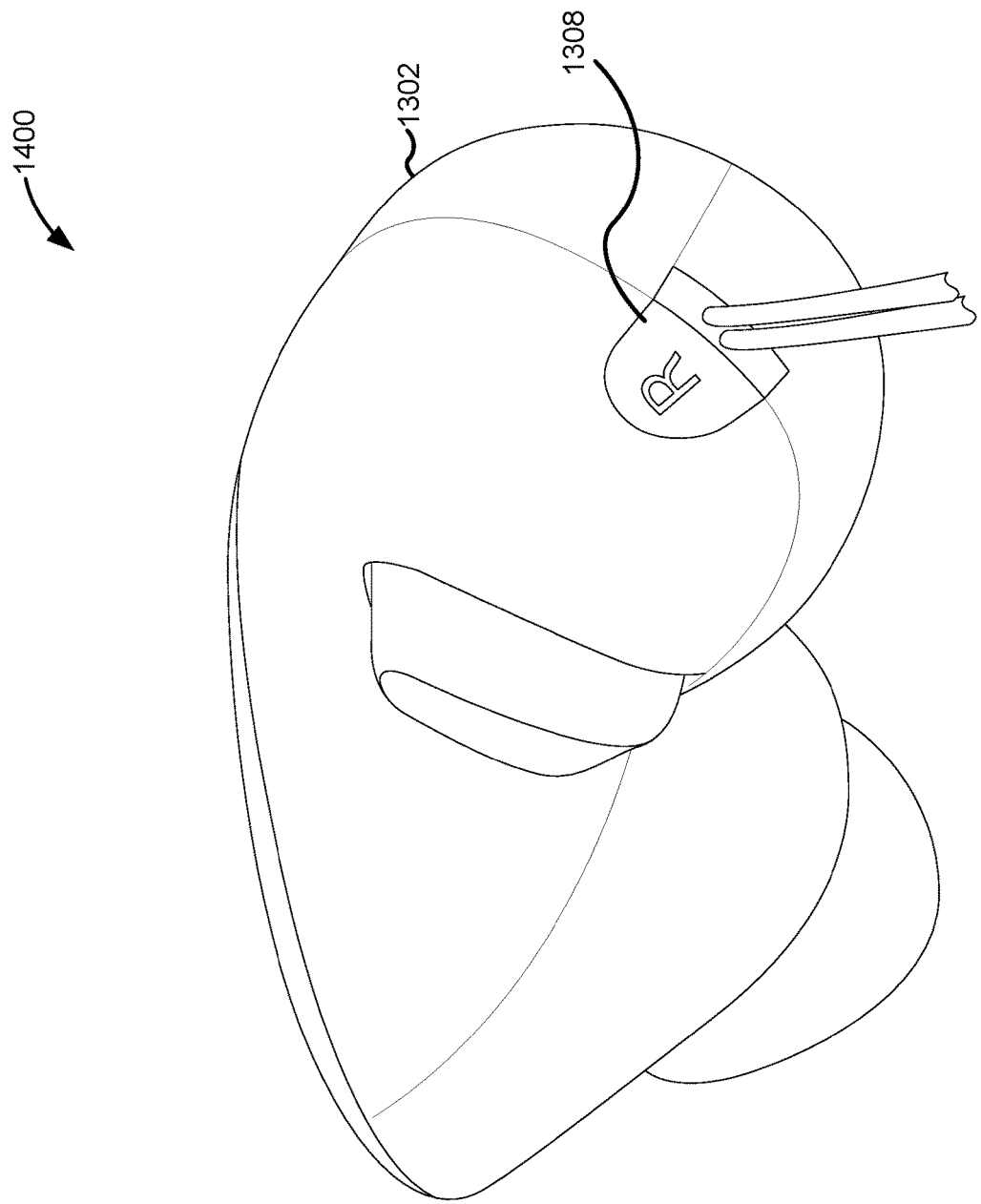

FIG. 13E illustrates an example of the handheld controller 1400 with an illumination source 1308 in accordance with some embodiments. The illumination source 1308 is located at a bottom of the handle 1302. In some embodiments, the handheld controller 1400 includes two or more illumination sources on the handle (e.g., at the locations shown in FIGS. 13B and 13E). The illumination source 1308 may have more occlusion issues (e.g., due to the lanyard 1309) as compared to the illumination source 1304.

In some circumstances, the addition of an illumination source on the handle reduces jitter in controller tracking and/or improves reacquisition time after the controller leaves a field of view (FOV) of a camera of the system. As an example, the controller 1400 may be used for fencing poses and/or boxing poses that cause the controller to leave the FOV then reenter (requiring reacquisition by the tracking system). In some embodiments and circumstances, the addition of an illumination source on the handle (e.g., the illumination source 1304 or 1308) improves vision tracking by 10-15%. In some embodiments and circumstances, the addition of an illumination source on the handle improves fusion tracking (e.g., combining vision-based tracking data with motion-based tracking data) by 3-7%. In some embodiments and circumstances, the addition of an illumination source on the handle improves the average number of blobs matched per frame by 1-2 blobs. In some embodiments and circumstances, the addition of an illumination source on the handle improves the average number of illumination sources matched per frame by 1-2 illumination sources.

Figure 14:
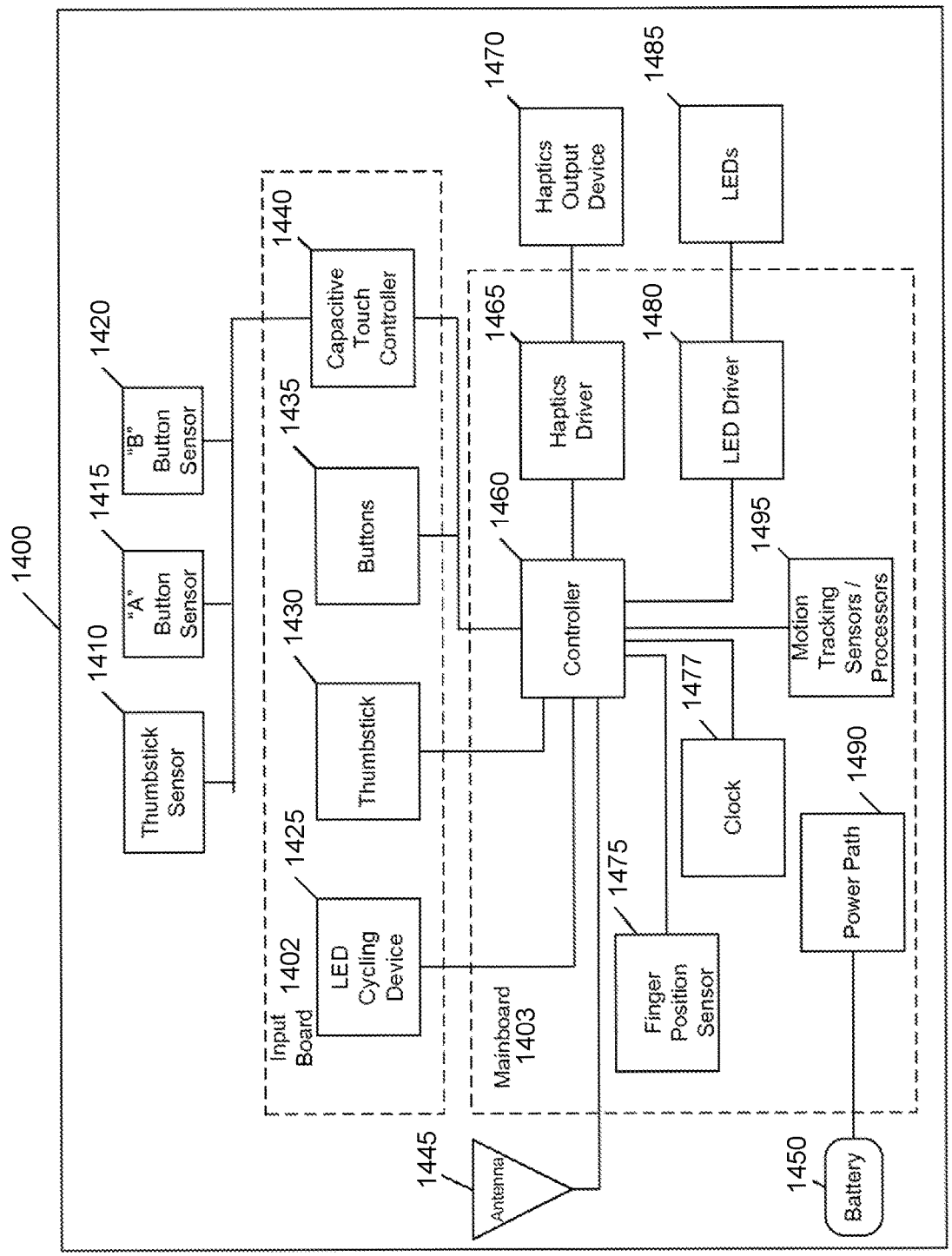
FIG. 14 is a block diagram illustrating an electrical configuration of an example handheld controller in accordance with some embodiments.

FIG. 14 is a block diagram illustrating an example electrical configuration of the handheld controller 1400 in accordance with some embodiments. In the example of FIG. 14, the handheld controller 1400 includes an input board 1402 and a mainboard 1403 coupled to the input board 1402 (e.g., via a flexible printed circuit (FPC) housed by the handheld controller 1400. The input board 1402 includes a thumbstick 1430 and buttons 1435. In some embodiments, the input board 1402 also includes a capacitive touch controller 1440 and an LED cycling device 1425. In other examples, the input board 1402 includes additional or alternative user-input keys.

The capacitive touch controller 1440 is coupled to multiple sensors such that the input board 1402 receives sensed signals from capacitive sensors resulting from a user's touch. For example, the capacitive sensors include a thumbstick sensor 1410, an "A" button sensor 1415, and/or a "B" button sensor 1420. For example, the thumbstick sensor 1410 senses a signal resulting from the user touching the thumbstick. Further, the button sensors 1415 and 1420 sense signals resulting from the user touching the buttons 1415 and 1420. Other capacitive sensors may be included for other user-input keys (e.g., a directional pad).

In some embodiments, the mainboard 1403 includes a controller 1460, a haptics driver 1465, a finger position sensor 1475, a clock 1477, a power path 1490, and an LED driver 1480. The haptics driver 1465 drives a haptics output device 1470 that provides haptic effects. An example of the haptics output device 1470 includes a short vibration feedback device that, when activated, causes the handheld controller 1400 to vibrate. In some embodiments, the mainboard 1403 includes one or more motion tracking sensors and/or processors 1495 coupled to the controller 1460.

The mainboard 1403 may be coupled to an antenna 1445 to wirelessly receive and transmit signals. The handheld controller (e.g., the controller 1400) thus may be wireless. The mainboard 1403 may also be coupled to a power source (e.g., a battery 1450) to provide power supply to the handheld controller 1400. The power may be supplied to the mainboard 1403 and to the input board 1402 through a power path 1490.

The LED driver 1480 drives light sources 1485 (e.g., the light sources at positions 1322, 1324, 1326, 1332, 1342, and 1344 on the surface of the handheld controller 1400) under the control of the controller 1460, and thus turns the light sources 1485 on or off.

The finger position sensor 1475 senses a position of the finger (e.g., when a user activates the one of the buttons) and this information is processed by the controller 1460.

The camera 1210, includes at least one sensor for sensing light emitted by the light sources 1485 and a controller for processing the light images received for the light sources 1485 to detect positions of the controller over time (e.g., as was described above in conjunction with the illumination sources of the controllers 1400 shown in FIGS. 12A-13E).

EXAMPLE EMBODIMENTS

Turning now to some example embodiments.

(A1) In one aspect, a head-wearable device is provided. The head-wearable device includes a depth-tracking component (e.g., the depth tracking component 104) configured to obtain depth information associated with one or more objects in a physical environment of the head-wearable device. For example, the head-wearable device 100 includes the depth tracking component 528, which is configured to perform depth-tracking operations by projecting structured light onto physical objects (e.g., the controller 1400) with the physical surroundings of the user. The head-wearable device includes a set of peripheral camera components (e.g., the peripheral camera components 114). The head-wearable device also includes a set of forward-facing camera components (e.g., the forward-facing camera components 102), where each forward-facing camera component of the set of forward-facing camera components includes a monochrome camera and a color camera. For example, the components 504-1 and 504-2 each include imaging sensors 518 and 520.

(A2) In some embodiments of A1, the monochrome camera has a higher refresh rate than the color camera. In some embodiments, the monochrome camera has a refresh rate that is at least 1.5 times the refresh rate of the color camera. In some embodiments, the refresh rate(s) of one or both of the monochrome camera and the color camera are determined based on an aspect of a projector (e.g., the depth tracking component 528) being used in conjunction with the monochrome camera and the color camera.

(A3) In some embodiments of A1 or A2, the color camera has a higher resolution than the monochrome camera. In some embodiments, the color camera is a 16-megapixel camera. In some embodiments, the color camera is a 4-megapixel camera and the monochrome camera is a 1.3-megapixel camera.

(A4) In some embodiments of any of A1-A3, the monochrome camera and the color camera are co-located such that a field of view of the monochrome camera substantially overlaps with a field of view of the color camera. For example, the exploded view in FIG. 5C shows the imaging sensors 518 and 520 vertically stacked along a same plane. In some embodiments, the color camera has a 120-degree field of view and the monochrome camera has a 150-degree field of view.

(A5) In some embodiments of any of A1-A4, each forward-facing camera component of the set of forward-facing camera components further includes a cover window, and the monochrome camera and the color camera are co-located behind the cover window. For example, each component 504-1 includes imaging sensors 518-1 and 520-1, and component 504-2 includes image sensors 518-2 and 520-2, and each of the sets of imaging sensors 518 and 520 are behind the respective cover windows 512-1 and 512-2.

(A6) In some embodiments of A5, the cover window is composed of glass. For example, each of the cover window stacks 601 and 603 shown in FIGS. 6A and 6B include respective layers of glass material (e.g., the glass layers 604 and 654). In some embodiments, the cover window is composed of an alkali aluminosilicate glass material.

(A7) In some embodiments of A5 or A6, the cover window is configured to be (i) transparent (e.g., has a transparency above 50%, 70%, or 90%) in a range of visible wavelengths, (ii) transparent (e.g., has a transparency above 50%, 70%, or 90%) in a range of infrared wavelengths, and (iii) transparent (e.g., has a transparency above 50%, 70%, or 90%) across respective fields of view of the monochrome camera and the color camera (e.g., transparent across a 150-degree field of view).

(A8) In some embodiments of any of A1-A7, the head-wearable device is an artificial reality device (e.g., the AR device 900 and/or the VR device 910), and the color camera is configured for a color passthrough mode of the artificial reality device.

(A9) In some embodiments of any of A1-A8, the monochrome camera is configured for depth sensing and/or object tracking. For example, the depth tracking component 528 may be configured to direct structured light towards a controller (e.g., the HIPD 1000, the controller 1400) that the user 702 is using to interacting with the AR system 700a, and the light may be directed back to the respective imaging sensors 518 and 520 of the set of components 504.

(A10) In some embodiments of any of A1-A9, the set of peripheral camera components are configured for hand and/or controller tracking. For example, the peripheral camera components 114-1 and 114-2 may be used to track the controller 1400 (e.g., by receiving structured light projected by the depth tracking component 528).

(A11) In some embodiments of any of A1-A10, the set of peripheral camera components includes one or more fixed-focus monochrome cameras. In some embodiments, the set of peripheral camera components includes one or more cameras having a field of view of 150 degrees. In some embodiments, the set of peripheral camera components are configured to capture light having wavelengths in the range of 400 nm to 900 nm.

(A12) In some embodiments of any of A1-A11, the depth-tracking component includes a structured light generator (e.g., a projector).

(A13) In some embodiments of any of A1-A12, the head-wearable device includes a cover window (e.g., the cover window 522) positioned in front of the depth-tracking component, and a microphone co-located with the depth-tracking component behind the cover window.

(A14) In some embodiments of any of A1-A13, the cover window includes an aperture adjacent to the microphone. For example, the cover window 522 includes an opening for receiving audio (e.g., at a microphone covered by the cover window) at the head-wearable device 100.

(A15) In some embodiments of any of A1-A14, the head-wearable device further includes a processing unit (e.g., the processor(s) 948A) configured to colorize one or more images from the monochrome camera using color information from the color camera. In some embodiments, the respective sensors of each of the sets of components 504-1, 504-2, and 506 are coupled to the processing unit with one or more respective flexible-printed circuits (FPCs) on an inner surface of the front-facing outer surface 502.

(A16) In some embodiments of any of A1-A15, the color camera is an RGB camera. For example, the camera 212 shown in FIG. 2B may be an RGB camera.

(A17) In some embodiments of any of A1-A16, the monochrome camera has a larger field of view than the color camera. For example, the color camera (e.g., the camera 212) may have a field of view of 120 degrees, and the monochrome camera (the camera 214) may have a field of view of 150 degrees.

(A18) In some embodiments of any of A1-A17, the set of forward-facing camera components includes a first forward-facing camera component arranged on a first side of the depth-tracking component and a second forward-facing camera component arranged on a second side of the depth-tracking component. For example, the forward-facing camera component 504-1 is on a first side (e.g., the right side) of the depth tracking component 528, and the forward-facing camera 504-2 is on a second side (e.g., the left side) of the depth tracking component 528.

(A19) In some embodiments of any of A1-A18, the set of peripheral camera components includes a first peripheral camera component (e.g., the peripheral camera 114-1) arranged on a first side of a peripheral of the head-wearable device and a second peripheral camera component (e.g., the peripheral camera 114-2) arranged on a second side of the peripheral of the head-wearable device. For example, FIG. 1E shows the peripheral camera 114-1 on a first side of the head-wearable device 100, and FIG. 1F shows the second peripheral camera 114-2 on a second side of the head-wearable device 100. In some embodiments, one or more of the peripheral cameras are covered by a respective cover window, which may be the same or different than the cover windows described herein with respect to the sets of components covering front-facing outer surfaces (e.g., the front-facing outer surface 502) of head-wearable devices.

(A20) In some embodiments of any of A1-A19, the head-wearable device is configured to operate with a handheld controller (e.g., the handheld controller 1400) that includes illumination sources used for position-tracking purposes, the illumination sources being disposed under a top cover (e.g., the top cover 1300) of the handheld controller, and the head-wearable device is configured to track a position of the handheld controller using image data of the illumination sources from the monochrome camera and/or the set of peripheral camera components.

(B1) In another aspect, a head-wearable device is provided. The head-wearable device may be the head-wearable device of any of A1-A20 above. The head-wearable device includes a front-facing outer surface (e.g., the front-facing outer surface 502 shown in FIGS. 5A to 5C). The head-wearable device further includes a first set of components (e.g., the set of components 504) arranged along a first dimension (e.g., the dimension 507) of the front-facing outer surface, where each component of the first set of components includes a respective first set of sensors (e.g., the image sensors 518-1 and 520-1), and a respective first cover window (e.g., the cover window 512-1), where the respective first cover window is a first type of cover window (e.g., a camera cover window) including a first stack of material layers. For example, the cover windows 512-1 and 512-2 are of a first type corresponding to the cover window stack 601. The head-wearable device also includes a second set of components (e.g., the set of components 506) arranged along the first dimension of the front-facing outer surface, where each component of the second set of components includes a respective second set of sensors (e.g., the depth tracking component 528), and a respective second cover window (e.g., the cover window 522), where the respective second cover window is a second type of cover window (e.g., a projector cover window) including a second stack of material layers, distinct from the first stack of material layers. The first type of cover window may be configured to prevent reflection of light entering the cover window so that the light is able to be captured by the image sensors. The second type of cover window may be configured to prevent reflection of light leaving the cover window (e.g., emitted by a projector) so that the light can be used for illumination and/or depth sensing.

In some embodiments, the first type of cover window (e.g., the cover window 512) is configured to allow light to pass in (e.g., without reflection) to the first set of sensors (e.g., the imaging sensors 518 and 520). In some embodiments, the second type of cover window (e.g., the cover window 522) is configured to allow light to be emitted from the second set of sensors (e.g., without reflection). By providing cover windows, which may be made of scratch-resistant, chemically strengthened glass, the embodiments described herein provide improvements in protecting cameras, projectors, and/or other sensor components (e.g., SLAM sensors) from damage and/or dust ingress, while also meeting optical requirements for light transmissivity and reflectivity for respective cameras and projectors. In some embodiments, each cover window is adapted to reduce reflections across a corresponding field of view of the sensors behind the cover window (e.g., a camera with a field of view of 120 degrees, 150 degrees, or 70 degrees). In some embodiments, the first cover window has a high transparency (e.g., greater than 50%) in a range of visible wavelengths. In some embodiments, the second cover window has a low transparency (e.g., less than 50%) in the range of visible wavelengths. In some embodiments, the second cover window has a high transparency (e.g., greater than 50%) in a range of infrared wavelengths.

(B2) In some embodiments of B1, the first type of cover window includes a first type of anti-reflective coating (e.g., the anti-reflective material 602), and the second type of cover window includes a second type of anti-reflective coating (e.g., anti-reflective material 658), distinct from the first type of anti-reflective coating. In some embodiments, the first and second types of cover windows each include the first type of anti-reflective coating (e.g., on an outer surface of the cover window). In some embodiments, the second type of anti-reflective coating is on an inner surface of the cover window. In some embodiments, the first type of anti-reflective coating is adapted to reduce reflections of light passing from the environment to the sensors of the respective component (e.g., inbound light). In some embodiments, the second type of anti-reflective coating is adapted to reduce reflections of light pass from the sensors of the respective component (e.g., outbound light).

(B3) In some embodiments of B2, the second type of anti-reflective coating includes at least one metallic material (e.g., Titanium), where the metallic material is configured to reduce reflection of incident light having a corresponding wavelength in a first range of wavelengths. In some embodiments, the first type of anti-reflective coating consists of non-metallic materials. In some embodiments, the metallic material is adapted to reduce reflection of infrared light. In some embodiments, the first type of anti-reflective coating is adapted to reduce reflection of visible light and/or infrared light. In some embodiments, the first range of wavelengths includes a range of 400 nm to 900 nm.

(B4) In some embodiments of B2 or B3, the first type of anti-reflective coating includes two or more layers of silicon dioxide and two or more layers of silicon nitride. For example, the first type of anti-reflective coating includes alternating layers of silicon dioxide (SiO2) and silicon nitride (Si3N4). In some embodiments, the layers of silicon dioxide are alternating with the layers of silicon nitride. In some embodiments, each layer of silicon dioxide has a thickness less than 200 nm. In some embodiments, each layer of silicon nitride has a thickness less than 100 nm. In some embodiments, the thickness of each layer of silicon nitride and/or silicon dioxide is adapted to reduce reflections of a particular wavelength (or range of wavelengths) of light. In some embodiments, the outermost layer of the anti-reflective coating is the thickest. In some embodiments, the innermost layer of the anti-reflective coating is the thickest.

(B5) In some embodiments of any of B2-B4, the first type of anti-reflective coating is applied via ion sputtering. For example, the first type of anti-reflective coating is applied to a glass material of the cover window. As an example, the ion sputtering process may be selected to apply the first type of anti-reflective coating without damaging the glass material.

(B6) In some embodiments of any of B2-B5, the second type of anti-reflective coating includes two or more layers of silicon dioxide, and two or more other layers of titanium dioxide. For example, the second type of anti-reflective coating includes alternating layers of silicon dioxide and titanium dioxide. In some embodiments, each layer of silicon dioxide has a thickness less than 200 nm. In some embodiments, each layer of titanium dioxide has a thickness less than 100 nm. In some embodiments, the thickness of each layer of titanium dioxide and/or silicon dioxide is adapted to reduce reflections of a particular wavelength (or range of wavelengths) of light. In some embodiments, the outermost layer of the anti-reflective coating is the thickest. In some embodiments, the innermost layer of the anti-reflective coating is the thickest.

(B7) In some embodiments of B6, the second type of anti-reflective coating is evaporated onto a surface of the respective second cover window. For example, the second type of anti-reflective coating is applied to an ink layer of the second cover window via an evaporation process. For example, the evaporation process is selected to apply the second type of anti-reflective coating to the ink layer without damaging the ink layer.

(B8) In some embodiments of any of B1-B7, each component in the first set of components includes a first type of adhesive (e.g., the adhesive 514-1 or 514-2) to couple the component to the front-facing outer surface (e.g., the front-facing outer surface 502), where the first type of adhesive has a first characteristic surface pattern (e.g., a hollow ovular pattern), and each component in the second set of components includes a second type of adhesive to couple the component to the front-facing outer surface, where the second type of adhesive has a second characteristic surface pattern (e.g., a pattern that conforms to cutouts for the sensors of the component). In some embodiments, the first type of adhesive covers only a perimeter of the first cover window. For example, the first type of adhesive is not applied to an interior of the cover window to so that it does not impair a field of view of a camera in the first set of sensors. In some embodiments, the second adhesive attaches to a perimeter portion and an interior portion of the second cover window (e.g., the second set of sensors does not include a camera).

(B9) In some embodiments of B8, the first and second types of adhesives are composed of a pressure-sensitive adhesive material. In some embodiments, the first type of adhesive and/or the second type of adhesive are pressure-sensitive adhesives (e.g., adhesives that are activated without requiring heat). For example, pressure-sensitive adhesives (PSAs) are used to attach the components to the front-facing outer surface without applying heat (e.g., to prevent heat-based damage to the components and to the front-facing outer surface). In some embodiments, at least one of the first type of adhesive and the second type of adhesive is a temperature-sensitive adhesive. In some embodiments, the first and second types of adhesives are composed of chemical-resistance acrylic foam.

(B10) In some embodiments of any of B1-B9, the first stack of material layers includes a glass layer (e.g., the glass layer 604), where the glass layer is composed of alkali aluminosilicate glass (e.g., that has been chemically strengthened through an ion exchange process). In some embodiments, the cover windows each include respective glass layers of having a thickness between 0.2 and 1.0 mm. In some embodiments, each of the cover window types includes a scratch-resistant material on an outer surface of the stack of material layers. In some embodiments, each of the cover windows includes an anti-fingerprint coating (e.g., a fluoro silane-based coating) (e.g., a 20 nm layer of coating). The advantages of using glass as compared to plastic can include better scratch and fingerprint resistances, better optical performance, and/or ease of manufacturing. In some embodiments, a single glass layer is used for multiple sensors (e.g., cameras) such that each of the multiple sensors has a similar field of view. Using a single cover window can simplify integration with a plastic front cover, can achieve smoother industrial design, and/or reduce the number of parts, thereby providing for improved manufacturing efficiency.

(B11) In some embodiments of any of B1-B10, the second type of cover window includes an aperture (e.g., the aperture 523) configured to allow (improve) audio received by a microphone of the second set of sensors. By defining an opening on a surface of one of the cover windows (e.g., the projector cover window), the need for a separate microphone port in another portion of the head-wearable devices (e.g., a plastic portion of the front-facing outer surface) is eliminated.

(B12) In some embodiments of any of B1-B11, the second stack of material layers includes one or more layers of infrared (IR) ink (e.g., the one or more ink layers 656) adapted to allow light having a wavelength in an infrared wavelength range to pass through. In some embodiments, the one or more layers of IR ink are adapted to block (e.g., reflect) light having a wavelength that is not in the infrared wavelength range. In some embodiments, the second stack of material layers further includes one or more non-IR inks. In some embodiments, the infrared wavelength range corresponds to a light emission wavelength of a projector of the second set of sensors.

(B13) In some embodiments of any of B1-B12, the first stack of material layers includes one or more layers of a first ink (e.g., the one or more layers 602-1) configured to allow transmission of light within a first wavelength range (e.g., and reduce/block transmission of other wavelength ranges). In some embodiments, the first ink is a black ink (e.g., one of the layers 606 of the cover window stack 601). In some embodiments, the first stack of material layers includes one or more layers of a second ink. In some embodiments, the first wavelength range is a visible light range and/or an infrared light range. In some embodiments, the first wavelength range corresponds to a light capture wavelength of a camera of the first set of sensors. In some embodiments, the first wavelength range is 400 nm to 900 nm.

(B14) In some embodiments of any of B1-B13, the first set of sensors includes one or more image sensors (e.g., including the image sensors 518 and 520), and the second set of sensors includes a depth-tracking component (e.g., the depth tracking component 104). In some embodiments, the one or more image sensors includes at least one monochrome camera and at least one color camera. In some embodiments, the one or more image sensors include a color camera for color passthrough and a monochrome camera for object tracking and/or depth mapping.

(B15) In some embodiments of B14, the first stack of material layers includes an alkali aluminosilicate glass layer (e.g., the glass layer 604) adapted to provide for color passthrough, via a color camera of the one or more image sensors, of physical surroundings of a user of the head-wearable device.

(B16) In some embodiments of any of B1-B15, the respective second set of sensors includes a projector (e.g., the depth tracking component 528) configured to project structured light onto real-world objects. In some embodiments, the head-wearable device includes a processing unit configured to perform depth mapping by determining respective depths of respective points on the real-world objects using the projected structured light.

(B17) In some embodiments of any of B1-B16, the front-facing outer surface is curved along the first dimension (e.g., horizontal length), and each of the respective first and second cover windows is uncurved. In some embodiments, each of the cover windows is positioned proudly (e.g., projecting slightly as illustrated in FIG. 1B) with respect to the front-facing outer surface to direct sensors along a substantially parallel projection plane. By projecting the sets of components slightly from the front-facing outer surface, the embodiments described herein provide for an increased field of view for cameras, projectors, and/or other sensors of the sets of sensors. In some embodiments, the first and second sets of components are arranged in a line (e.g., along a same plane or axis). Arranging the sets of components in a line allows for ease of data processing (e.g., combining image data from multiple cameras).

(B18) In some embodiments of any of B1-B17, each of the first and second sets of components include respective component mounts for mounting sensors to the front-facing outer surface. For example, each of the sets of components 504-1, 504-2, and 506 include respective component mounts 516 and 526, that are configured and arranged to receive different sets of sensors and different types of cover windows. In some embodiments, the respective component mounts are configured to hold the corresponding sets of components in place (e.g., prevent relative movement of the components with respect to the front-facing outer surface during use). In some embodiments, a first side of the component mounts is configured to receive a respective back side of a corresponding cover window (and/or an adhesive layer for the cover window). In some embodiments, a second side of the component mounts is configured to receive respective sensors of the corresponding sets of sensors of the first and second sets of components. In some embodiments, the component mounts are configured to match corresponding apertures in the front-facing outer surface.

(B19) In some embodiments of any of B1-B18, the head-wearable device further includes a processing unit (e.g., the processor 948A shown in FIG. 9C) configured for: (a) projecting, from a projector (e.g., the depth tracking component 528) of the second set of components (e.g., including the respective component 506), structured light towards a controller (e.g., the controller 1400 for controlling one or more user interfaces within an artificial-reality environment presented by the head-wearable device), (b) obtaining one or more images from an imaging sensor of the first set of components, where the one or more images include imaged patterns corresponding to the structured light, and (c) performing an operation corresponding to the controller based on a correspondence between the imaged patterns. For example, the head-wearable device performs motion tracking for the controller using the projector and the imaging sensor. In some embodiments, the head-wearable device is configured to track the controller in two or more dimensions (e.g., in 3-D space). In some embodiments, the one or more other images are obtained by a second imaging sensor, and the other images include second imaged patterns corresponding to the same structured light projected towards the controller.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A head-wearable device comprising:
    a depth-tracking component configured to obtain depth information associated with one or more objects in a physical environment of the head-wearable device;
    a set of peripheral camera components; and
    a set of forward-facing camera components, wherein each forward-facing camera component of the set of forward-facing camera components comprises a monochrome camera and a color camera.

2. The head-wearable device of claim 1, wherein the monochrome camera has a higher refresh rate than the color camera.

3. The head-wearable device of claim 1, wherein the color camera has a higher resolution than the monochrome camera.

4. The head-wearable device of claim 1, wherein the monochrome camera and the color camera are co-located such that a field of view of the monochrome camera substantially overlaps with a field of view of the color camera.

5. The head-wearable device of claim 1, wherein each forward-facing camera component of the set of forward-facing camera components further comprises a cover window, and wherein the monochrome camera and the color camera are co-located behind the cover window.

6. The head-wearable device of claim 5, wherein the cover window is composed of glass.

7. The head-wearable device of claim 5, wherein the cover window is configured to be (i) transparent in a range of visible wavelengths, (ii) transparent in a range of infrared wavelengths, and (iii) transparent across respective fields of view of the monochrome camera and the color camera.

8. The head-wearable device of claim 1, wherein:
the head-wearable device is an artificial reality device, and
the color camera is configured for a color passthrough mode of the artificial reality device.

9. The head-wearable device of claim 1, wherein the monochrome camera is configured for depth sensing and/or object tracking.

10. The head-wearable device of claim 1, wherein the set of peripheral camera components are configured for hand and/or controller tracking.

11. The head-wearable device of claim 1, wherein the set of peripheral camera components comprise one or more fixed-focus monochrome cameras.

12. The head-wearable device of claim 1, wherein the depth-tracking component comprises a structured light generator.

13. The head-wearable device of claim 1, further comprising:
a cover window positioned in front of the depth-tracking component; and
a microphone co-located with the depth-tracking component behind the cover window.

14. The head-wearable device of claim 13, wherein the cover window includes an aperture adjacent to the microphone.

15. The head-wearable device of claim 1, further comprising a processing unit configured to colorize one or more images from the monochrome camera using color information from the color camera.

16. The head-wearable device of claim 1, wherein the color camera is an RGB camera.

17. The head-wearable device of claim 1, wherein the monochrome camera has a larger field of view than the color camera.

18. The head-wearable device of claim 1, wherein the set of forward-facing camera components comprises a first forward-facing camera component arranged on a first side of the depth-tracking component and a second forward-facing camera component arranged on a second side of the depth-tracking component.

19. The head-wearable device of claim 1, wherein the set of peripheral camera components comprises a first peripheral camera component arranged on a first side of a peripheral of the head-wearable device and a second peripheral camera component arranged on a second side of the peripheral of the head-wearable device.

20. The head-wearable device of claim 1, wherein:
the head-wearable device is configured to operate with a handheld controller that includes illumination sources used for position-tracking purposes, the illumination sources being disposed under a top cover of the handheld controller; and
the head-wearable device is configured to track a position of the handheld controller using image data of the illumination sources from the monochrome camera and/or the set of peripheral camera components.

* * * * *